June 29, 1954 W. F. GLASER ET AL 2,682,318
ELEVATOR DISPATCHING AND CONTROL SYSTEM
Filed Dec. 15, 1951 14 Sheets-Sheet 1

WILLIAM FRANK GLASER
JOHN LUSTI } INVENTORS

BY J. L. Sharon ATTORNEY

WILLIAM FRANK GLASER
JOHN LUSTI
INVENTORS

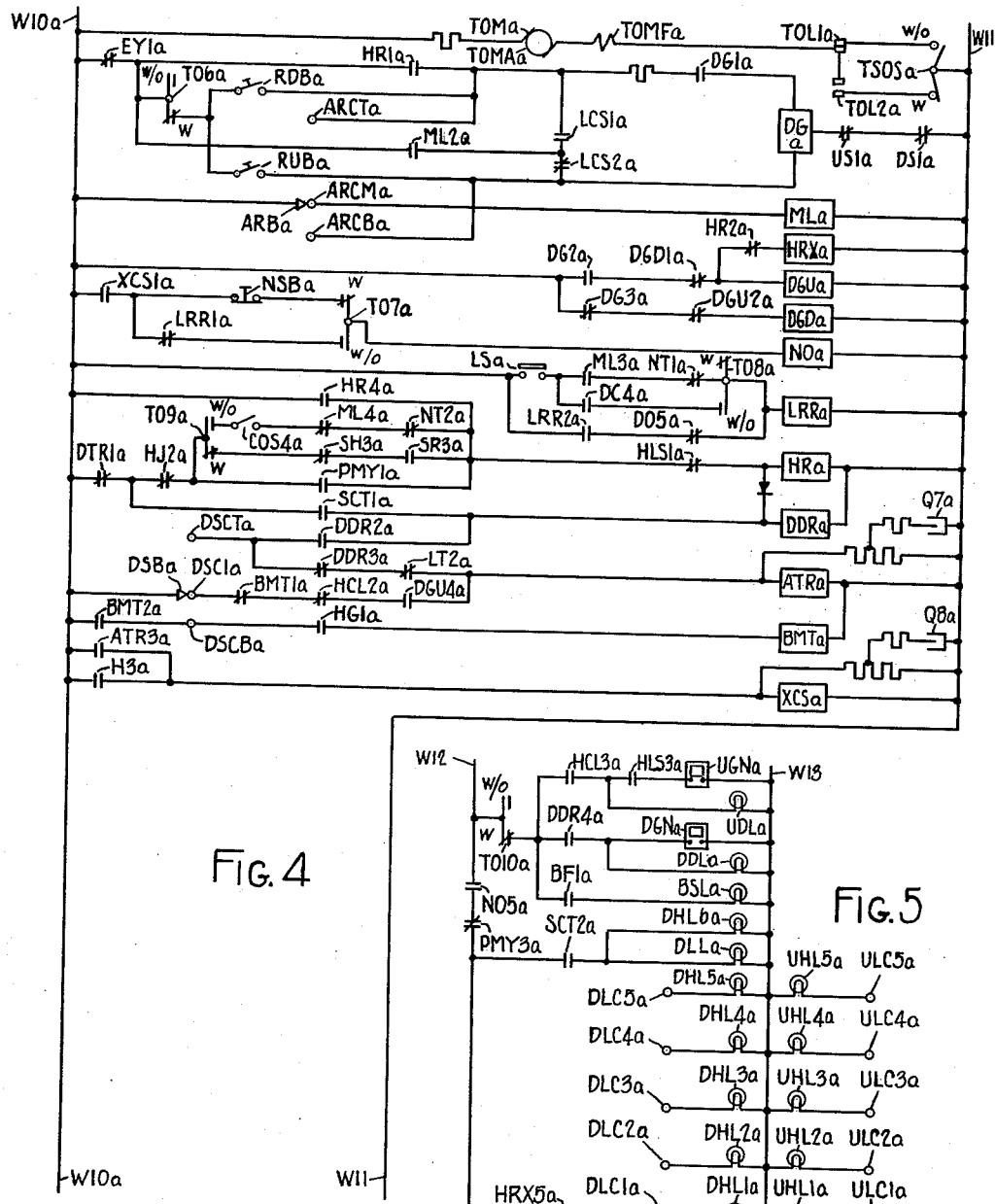

June 29, 1954 W. F. GLASER ET AL 2,682,318
ELEVATOR DISPATCHING AND CONTROL SYSTEM
Filed Dec. 15, 1951 14 Sheets-Sheet 7

WILLIAM FRANK GLASER
JOHN LUSTI } INVENTORS

BY J. L. Sharon ATTORNEY

WILLIAM FRANK GLASER
JOHN LUSTI } INVENTORS

BY J. L. Sharon ATTORNEY

WILLIAM FRANK GLASER
JOHN LUSTI } INVENTORS

BY  J. L. Sharon  ATTORNEY

WILLIAM FRANK GLASER
JOHN LUSTI
INVENTORS

FIG. 8d

June 29, 1954 — W. F. GLASER ET AL — 2,682,318
ELEVATOR DISPATCHING AND CONTROL SYSTEM
Filed Dec. 15, 1951 — 14 Sheets-Sheet 14

FIG. 8e

WILLIAM FRANK GLASER
JOHN LUSTI } INVENTORS

BY *J. L. Sharon* ATTORNEY

Patented June 29, 1954

2,682,318

UNITED STATES PATENT OFFICE 2,682,318

ELEVATOR DISPATCHING AND CONTROL SYSTEM

William Frank Glaser, Eastchester, N. Y., and John Lusti, Bergenfield, N. J., assignors to Otis Elevator Company, New York, N. Y., a corporation of New Jersey Application December 15, 1951, Serial No. 261,878

57 Claims. (Cl. 187—29)

The invention relates to dispatching and control systems for elevators.

Dispatching and control systems are employed in plural elevator installations to coordinate and control the operation of the cars. There are many installations such as those of a small number of cars for which elaborate dispatching and control systems are unwarranted. The invention is directed to dispatching and control systems for installations of this character although it is of general application and certain features thereof are particularly suitable for other types of plural elevator installations.

It is the object of the invention to provide a dispatching and control system which is relatively simple and is economical to manufacture and install, which is especially suitable for installations of small numbers of cars, and which provides adequate group supervision of the elevator cars without the constant attendance of a supervisor.

The invention is applicable to elevator systems in which the starting of the cars is under the control of attendants in the cars and to systems in which the cars are operated without attendants in which case the starting of the cars is automatic. When operated with attendants, the cars are dispatched by signalling the attendants. When operated without attendants, the cars are dispatched by automatically starting the cars. Certain features of the invention are applicable to both "with attendant" operation and "without attendant" operation while other features are especially applicable to but one of these operations. The invention is especially applicable to installations in which the cars are stopped at the landings in response to calls registered from within the cars and from the landings and the invention will be described as applied to such an installation.

The system is arranged so that it may be set for different traffic conditions. These are up peak conditions where substantially all of the traffic is in the up direction as when the building is being filled, down peak conditions where substantially all of the traffic is in the down direction as when the building is being emptied, interim periods where there is substantial traffic in both directions, and light or intermittent traffic conditions as for night service. The cars are dispatched on their upward trips from the main landing. This landing is usually the lobby floor and serves as the bottom terminal even though there may be one or more floors below for which elevator service is provided. The cars are dispatched on their downward trips either from the top terminal or from some floor below, depending on operating conditions and the traffic conditions for which the system is set. Under up peak traffic conditions, the cars are dispatched in the up direction on a timing basis and are dispatched in the down direction immediately after answering their highest calls. Under up and down traffic conditions, the cars are dispatched in both directions on a timing basis or from the main landing prior to the expiration of the timing interval when certain call conditions arise. Under down peak traffic conditions, dispatching of the cars in the down direction is on a timing basis and the cars are dispatched in the up direction as soon as they reach the main landing. Under light or intermittent traffic conditions, the cars are dispatched in the up direction in response to calls when certain operating conditions exist and are dispatched in the down direction as soon as they have answered their highest calls. The cars are selected in advance for dispatching on their upward trips under up peak traffic, up and down traffic and light traffic conditions and for dispatching on their downward trips under up and down traffic and down peak traffic conditions.

In dispatching the cars in the up direction under up peak traffic conditions, when a car is at the main landing when the selected car leaves the timing interval is started from the time of departure of the selected car or upon the arising of a condition in which a call is registered to which the next selected car is subject, whichever occurs later. This provides a loading time to take passengers into the car, thus on the average obviating the dispatching of the cars with only a few passengers and yet avoiding making any passenger or intending passenger wait too long for service. Such call to which the selected car is subject is a call for a floor above the main landing and may be a car call for the selected car, an up landing call or a down landing call, in the case of the down landing call the circuits being illustrated for a down landing call above all cars. Overlapping calls may continue the timing interval but if the registration of such calls is not continuous throughout the period, the timing interval is cancelled and is restarted when such call condition again arises. If no car is at the main landing when a car departs, the timing interval starts with the departure. If when the next car arrives, a call is in registration to which the car is subject and the interval has expired, the car is dispatched immediately. If the interval has not expired and there is continuous call registration from the arrival of the car for the remainder of the period, the car is dispatched as soon as the interval expires. If not, the interval is cancelled and restarted upon registration of such a call.

In dispatching the cars in the up direction under conditions of substantial traffic in both directions, the timing interval is begun incident to the departure of the previous car from the main landing, regardless of whether or not calls are in registration. However should a condition arise as a part of which a call is in registration which the other cars will not answer, the car is dispatched as soon as such condition arises without waiting on the timing interval. Such call is a call for a floor above the main landing and, provided each of the other cars is either set for down or at the main landing, is a car call for the selected car, an up landing call or a down landing call above all cars. This in effect reduces the timing interval when a car makes a quick up trip and a call is registered which that car will not answer on its downward trip. The timing interval for dispatching a car on its downward trip is begun incident to the starting of the previous car on its downward trip. The down dispatching interval is made less than, say half of, the up dispatching interval, which obviates bunching of the cars without delaying the dispatching cycle. A car may be dispatched on its downward trip from some floor below the top terminal, providing the down timing interval has expired, the car has reached its highest call and, if any other car is set for down or at the main landing, there is a down call above it. If no such down call above exists, the car continues to the upper terminal.

Under down peak traffic conditions, the down dispatching interval is begun incident to the departure of the previous car on its downward trip and a car may be dispatched from a floor below the top terminal provided the down timing interval has expired, the car has reached its highest call and, if any other car is set for down or at the main landing, there is a down call above that car.

Under light traffic conditions, the calls which control the dispatching of the cars on their upward trips are preferably the same as for up and down traffic conditions, i. e., provided each of the other cars is either set for downward travel or at the main landing, a car call for the selected car for a floor above the main landing, an up landing call for a floor above the main landing or a down landing call for a floor above all cars. This keeps the cars spaced when more than one car is in operation responding to calls.

Hall lanterns are provided at each floor for the respective cars. These provide for intending passengers indication of the direction in which each car is to leave the floor at which a stop is made. At a dispatching floor, the hall lantern for the direction in which a car is to be dispatched is not lighted until the car is selected and is extinguished as the car is dispatched.

As each stop is made the doors open automatically. Under "with attendant" operation, the attendant effects the closing of the doors incident to the starting operation by operating a start control in the car. At the main landing, the closing of the doors is at the discretion of the attendant. For most installations it is preferred to park the cars with their doors open, under which conditions the attendants prevent passengers entering unselected cars. Under "without attendant" operation, the doors close automatically upon the expiration of a door time interval after a stop is made and the car starts as the doors reach closed position. Under light traffic conditions, the cars may all park at the main landing with their doors closed or the selected car may have its doors open. Under other traffic conditions, all cars at the main landing have their doors open.

The duration of the door time interval under "without attendant" operation depends on the conditions under which the stop is made. A short door time interval is provided when a stop is made in response to a car call and when a stop is made at a landing under conditions where no call is registered for that floor as where, under down peak traffic conditions a car is dispatched from a floor below the upper terminal, which may be a floor for which no call is registered. When a stop is made in response to a landing call, a longer door time interval is provided. A still longer door time interval is provided when the car on its downward trip stops at the main landing. This speeds up service by minimizing time consumed waiting on the doors to close when no further passenger transfer is being effected.

In installations in which service is to be provided to one or more floors below the main landing, usually basements, such service is provided by all cars of the system. Each car on its downward trip is automatically stopped at the main landing provided no car call is registered for the basement and, in the case of "without attendant" operation, no landing call is registered for the basement. If such basement call is registered, no stop is made at the main landing unless in response to a car call or down landing call for that landing. If a stop is made in response to such main landing call, selection of the car for upward travel is prevented and the car continues to the basement to answer the basement call. When a car travels to the basement, a stop is made at the main landing on its subsequent upward trip, except that no stop is made at that landing under light traffic conditions during "without attendant" operation when a call to which the car is subject is in registration for a floor above and no car call for that car or up landing call is registered for the main landing.

A car is selected for basement service to obviate unnecessary basement trips by other cars. This basement selection may be effected in response to a basement car call for a car or a basement landing call. When a car is selected for basement service, no other car will be selected for answering a basement landing call.

With the system set for operation which includes reversal at highest call, when a car makes a stop at a floor in response to an up landing call which is its highest call, and no one desiring to go in the up direction enters the car so that no car call is registered for a floor above, the direction in which the car is set to travel is changed to down and the down hall lantern is lighted. The same is true when a car makes a stop in response to a car call with a landing call registered for a floor above and this landing call is answered by some other car, that is, the direction of travel is changed to down and the down hall lantern is lighted. Thus, in each case, any intending passenger at that floor is advised that the car is now going to travel in the down direction so that he may enter the car. Under "with attendant" operation, this operation is effected in response to the operation of the start control to start the car. When the attendant operates the start control under such conditions and if in the meantime no landing call has been registered for a floor above, the doors do not close and the down dispatch signal is given, advising the attendant that the direction in which his car is set to travel has been changed to down and that he may take on any down passengers. Upon release of the start control and reoperation, the doors close and the car starts in the down direction. Under "without attendant" operation when a stop is made in response to an up landing call which is the highest call or in response to a car call under conditions where a landing call above is answered by another car, the doors close upon the expiration of the door time interval and if no call is in registration for a floor above at the time the doors reach closed position, they reopen, the down hall lantern is lighted instead of the up hall lantern and upon the expiration of another door time interval the doors close and the car starts in the down direction. The first closing operation of the doors may be dispensed with in which event upon the expiration of the door time interval the direction is changed to down and the down hall lantern is lighted, and upon the expiration of another door time interval the doors close and the car is started in the down direction.

The mode of carrying out the invention which is at present preferred and various features and advantages thereof will be gained from the above statements and from the following description and appended claims.

Figure 3:
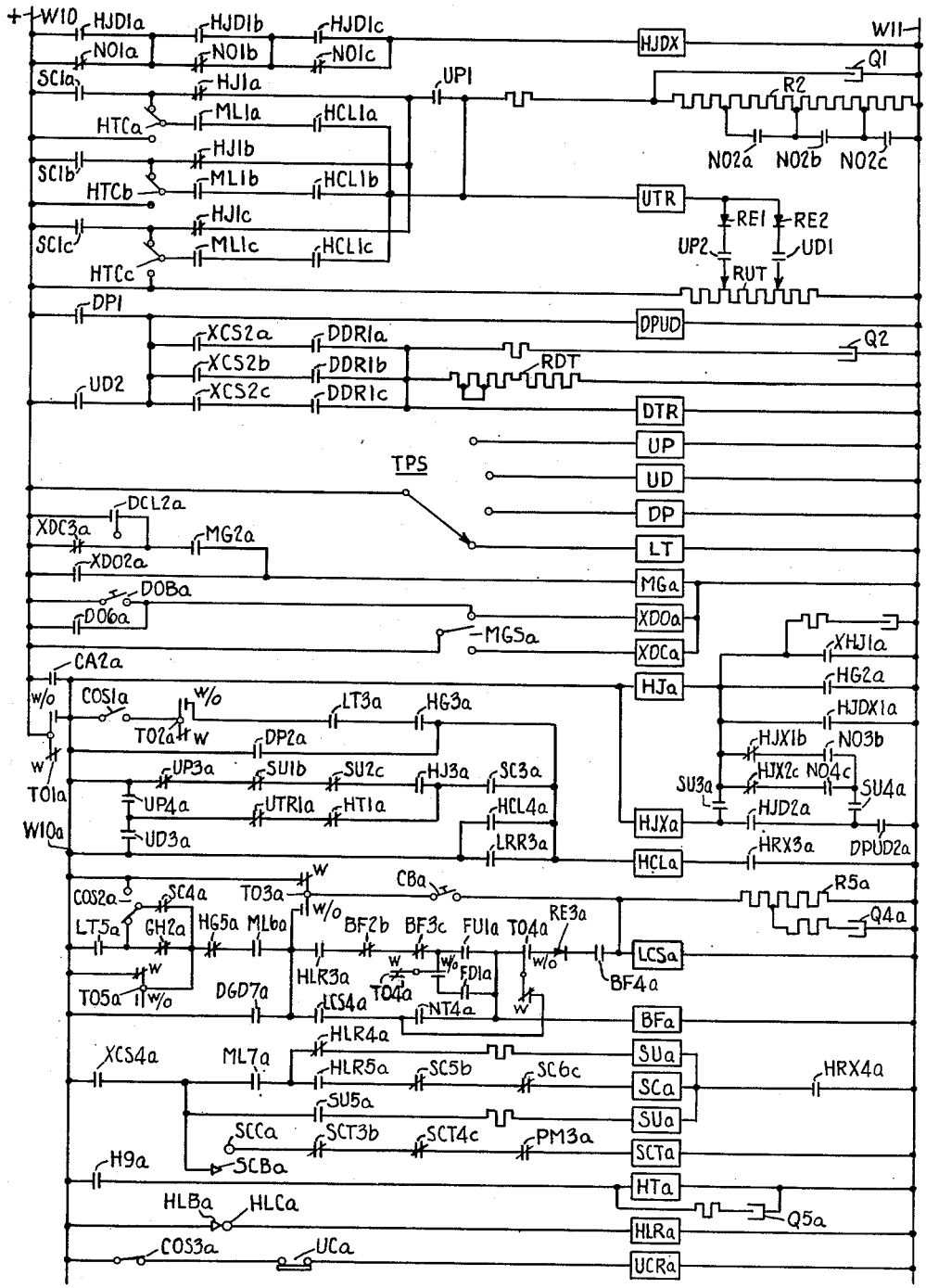
Figure 3B:
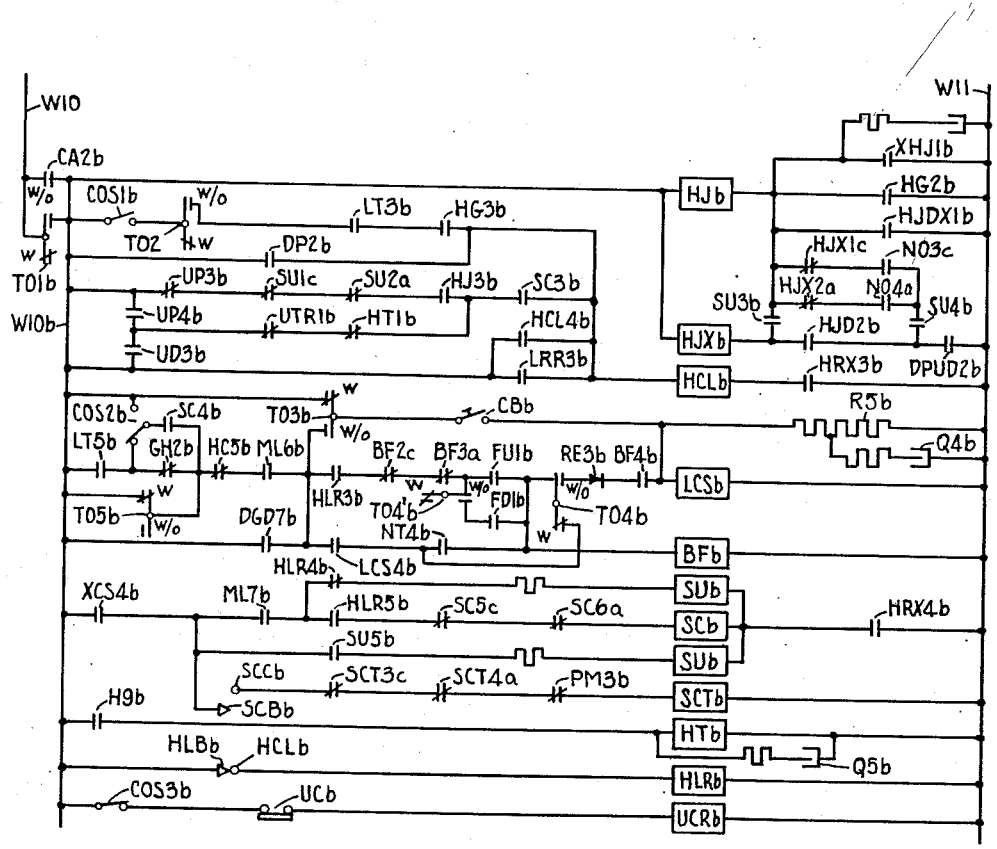
Figure 3C:
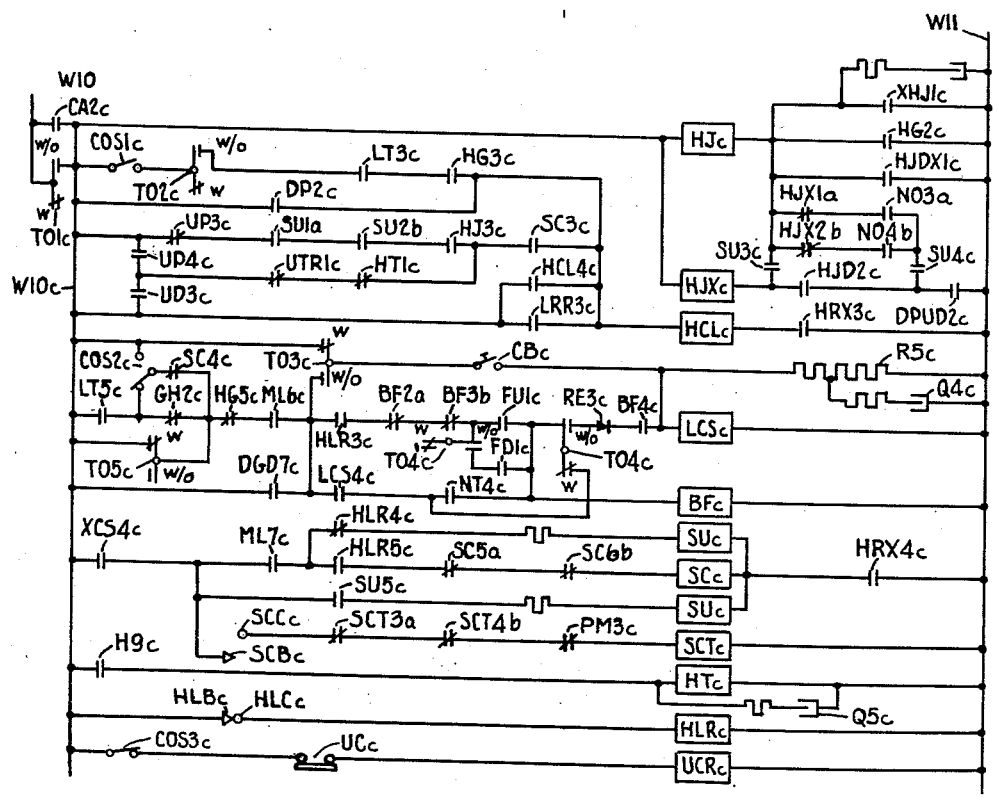
Figure 6:
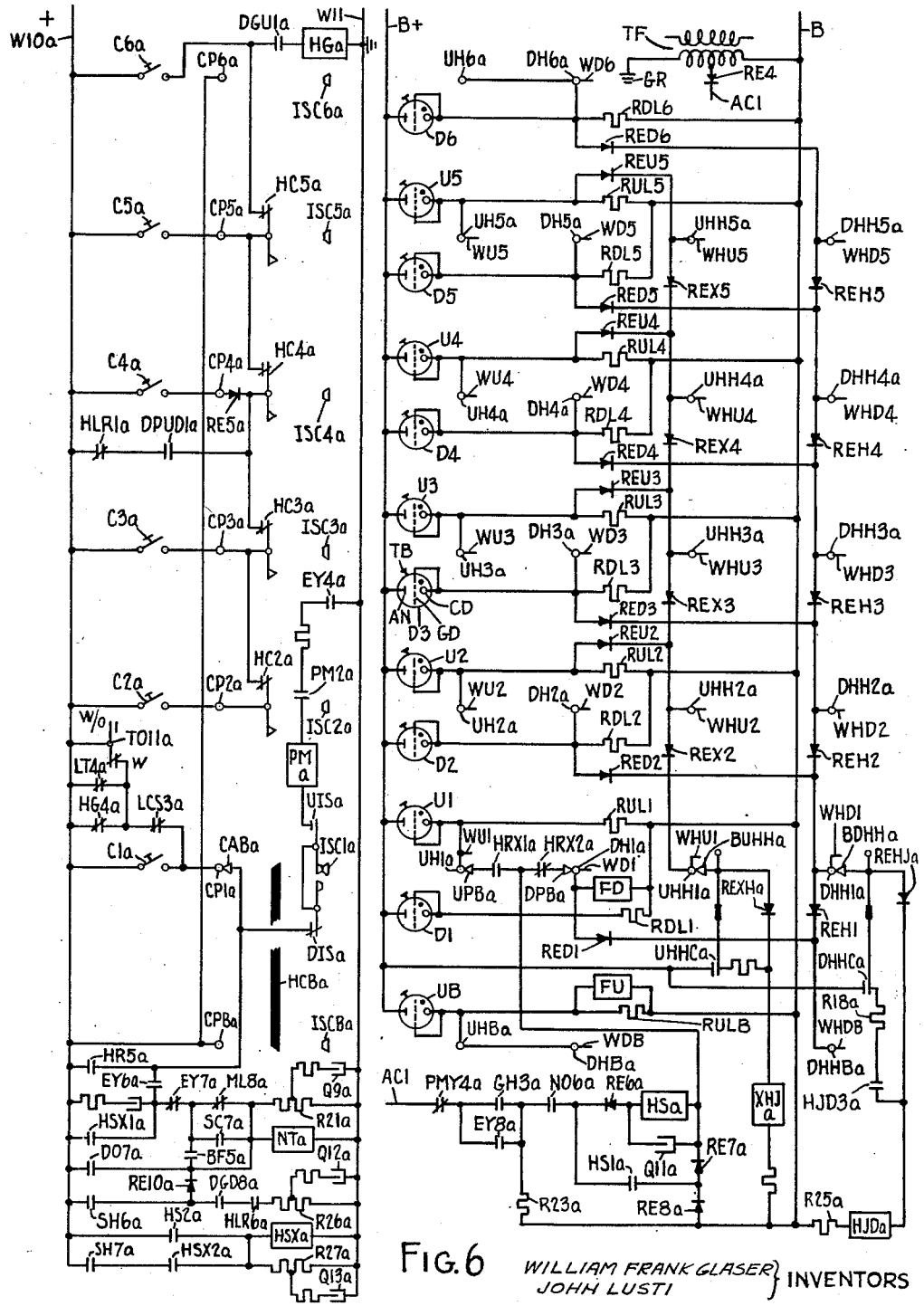
Figure 6C:
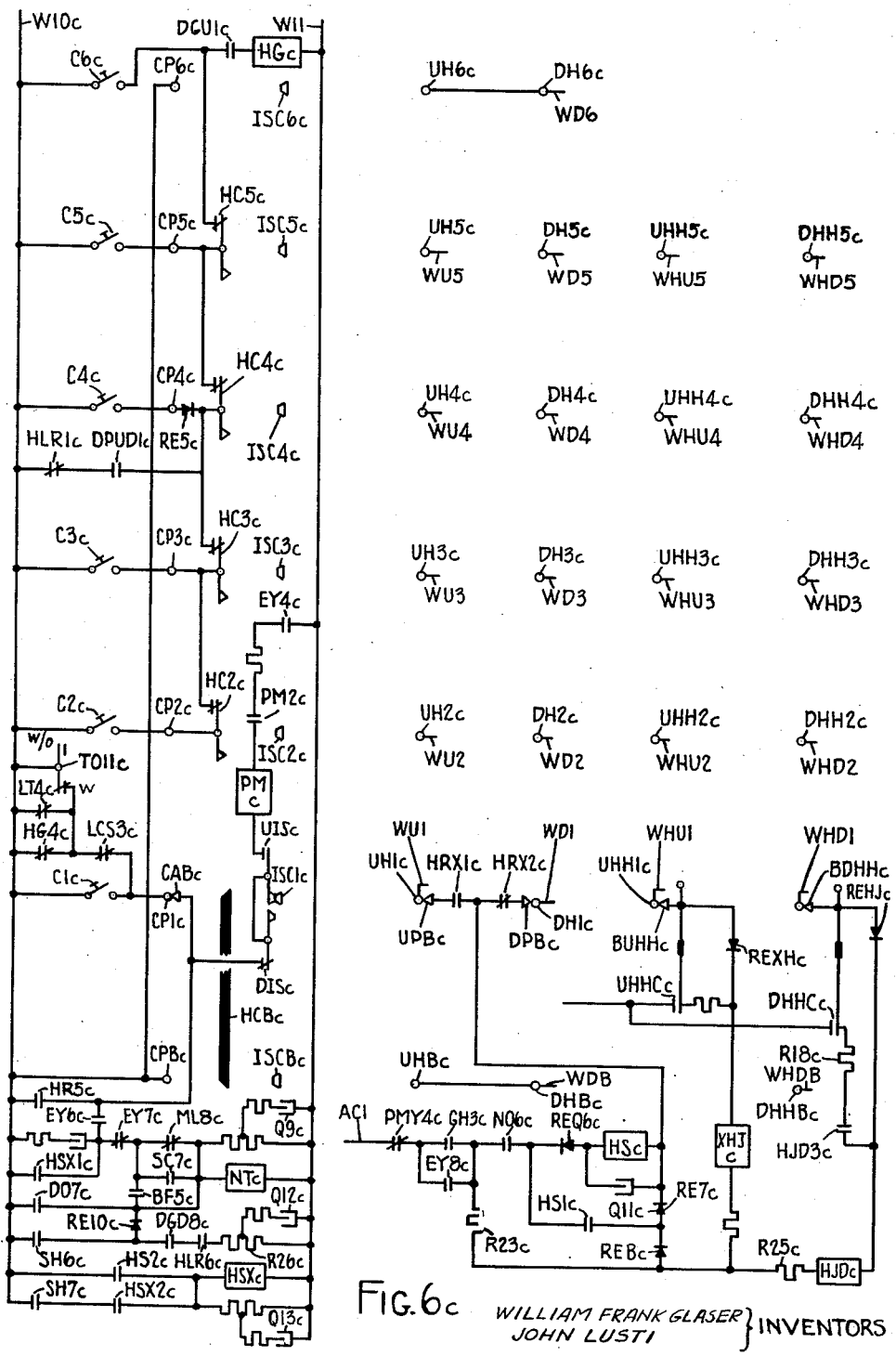
Figure 7:
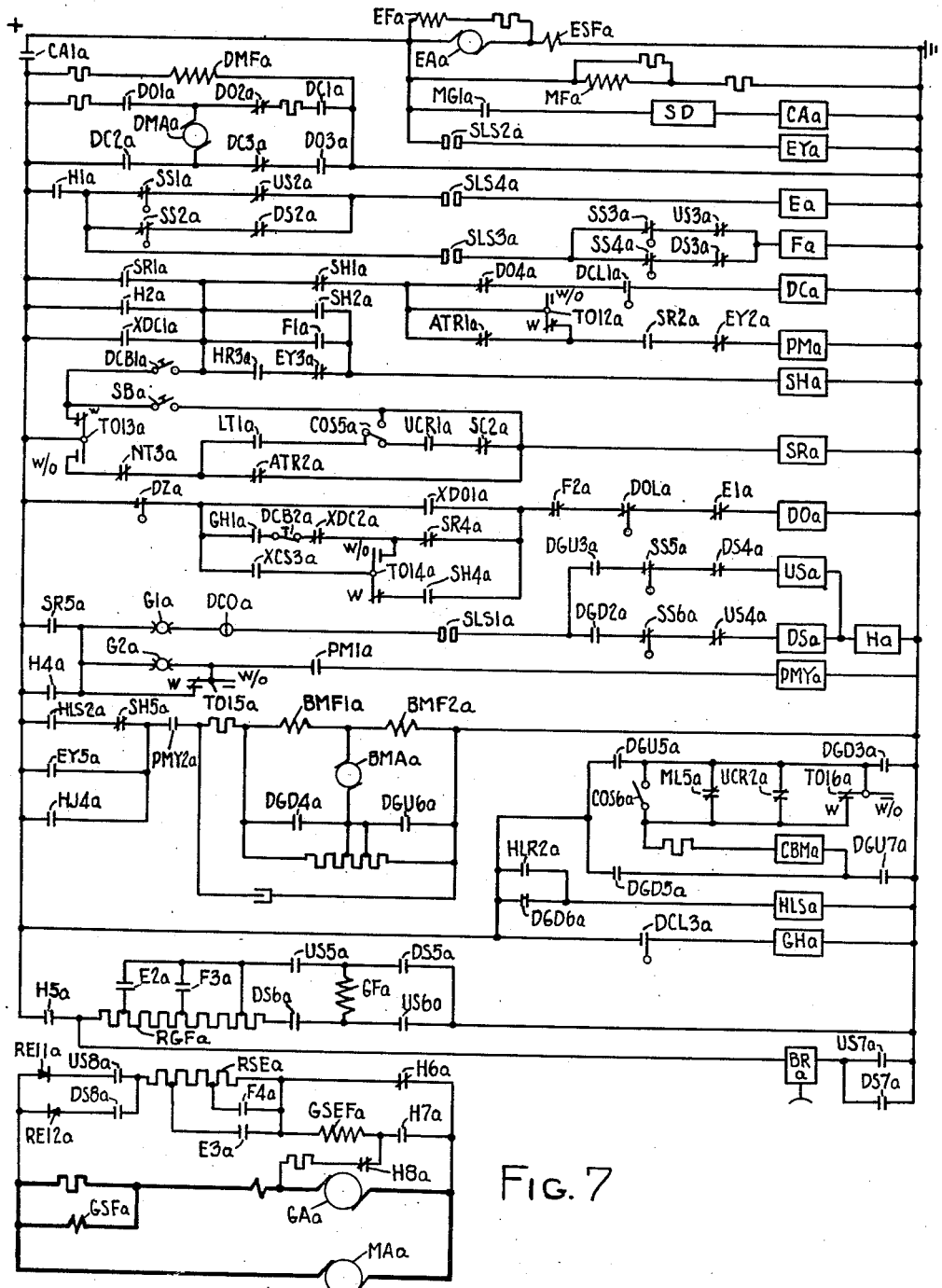
Figure 8A:
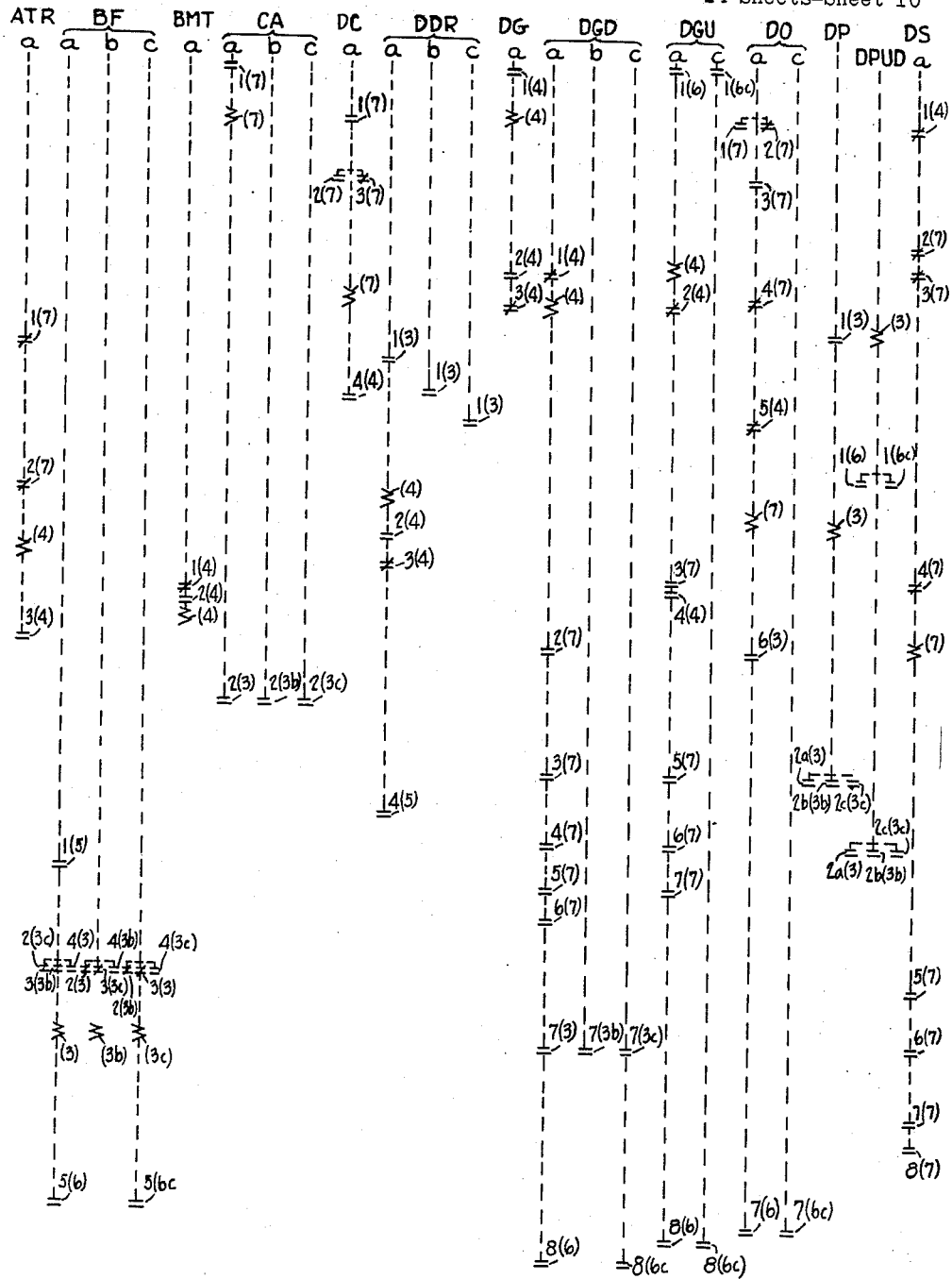
Figure 8B:
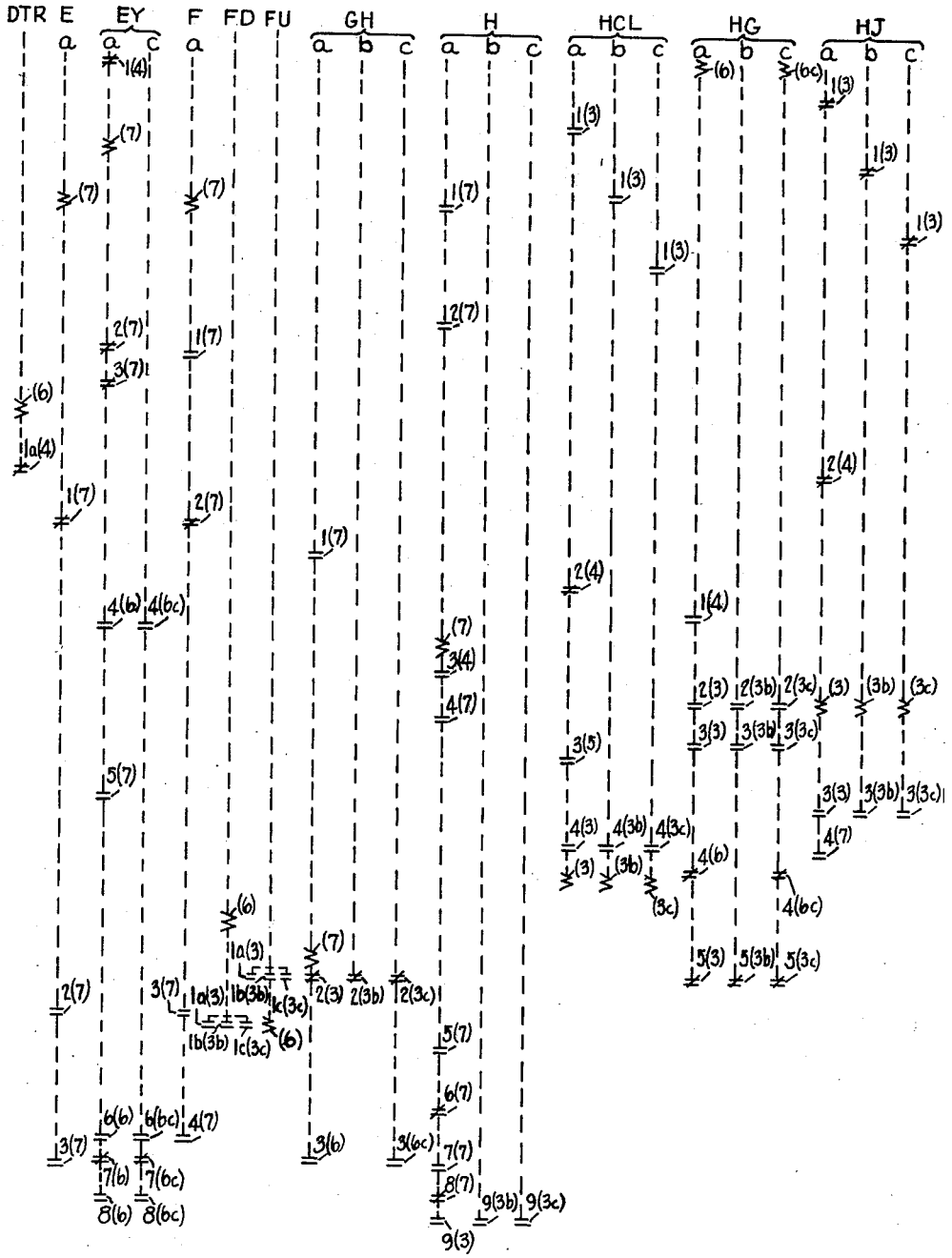
Figure 8C:
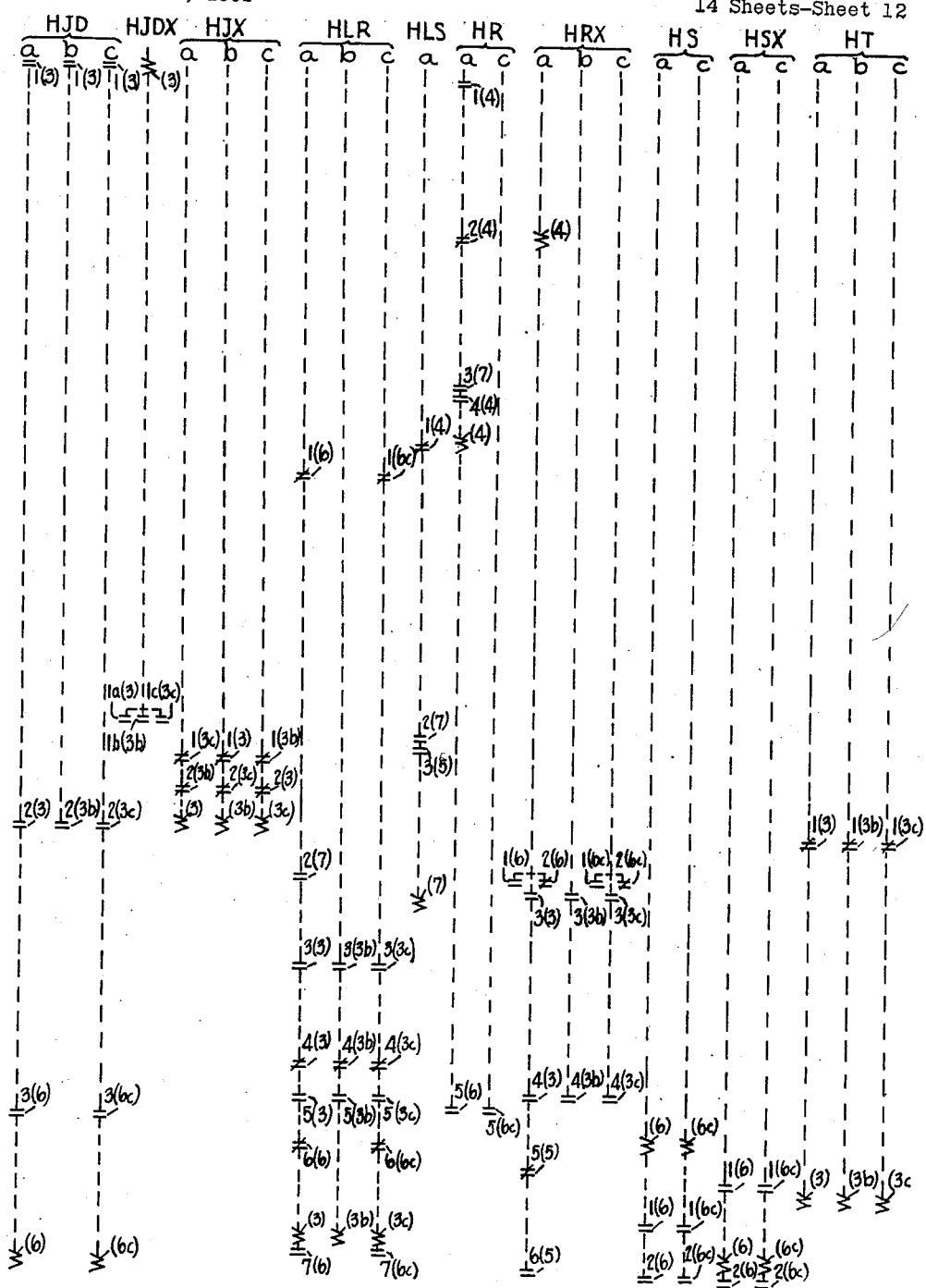

Figures 3, 3b and 3c taken together constitute a simplified schematic wiring diagram of dispatching circuits for a three elevator installation;

Figures 4, 6 and 7 taken together constitute a simplified schematic wiring diagram of power and control circuits for one of the elevators, certain circuits being common to the elevators;

Figure 5 is a simplified schematic wiring diagram of the hall lantern circuits for one of the elevators;

Figure 6c is a simplified schematic wiring diagram of the control circuits for another of the elevators, corresponding to those of Figure 6; and Figures 8a to 8e are key sheets for Figures 3, 3b, 3c, 4, 5, 6, 6c and 7, showing the electromagnetic switches in spindle form.

Figure 1:
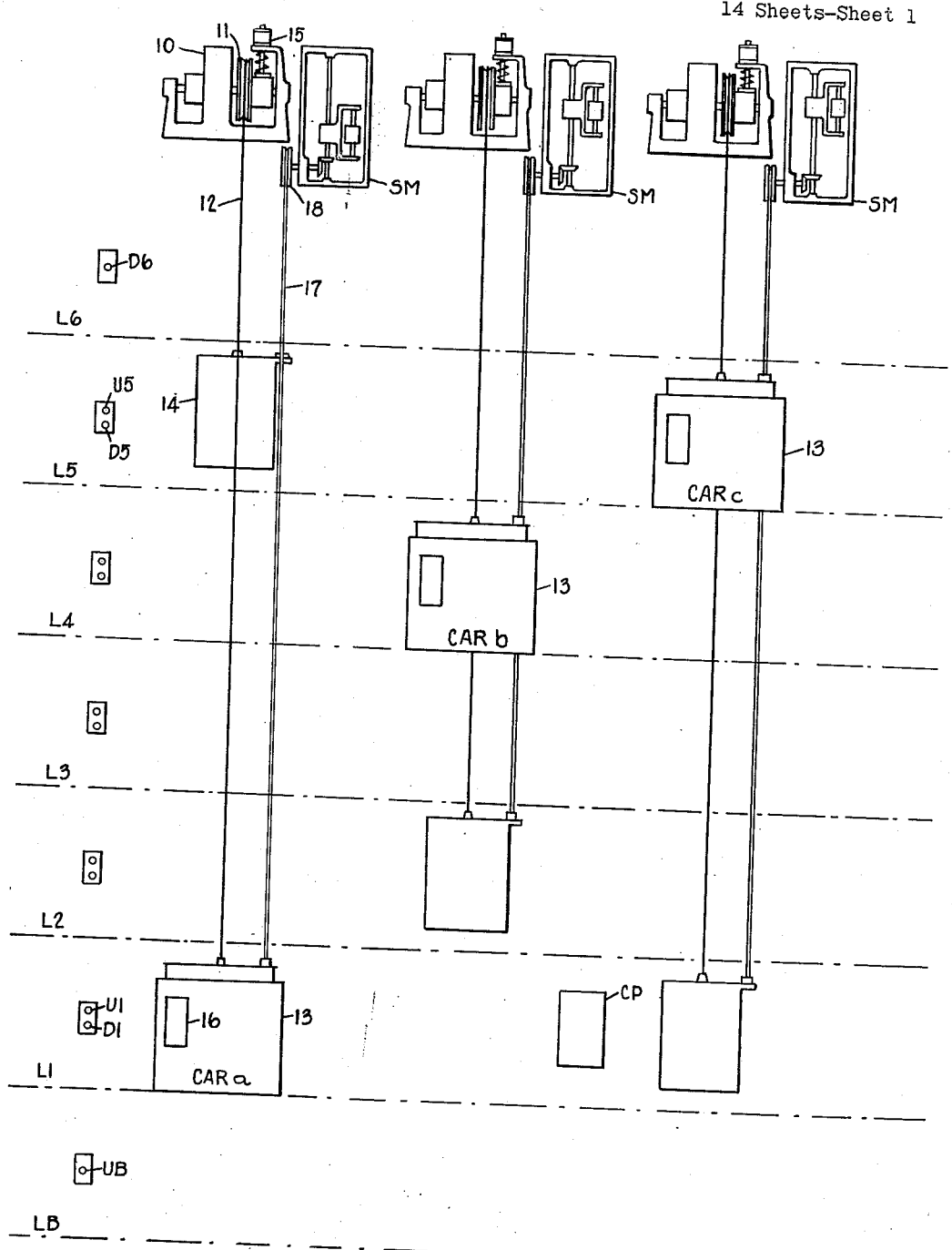
Figure 1 is a schematic diagram of an elevator installation illustrating relative positions of the cars, three cars being illustrated.

For a general understanding of the invention reference may be had to Figure 1, wherein is illustrated by way of example a three car elevator installation in which the cars serve six floors and a basement. The floors are designated generally as L and differentiated by appended reference characters. The arrangement is the same for each elevator. Each car is raised and lowered by means of a hoisting motor 10, which motor drives a traction sheave 11 over which pass hoisting ropes 12 for the car 13 and counterweight 14. An electromechanical brake 15 is provided and is applied to effect the final stopping operation and to hold the car when at rest.

Each elevator car is provided with a car operating panel 16 on which are located a plurality of control switches, certain of them for operation by the car attendant on "with attendant" operation and certain of them including some of those effective for "with attendant" operation for operation by the passengers themselves on "without attendant" operation. A cover may be provided for the switches not being used on "without attendant" operation. Also a panel having duplicate switches for "without attendant" operation may be provided in the rear of the car. These switches include among others a start control button for "with attendant" operation and a plurality of push buttons, one for each floor, hereinafter termed car buttons, for registering car calls for both "with attendant" operation and "without attendant" operation. These buttons are individual to the elevators and are shown for one elevator in the wiring diagrams of Figures 6 and 7. Other switches on the operating panel will be referred to later.

Controls are provided at the floors to enable intending passengers to register landing calls, an up control U and a down control D being provided at each intermediate floor and the lower terminal floor, one control D at the top terminal floor and one control U at the basement. Differentiation between these controls is had by appended reference characters. These call registering controls, which will hereinafter be termed landing buttons, are common to the cars and are shown in Figure 6.

Referring to the wiring diagrams, Figures 3, 3b and 3c show principally the dispatching circuits, these circuits being for three elevators but, as will be seen, corresponding circuits are provided for other elevators. Various manually operable switches, signals and indicating devices in the circuits of these figures are on a panel which may be in the corridor at the lobby floor and will be termed corridor panel and designated CP (see Figure 1). Figure 6 shows the car call registering, car and landing call pick-up, automatic landing call cancelling, highest car call and highest landing call circuits for one elevator. This figure also shows the landing call registering circuits which are common to the elevators. Like car call registering circuits, highest car call circuits and car call pick-up circuits are provided for each of the other elevators as shown in Figure 6c. As regards the highest landing call circuits, landing call pick-up and automatic landing call cancelling circuits, like circuits are provided for each of the elevators by inter-connection of the selectors as indicated by cross-connecting wires WU, WD, WHU and WHD for the various floors in Figures 6 and 6c. Figure 5 shows the hall lantern circuits for one car. Figures 4 and 7 show additional control circuits and the power circuits for one elevator, it being understood that such circuits are provided also for the other elevators. The circuits of Figures 3, 4 and 6 are joined by vertical feed lines W10, W10a and W11.

The feed lines W10 and W11 supply direct current which may be derived through rectifiers from the main source of supply (not shown) when this source is three phase alternating current. Line W10 is the positive side as indicated by the plus sign in Figure 3. The feed lines W12 and W13 for the hall lantern and buzzer circuits supply single phase alternating current which may be taken from the above mentioned alternating current supply mains, either directly or through transformers. The lines B+ and B of Figure 6 supply direct current. The primary of transformer TF of Figure 6 may be supplied with alternating current from the main source of supply.

To facilitate disclosure of an application of the invention, the control system illustrated has been considerably simplified as compared with control systems utilized in commercial installations. It is to be understood that in applying the invention to control systems used commercially, many changes may be made, especially in adapting the invention to the more comprehensive circuits and to control features and apparatus not here shown.

The electromagnetic switches employed in the system illustrated are designated as follows:

ATR—Auxiliary time relay
BF—Basement service relay
BMT—Basement relay
CA—Potential switch
DC—Door close switch
DDR—Down dispatching relay
DG—Direction holding switch
DGD—Auxiliary down direction switch
DGU—Auxiliary up direction switch
DO—Door open switch
DP—Down peak traffic switch
DPUD—Down peak and up-down traffic switch
DS—Down direction switch
DTR—Down time switch
E—Speed switch
EY—Auxiliary speed switch
F—Second speed switch
FD—Down main landing relay
FU—Up basement relay
GH—Door limit switch
H—Field and brake switch
HCL—Up dispatching relay
HG—Highest car call switch
HJ—Highest landing call switch
HJD—Down call relay
HJDX—Auxiliary down call relay
HJX—Highest landing call relay
HLR—Home landing relay
HLS—Highest call light switch
HR—Highest call reversal switch
HRX—Auxiliary highest call reversal switch
HS—Auxiliary stop relay
HSX—Landing stop time switch
HT—Running time switch
LCS—Lowest call switch
LRR—Load responsive relay
LT—Light traffic switch
MG—Motor generator switch
ML—Main landing switch
NO—Non-stop relay
NT—Hall time switch
PM—Pawl magnet (on selector)
PMY—Pawl magnet relay
SC—Selection relay
SCT—Top spacing relay
SH—Operating switch sequence relay
SR—Starting relay
SU—Spacing relay
UCR—Car unoccupied relay
UD—Up-down traffic switch
UP—Up peak traffic switch
US—Up direction switch
UTR—Up time relay
XCS—Dispatching removal relay
XDC—Auxiliary door close switch
XDO—Auxiliary door open switch
XHJ—Auxiliary highest call switch Throughout the description which follows, these letters will be applied to the coils of the above designated switches. Also, with reference numerals appended thereto, they will be applied to the contacts of these switches. The release coil of the electromechanical brake is similarly designated BR. Differentiation will be made between the different elevators by appending to the characters employed to designate the various elements of the system small case letters "a," "b" and "c," indicative of the different elevators.

The circuits are shown in "straight," i. e., "across-the-line," form in which the coils and contacts of the various switches are separated in such manner as to render the circuits as simple and direct as possible. The relationship of the coils and contacts may be seen from Figures 8a to 8e wherein the switches are arranged in alphabetical order with the coils and contacts of the various switches positioned on spindles. Taking any one of the spindle sheets, each switch thereon has all its contacts and coils on that particular spindle sheet. The coils and contacts are related to the wiring diagrams by applying in brackets to the particular coil or contact the number of the figure in which it occurs, this being appended to the particular designation for the contacts. Each coil and contact is positioned on the spindle sheet in alignment with its position on the particular wiring diagram. Thus a coil or contact of any particular switch may be found by taking the spindle sheet on which the switch is located, noting the number in brackets applied to the coil or contact and aligning that spindle sheet horizontally with the sheet on which the figure indicated is located. The coil or contact will then be found on that figure in horizontal alignment with that coil or contact on that spindle sheet. Thus to locate contacts DO1a for example, referring to spindle sheet 8a it will be found that contacts number 1 of switch DOa has the numeral 7 in brackets appended thereto. This means that these contacts appear in Figure 7. The contacts may then be located by aligning the sheet on which Figure 7 appears with the sheet on which Figure 8a appears and will be found in Figure 7 in alignment with the contacts in Figure 8a.

The electromagnetic switches are illustrated in deenergized condition, switch DG which is the latching type being shown in reset condition. This switch has two coils, one an operating coil and the other a reset coil. Switch SU has two coils, one an operating coil and the other a holding coil.

Referring to Figure 6, the up landing buttons U and the down landing buttons D are illustrated in the call registering circuits. Numerals and the letter B for basement are appended to the letters U and D for indicating the floors for which the buttons are provided. Each of these landing buttons in the preferred arrangement comprises an electronic tube and a fixed button connected to the tube envelope with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance of the glass envelope of the tube, such as the RCA 1C21, having been found satisfactory. With such a tube, the button is connected to the tube envelope adjacent the anode. The tubes of the type mentioned are three element tubes having an anode, a cathode and a control electrode designated for landing button D3 for example, as AN, CD and GD respectively, with the fixed button designated TB. RUL and RDL are loading resistors for the tubes. For such tubes, the preferred voltage values are 135 volts from line B+ to line B, 150 volts R. M. S. from line B to the grounded end of the secondary of transformer TF and 95 volts R. M. S. from line B to line AC1. For convenience line AC1 is not extended down the sheet as in the case of lines B+ and B, but the connections are indicated by applying reference character AC1 to the circuit to which it is connected.

The car buttons are designated C and, as in the case of the landing buttons, have numerals and the letter B for basement appended thereto as indicative of the floors for which the car buttons are provided. Each car button when pressed is held pressed by a magnet CBM (Figure 7) common to these buttons.

The starting button in the car is designated SB and is shown in Figure 7. Other controls are provided on the car panel along with the starting button and car buttons, namely, reversing buttons designated RUB and RDB for changing the direction of travel at any floor, and non-stop button designated NSB, all in Figure 4, door open button designated DOB in Figure 3, and door close button having double contacts designated DCB1 and DCB2, both in Figure 7.

The hall lanterns are designated HL and differentiated by reference characters corresponding to the floors for which they are provided and by the letters U and D, in accordance with whether up or down hall lanterns. Resistors are designated generally as R, rectifiers as RE and condensers as Q.

Mechanism actuated in accordance with movement of the elevator car is utilized in the circuits of each elevator. Such mechanism may be in the form of a selector machine SM as indicated in Figure 1. The selector machine is driven preferably by means of a steel tape 17 attached to the car and counterweight and having teeth formed thereon for engaging teeth on the selector driving wheel 18. An understanding of a selector machine suitable for use in the control system may be had from the schematic illustration of such a machine in Figure 2.

The selector machine comprises a frame formed by a base plate 20, and a top plate 21 supported from the base plate by standards. The operating shaft 22 for the selector machine is rotatably supported on the base plate 20. The toothed tape 17 meshes with the toothed driving wheel 18 which is secured to the outer end of shaft 22 to drive the machine. A vertical screw 24 is driven by shaft 22 through the intermediary of bevel gears 25. The vertical screw 24 drives a crosshead 26 guided in its vertical movement by guide bars 27. With this arrangement the crosshead is moved in accordance with movement of the elevator car.

The crosshead carries a carriage 28 upon which is mounted mechanism for causing slow-down to begin at a certain distance from the floor for which a call has been picked up and for causing the car to be brought to a stop as it arrives at the floor. The carriage is advanced from a neutral position with respect to the crosshead incident to starting the car. This advance is effected by means of a torque motor which will hereinafter be termed the brush motor and designated BM. The brush motor acts through a chain of gears to rotate a shaft 29. On the end of this shaft is a gear 30 which meshes with a rack 31 to vertically move the carriage either up or down depending upon the direction of rotation of the shaft, thereby advancing the carriage. The brush motor in advancing the carriage also effects the engagement of the contacts of selector switches SLS1, SLS2, SLS3 and SLS4, these switches being operated by cams 32 arranged on shaft 29. If a call is not picked up during the advance of the carriage, the carriage is brought to a stop by one or the other of stopping collars 23. The brush motor then remains energized so that the carriage is thereafter moved with the crosshead until a call is picked up.

The carriage is returned to neutral position by means of pawls 33 which are spring biased to extended position for engaging stopping lugs 34. There are two pawls, one effective for up car travel and the other for down car travel. These pawls are carried by the carriage. A stopping lug is provided for each floor and is arranged on a floor bar 35, these floor bars being arranged on supporting standards for top plate 21 on which they are spaced in accordance with the distance between the floors for which the lugs are provided. An electromagnet is provided for controlling the extension and retraction of the pawls. This magnet, termed a pawl magnet and designated PM, is carried by the crosshead. The pawl magnet has two coils, one an operating coil and the other a reset coil. Upon energization of the operating coil, bell crank levers 36 are pulled upwardly to cause a cam 37 to be extended outwardly to push rollers on the ends of the pawls in a direction to force the pawls into retracted positions. In moving outwardly the cam acts through a link to pull a contact lever clockwise about its pivot to operate a switch having three pairs of contacts, one pair PM1 of which controls the energization of motor BM. Thus the pawls are released from the stopping collar for the floor at which the car is stopped before the brush motor is energized to advance the carriage. The pawl magnet is latched magnetically in operated condition. The pawl magnet and its switch contacts are included in key sheet (Figure 8d) to enable them to be readily located in the wiring diagram.

When a call is picked up, the reset coil of the pawl magnet is energized, releasing cam 37 to permit the pawls to be extended for cooperation with the stopping lug for the floor for which the call is registered and to cause opening of contacts PM1 to effect deenergization of the brush motor. This may occur either during the advance of the carriage, in which event the advance is immediately stopped, or after the carriage has been fully advanced, in which event the carriage remains in advanced condition with respect to the crosshead. In either event the crosshead either in its initial movement as a result of starting the car or in its continued movement moves the carriage the additional amount sufficient to take up the small amount of pawl clearance for the pawl for the direction in which the car is traveling whereupon the pawl engages the stopping lug, bringing the carriage to a stop. The crosshead continues its movement and, due to the relative movement between the crosshead and the carriage, acts through rack 31 and gear 30 to effect the opening of the selector switches SLS4, SLS3, SLS2 and SLS1 in sequence to effect the slow-down and stopping of the car.

A plurality of brushes are carried by a panel on the carriage to cooperate with stationary contacts for the various floors arranged on the floor bars 35. This panel, being advanced with the carriage, will hereinafter be termed the advancer panel. When the car is stopped at a floor, these brushes are in engagement with their cooperating stationary contacts for that floor. Being on the advancer panel, however, the brushes are advanced in starting the car, are latched in engagement with their contacts for a floor by a pawl when a stop is initiated and are maintained in that condition as the advance is taken up as the car comes into the floor. An elongated brush in the form of a cam is also mounted on the advancer panel for engaging hook switches on the floor bars. A pair of switches is also carried by the carriage to be actuated by cams, one for each floor, mounted on the floor bars. Another panel is carried by the crosshead which is moved in synchronism therewith and will hereinafter be termed the synchronous panel. Certain brushes are mounted on this panel for engaging stationary contacts mounted on the floor bars. Also mounted on this panel is a switch actuated by cams, one for each floor, mounted on the floor bars. These brushes, cams, stationary contacts and switches are shown in the wiring diagram. The stationary contacts and hook switches are given general designations and differentiated as to floors by appended numerals and by B in the case of the basement.

Figure 2:
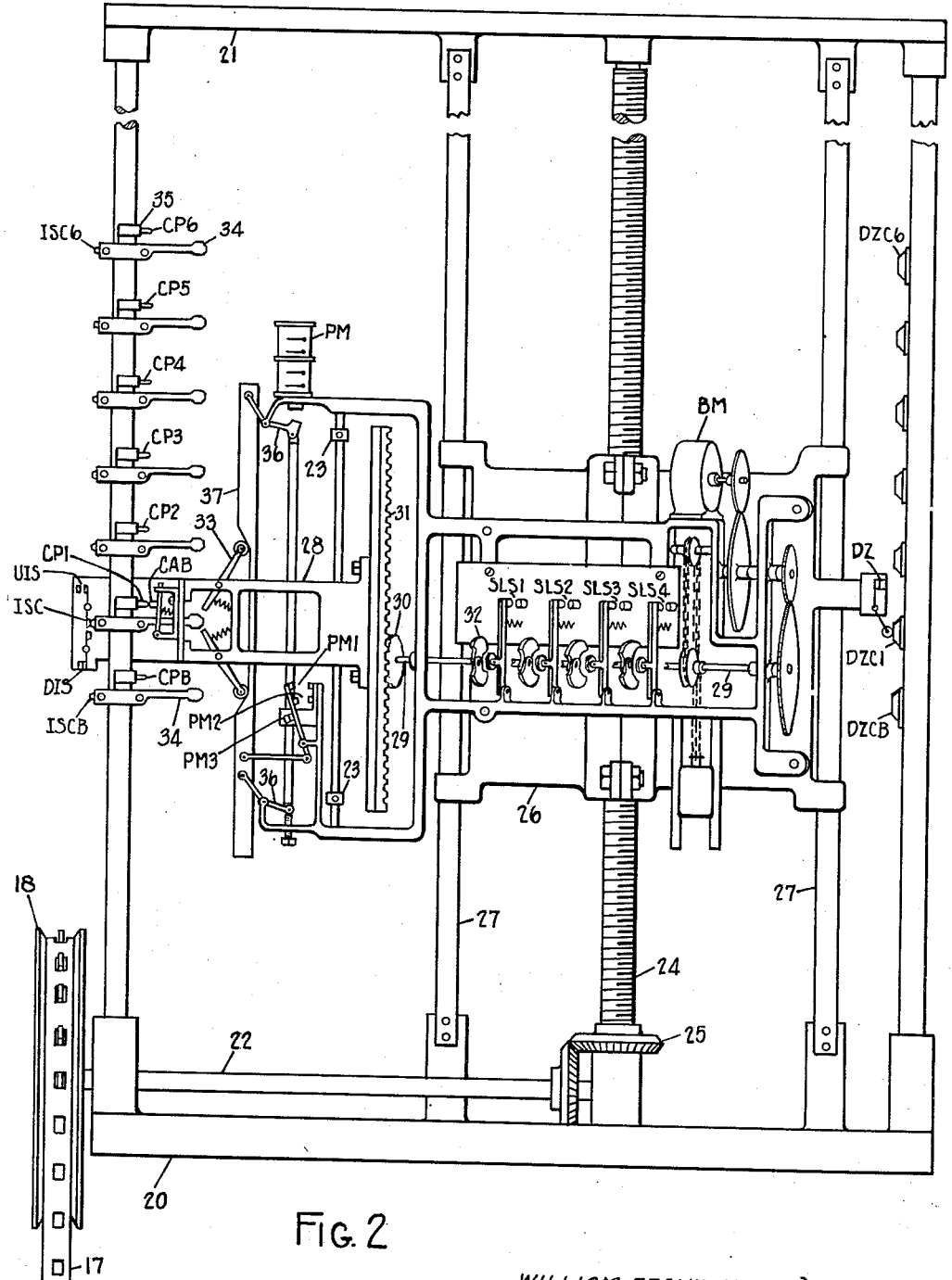
Figure 2 is a schematic representation of the selector machine used in the control system for each of the elevator cars.

Referring first to Figure 6, one brush carried by the advancer panel and the stationary contacts with which it cooperates have to do with the car call pick-up operation. This brush is designated CAB while the stationary contacts which it engages are designated generally as CP. This brush and the stationary contacts with which it cooperates are indicated in Figure 2. This arrangement is the same for each elevator. Two of the brushes carried by the advancer panel and the stationary contacts with which they cooperate have to do with landing call pick-up and automatic call cancelling operations. This brush, for up landing calls is designated UPB while the stationary contacts which it engages are designated generally as UH. The brush for down landing calls is designated DPB while the stationary contacts which it engages are designated generally as DH. This arrangement is the same for each elevator. A pair of brushes carried by the advancer panel and the stationary contacts with which they cooperate have to do with highest landing call circuits. These brushes are designated BUHH and BDHH while the stationary contacts with which they cooperate are designated generally as UHH and DHH respectively. Each of these brushes is mounted on a lever for effecting the separation of contacts when the brush engages a stationary contact, these contacts on the levers being designated UHHC and DHHC. This arrangement is the same for each elevator.

The elongated brush or cam carried by the advancer panel and the hook switches with which it cooperates have to do with the highest car call operation. This cam is designated HCB while the hook switches are designated generally as HC. This cam is of insulating material and is of a length to engage and open a hook switch for any particular floor slightly ahead of the engagement of the call pick-up brushes with the stationary contacts for that floor when the car is travelling in the up direction and to engage and open the hook switch for the floor below such floor slightly ahead of the engagement of the call pick-up brushes with the stationary contacts for such floor when the car is travelling in the down direction. These hook switches are subject to the control of the car buttons and are arranged in series circuit relationship in the highest car call circuit. This arrangement is the same for each elevator.

The selector switches which are carried by the advancer panel for operation by stationary cams are designated UIS and DIS while the cams are designated generally as ISC. These switches are in the circuits of Figure 6 and are for effecting reset of the pawl magnet incident to the stopping operation. These cams and switches are indicated in Figure 2. The arrangement is the same for each elevator.

The wires WU, WD, WHU and WHD which interconnect the selectors connect the corresponding stationary contacts UH, DH, UHH and DHH respectively of the selectors as indicated in Figures 6 and 6c.

Referring now to Figure 5, two additional brushes on the advancer panel are for the hall lantern circuits, one for each direction of travel. The up brush is designated ULB and the down brush is designated DLB. The contacts engaged by brush ULB are designated generally as ULC while those engaged by brush DLB are designated generally as DLC. This arrangement is the same for each elevator.

The switch carried by the synchronous panel to be actuated by cams on the floor bars is for determining the zone of door operation. This switch is designated DZ and the cams which it engages are designated generally as DZC. This switch is shown in Figure 7. Like arrangements are provided for each of the other elevators. Other brushes carried by the panels and their cooperating stationary contacts will be referred to later.

A plurality of throw-over switch motor switches TSOS, one for each car (see Figure 4), is utilized to select either "with attendant" or "without attendant" operation for the respective cars. These switches may be provided on the corridor panel. Each switch acts to control the throw-over switch motor TOM for the car for which the switch is provided. Each of these motors always rotates in the same direction and acts through a plurality of cams to cause the operation of a plurality of throw-over switches TO. Each throw-over switch TO has two operative positions, one for "with attendant" operation and designated "w" and the other for "without attendant" operation and designated "w/o." Limit switches TOL1 and TOL2 act to break the motor circuit when it is rotated from one position to another. Change-over switches COS are also provided in the circuits to illustrate certain differences in operation which may be had.

It is believed that an understanding of the invention will be facilitated by first describing the operation of starting and stopping an elevator car, say car "a" together with the mechanism and circuits employed. The circuits for controlling the starting and stopping of car "a" are shown in Figures 4, 6 and 7. Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. The driving motor for the motor generator set has not been illustrated. It is to be understood that either a direct current or alternating current driving motor may be employed, depending upon the kind of power supply to the building and the character of the installation, and that any suitable control arrangement therefor may be utilized. An exciter is employed to supply current to the separately excited field windings of the supply generator and the elevator motor and to the brake coil and the coils of the various electromagnetic switches of Figure 7. It will be assumed that the exciter is driven by the driving motor for the motor generator set.

The armature of the generator of the motor generator set is designated GAa, its separately excited field winding being designated GFa and its series field winding GSFa. The generator also has a self-excited field winding designated GSEFa. The armature of the elevator motor is designated MAa and its separately excited field winding MFa. A resistance RGFa is provided for controlling the strength of the generator separately excited field and a resistance RSEa is provided for controlling the strength of the generator self-excited field. The armature of the exciter is designated EAa, its self-excited field winding is designated EFa and its series field winding is designated ESFa.

The elevator doors are usually a hoistway door for each car at each floor and a car door (termed a car gate for purposes of detailed description) for each car. The car gate and hoistway doors for each elevator have not been shown. There are two pairs of contacts operated by the car gate, each engaged when the gate is closed. These contacts are designated G1a and G2a. The door contacts operated by the various hoistway doors are arranged in series relation. These contacts are not closed until the doors are closed and locked. For convenience these door contacts are shown as a single pair of contacts designated DCOa. The circuits of car "a" are illustrated for the condition where the car is standing at the main landing which serves as the bottom terminal.

It will be assumed that the car arrived at the main landing travelling in the down direction and with no call for the basement. When the car arrived at that floor, brush ARBa (on the synchronous panel) engaged stationary contact ARCMa and completed a circuit for the coil of main landing switch MLa. This switch operated to engage contacts ML2a, completing a circuit through contacts EY1a and LCS2a, operating coil of direction holding switch DGa and contacts US1a and DS1a as the car was brought to a stop. Switch DG operated and latched itself in operated condition. It will be further assumed that the system was then shut down and that the car was left standing at the first floor with the first floor hoistway door and car gate closed.

It will now be assumed that car "a" is to be operated with an attendant in the car, the throw-over switches TOa being shown in this position designated "w," and that traffic program switch TPS is in position causing the operation of light traffic switch LT. Assume that the driving motor of the motor generator set is started in operation. This is effected by moving key operated switch MGSa on the corridor panel to its up position, causing operation of auxiliary door open switch XDOa. This switch engages contacts XDO2a, completing a circuit for the coil of motor generator switch MGa which operates to start the motor generator set and to engage contacts MG2a to become self-holding. The starting of the motor generator set causes the exciter voltage to build up to full value. As it does the motor field winding MFa is excited. Also, the potential switch CAa operates to engage contacts CA1a and CA2a, its coil being connected across the exciter through contacts MG1a and the contacts of the various safety devices, indicated at SD.

The engagement of contacts CA2a completes a circuit by way of wire W10a through brush HLBa (on the advancer panel) and first floor landing contact HLCa for the coil of home landing relay HLRa, causing this relay to operate. Contacts CA2a also complete a circuit by way of contacts DG2a and DGD1a for the coil of auxiliary up direction switch DGUa and also through contacts HR2a for the coil of auxiliary highest call reversal switch HRXa, causing the switches to operate. The operation of these switches sets the car for upward travel. Also, the engagement of contacts CA2a completes a circuit for the coil of auxiliary time relay ATRa through brush DSBa (synchronous panel), first floor stationary contact DSC1a and contacts BMT1a, HCL2a and DGU4a. Relay ATRa engages contacts ATR3a to complete a circuit for the coil of dispatching removal relay XCSa. Relay XCSa engages contacts XCS4a to complete a circuit for the coil of selection relay SCa through contacts ML7a, HLR5a, SC5b, SC6c and HRX4a, causing this relay to operate. Relay XCSa also engages contacts XCS1a to complete a circuit through non-stop button NSBa and throw-over switch TO7a for the coil of non-stop relay NOa. Relay NOa engages contacts NO5a to complete a circuit by way of contacts PMY3a, HRX6a and SC8a for the up hall lantern UHL1a for the first floor, causing this lantern to illuminate.

The engagement of contacts CA1a causes the field winding DMFa of the door operating motor to become excited. Also the car button magnet CBMa is energized, the circuit being through contacts DGU5a, switch TO16a and contacts DGU7a. Also a circuit is completed for the coil of door open switch DOa, the circuit being by way of door zone switch DZa, contacts XDO1a and F2a, door open limit switch DOLa and contacts E1a. Switch DOa operates to engage contacts DO1a and DO3a, completing the circuit for the armature DMAa of the door operating motor to cause the opening of the door and gate. The mechanism operated by the door operating motor to effect the operation of the door and gate is not shown. As the door and gate start to open, door close limit switch DCL3a closes, causing operation of door limit switch GHa. As the door and gate reach open position, door open limit switch DOLa opens to break the circuit for the coil of switch DOa with the result that this switch drops out to deenergize the door operating motor. Once the door and gate start to open, switch MGSa may be released in which event it will return to neutral. Switch XDOa is maintained energized by way of contacts DO6a and thus switch DOa is maintained energized by way of contacts XDO1a.

The car is now standing at the first floor with its up hall lantern lighted, indicating that it is set for upward travel, and with its door and gate open, indicating its readiness to receive passengers. Assume that passengers enter the car and announce the fourth and fifth floors as their destinations. The attendant then presses car buttons C4a and C5a. The buttons are held pressed by car button magnet CBMa. The pressing of the button C4a for example completes a circuit through rectifier RE5a, switches HC4a and HC5a and contacts DGU1a for the coil of highest car call switch HGa. Switch HGa operates to engage contacts HG2a, completing a circuit for the coil of highest landing call switch HJa.

To start the car, start button SBa is pressed, completing a circuit for the coil of starting relay SRa. This relay operates to engage contacts SR1a and SR2a, completing a circuit through contacts SH1a, switch TO12a and contacts EY2a for the operating coil of pawl magnet PMa. The pawl magnet operates to release the pawls, engaging contacts PM1a and PM2a, separating contacts PM3a and latching itself in operated condition. The engagement of contacts PM1a completes a circuit by way of contacts SR5a and switch TO15a for the coil of pawl magnet relay PMYa. Relay PMYa operates to separate contacts PMY3a, extinguishing the up hall lantern at the first floor. It also engages contacts PMY2a, completing a circuit for brush motor BMa. This circuit is through contacts HJ4a and PMY2a, field winding BMF1a, and field winding BMF2a and armature BMAa connected in parallel by contacts DGU6a. This results in the operation of the brush motor to advance the carriage in the up direction. During this advance, selector switches SLS1a, SLS2a, SLS3a and SLS4a close, preparing certain circuits and causing operation of auxiliary speed switch EYa, by completing the circuit for its coil at contacts SL2a. Switch EYa is provided to insure certain control operations being dependent on the advance of the advancer panel.

Contacts SR1a also complete a circuit through contacts SH1a and DO4a and door close limit switch DCL1a for the coil of door close switch DCa. Switch DCa engages contacts DC1a and DC2a, completing a circuit for door motor armature DMAa. This causes operation of the door motor to close the door and gate. Thus, the door closing operation takes place as the carriage is advanced. Should the start button be released before the door and gate reach closed position, a circuit is completed by way of contacts GH1a, button DCB2a, contacts XDC2a and SR4a for the coil of door open switch DOa to effect the reopening of the door and gate. Assuming the start button is held pressed, upon the door and gate reaching closed position, limit switch DCL1a opens the circuit for the coil of switch DCa which drops out to break the circuit for the door motor armature. Also switch DCL3a breaks the circuit for the coil of switch GHa.

As the door and gate reach closed position, a circuit is completed for the coils of field and brake switch Ha and up directions switch USa. This circuit is through contacts SR5a, gate contacts G1a, door contacts DCOa, selector switch SLS1a, contacts DGU3a, terminal stopping switch SS5a, contacts DS4a and coils USa and Ha. Switch Ha, upon operation, engages contacts H2a and H4a to by-pass contacts SR1a and SR5a, enabling the start button to be released. It also engages contacts H5a which, together with the engagement of contacts US5a and US6a as a result of the operation of up direction switch USa, completes a circuit for the generator direction field winding GFa. The engagement of contacts H5a and US7a completes a circuit for the brake release coil BRa. As a result of the energization of field winding GFa, current is supplied from generator armature GAa to hoisting motor armature MAa, and the brake being released as a result of the energization of the brake release coil, the car is started in the up direction.

Switch Ha, upon operation, also separates contacts H6a and H8a to disconnect generator self-excited field winding GSEFa from across the generator armature and engages contacts H7a to connect winding GSEFa across the armature in a different circuit. This circuit is from the left-hand side of the generator armature through series field winding GSFa, rectifier RE11a, contacts US8a, resistor RSEa, winding GSEFa and contacts H7a to the right-hand side of the generator armature. The polarity is such that the self-excited winding acts to assist the separately excited winding in exciting the generator.

Switch Ha also engages contacts H1a completing a circuit through switch SS2a, contacts DS2a and switch SLS4a for the coil of speed switch Ea, and a circuit through switch SLS3a, switch SS4a and contacts DS3a for the coil of second speed switch Fa. Switch Fa engages contacts F1a to complete a circuit through contacts H2a for the coil of operating switch sequence relay SHa. Switches Ea and Fa also engage contacts E2a and F3a to increase the strength of the separately excited field winding and engage contacts E3a and F4a to increase the strength of the self-excited field winding. The net result is that the separately excited field winding dictates the polarity of generator excitation and the generator voltage is built up to full value by self-excitation, bringing the elevator car up to full speed.

For convenience, only the stop in response to the fourth floor car button will be described. As the car approaches slow down distance from the fourth floor and prior to the engagement of brush CABa with contact CP4a, up stop initiating switch UISa is opened by cam ISC4a. Shortly after brush CABa engages contact CP4a, switch UISa runs off the cam and closes, completing a circuit for the reset coil of pawl magnet PMa through button C4a, contact CP4a, brush CABa, switches DISa and UISa, reset coil PMa, and contacts PM2a and EY4a. This rests the pawl magnet, releasing the pawls and causing the separation of contacts PM1a and PM2a and engages contacts PM3a. The separation of contacts PM1a breaks the circuit for the coil of relay PMYa. This relay drops out to separate contacts PMY2a, deenergizing brush motor BMa. Also, contacts PMY3a engage, completing a circuit through contacts NO5a and HRX6a and brush ULBa now in engagement with contact ULC4a, for the fourth floor up hall lantern UHL4a to indicate that a stop is to be made at the fourth floor.

As the car and therefore the crosshead move upwardly, the up pawl engages the fourth floor stop collar, bringing the carriage to a stop. In this position switch DISa is opened by the cam. Continued movement of the crosshead causes the opening of selector switches SLS4a, SLS3a, SLS2a and SLS1a in the order named as the car comes into the floor. The opening of switch SLS4a breaks the circuit for the coil of switch Ea. Switch Ea drops out separating contacts E2a and E3a to insert a step of resistance RGFa in circuit with generator field winding GFa and a step of resistance RSEa in circuit with generator self-excited field winding GSEFa. This decreases the generator voltage, causing slow down of the car. The opening of switch SLS3a as the car continues toward the floor breaks the circuit for the coil of switch Fa. This switch drops out to separate contacts F3a and F4a to insert further resistance in circuit with the generator field windings GFa and GSEFa, causing further slow down of the car. The opening of selector switch SLS2a breaks the circuit for the coil of switch EYa, the purpose of which will be explained later.

The opening of selector switch SLS1a, which occurs when the car arrives at the landing, breaks the circuit for the coils of switches USa and Ha. The resultant separation of contacts H5a and US1a deenergizes brake release coil BRa and the separation of contacts H5a, US5a and US6a breaks the circuit for the generator field winding GFa. Also, the separation of contacts US8a and H7a disconnects the generator self-excited field winding GSEFa from across the generator armature. The net result is the discontinuance of the excitation of the generator and the application of the brake to bring the car to a stop at the fourth floor landing. The engagement of contacts H6a and H8a reconnects the self-excited field winding across the generator armature with reverse polarity, substantially to destroy the residual flux of the generator field.

As the car arrives within a short distance of the fourth floor landing and slightly ahead of the opening of selector switch SLS1a, door zone switch DZa closes to complete a circuit through contacts XCS3a, switch TO14a, contacts SH4a and F2a, limit switch DOLa and contacts E1a for the coil of door open switch DOa. This switch operates as above described to complete the circuit for the armature DMAa of the door operating motor, initiating the opening of the fourth floor hoistway door and car gate before the car comes to a stop. As before, when the door and gate reach open position, switch DOa is deenergized by the opening of switch DOLa. With the door and gate open, the passenger leaves the car.

Should the start button SBa not be released, switch SHa prevents immediate reclosing of the door and gate and starting of the car. Under such conditions, the circuit for the coil of switch SHa is maintained through contacts SH2a and SR1a. Thus contacts SH1a remain separated, preventing the energization of the coil of door close switch DCa and also preventing the energization of the operating coil of pawl magnet PMa. Thus the start button must be released before it becomes effective to close the door and gate and restart the car.

Similar operation is had in response to landing buttons. Assume that before the attendant presses start button SBa to start the car in the up direction from the main landing, an intending passenger at the second floor touches up landing button U2. It is to be noted that the anode-cathode circuit of the tube of each landing button is from line B+ through the tube and load resistance to line B. The direct current voltage thus applied to the tube is not sufficient to break down the tube. However, upon an intending passenger touching the landing button, a circuit is established from ground GR through the secondary of transformer TF to line B which is connected through line B+ to the anode of the tube and thence from the tube envelope by way of the body of the intending passenger back to ground. As a result, sufficient alternating current voltage is applied between the anode and the tube envelope to break down the tube. When the tube fires, it becomes illuminated to indicate that the landing call is registered.

Assume now that the start button is pressed to initiate the starting of the car. Upon the engagement of brush UPBa with contact UH2a, a circuit is completed which connects the coil of auxiliary stop relay HSa across the loading resistance RUL2, the circuit being from the left-hand side of resistance RUL2 through contact UH2a, brush UPBa, contacts HRX1a, coil HSa, rectifier RE6a, contacts NO6a, resistor R23a to line B back to the right-hand side of resistor RUL2. The potential drop across resistor RUL2 applied to coil HSa is sufficient to operate this relay. Upon operation relay HSa engages contacts HS2a which causes operation of landing stop time switch HSXa. This switch engages contacts HSX1a which, together with the closing of switch UISa which takes place immediately thereafter, completes a circuit for the reset coil of pawl magnet PMa. This causes the car to be slowed down and stopped at the second floor, the up hall lantern to be lighted at the second floor and the second floor hoistway door and car gate to be opened, in the manner previously described.

Relay HSa, upon operation, also engages contacts HS1a. Thus upon the engagement of contacts PMY4a as a result of the reset of the pawl magnet, a circuit is completed from the tapped point of the secondary of transformer TF through rectifier RE4, by way of line AC1, through contacts PMY4a, EY8a, NO6a and HS1a, rectifier RE1a, contacts HRX1a, brush UPBa, and contact UH2a to the cathode of the tube of button U2. Rectifier RE4 passes the positive halves of the alternating current cycle, thus raising the potential of the cathode with respect to the anode. This reduces the voltage across the tube to below sustaining value, pulsing out the tube. Thus the up landing call at the second floor is automatically cancelled as soon as the call is picked up and the pawl magnet reset. This prevents this call being also answered by another car. Relay HSa drops out incident to the cancelling of the call. Rectifier RE6a blocks the flow of current from line AC1 through the coil of relay HSa upon the engagement of contacts PMY4a preventing relay HSa being held in or reoperated.

The car is started in the down direction in a manner similar to that described for starting it in the up direction. To set the car for downward travel, direction holding switch DGa is reset and auxiliary down direction switch DGDa is operated. It will be assumed that this operation is effected at the top terminal. As the car reaches the top terminal, brush ARBa engages contact ARCTa and upon the reengagement of contacts US1a as the car comes to a stop, a circuit is completed through contacts DG1a for the reset coil of switch DGa causing the separation of contact DG2a and the engagement of contacts DG3a. This results in the dropping out of switches DGUa and HRXa and the operation of switch DGDa, causing the car to be set for travel in the down direction. Incident to this operation contacts DGU5a and DGU7a separate to break the circuit for car button magnet CBMa to release any operated car buttons, this circuit being re-established by the engagement of contacts DGD3a and DGD5a. Also, contacts DGD5a complete a circuit for the coil of highest call light switch HLSa.

With the car set for downward travel, upon operation of the start button a circuit is completed through contacts HLS2a, SH5a and PMY2a for the brush motor BMa. This circuit is through field winding BMF1a and armature BMAa, connected in parallel by contacts DGD4a, and field winding BMF2a, moving the advancer panel downwardly instead of upwardly. The circuit for the coils of switches Ha and DSa is through the contacts DGD2a and terminal stopping switch SS6a, the circuit for the coil of switch Ea is through switch SS1a and contacts US2a and the circuit for the coil of switch Fa is through switch SS3a and contacts US3a. The circuit for generator field winding GFa is through contacts DS5a and DS6a so that the excitation of the generator is opposite to that previously described, causing the car to be started in the down direction instead of the up direction. The circuit for the self-excited field winding GSEFa is through contacts DS8a and rectifier RE12a. It is believed that the remainder of the starting operation will be understood from the description given of starting the car in the up direction.

During upward travel of the car, stops are made in response to calls registered by car buttons and up landing buttons for floors above the car in the order in which the floors are reached by the car, regardless of the order in which the calls are registered. Similarly, during downward travel of the car, stops are made in response to calls registered by car buttons and down landing buttons for floors below the car in the order in which the floors are reached by the car, regardless of the order in which the calls are registered. It is believed that stops in response to car calls during downward travel will be understood from the previous description inasmuch as when a car button is pressed it is maintained operated by the car button magnet CBMa so that upon the engagement of brush CABa with the contact rendered "alive" by this button and the operation of switch DISa, the reset coil of the pawl magnet is energized, and the car is caused to slow down and come to a stop at the floor. Similarly, each down landing call remains registered until the contact DHa rendered "alive" thereby is engaged by brush DPBa to pick up the call, brush DPBa being rendered effective for downward travel of the car by contacts HRX2a. This causes the pawl magnet to drop out, the call to be cancelled and the car to be slowed down and brought to a stop at the floor for which the call was registered. When a stop is to be made at a floor during down car travel, the down hall lantern at that floor is lighted upon the reengagement of contacts PMY3a, the circuit being through contacts HRX5a and brush DLBa in engagement with its stationary contact DLCa for the floor at which the stop is to be made.

If no car call or down landing call is registered for the main landing, the car is automatically stopped at the main landing on its downward trip, provided no car call is registered for the basement. The stop is initiated by the engagement of brush CABa with contact CP1a, rendered alive through throw-over switch TO11a and contacts LCS3a. As the car comes to a stop it becomes set for travel in the up direction as previously described. Should there be an up landing call for the main landing, this call is automatically cancelled as a result of the engagement of contacts HRX1a upon the change in direction of car travel. If the basement car button CBa (Figure 3) has been pressed a circuit is completed through switch TO3a for the coil of lowest call switch LCSa, causing this switch to be operated. Switch LCSa separates contacts LCS3a in the circuit to contact CP1a so that a stop is not made at the main landing unless in response to a car call or a down landing call. Also contacts LCS2a are separated, preventing changing the direction of car travel if the car stops at the main landing in response to a car call or down landing call.

Assuming no car call or down landing call for the main landing, the car continues past that floor and is brought to a stop at the basement. The stop is initiated upon the engagement of brush CABa with contact CPBa and the direction of car travel is changed as the car comes to a stop, the circuit being through contact ARCBa and brush ARBa. If a stop be made at the main landing with button CBa pressed, the car continues to the basement in response to the pressing of start button SBa after the stop at the main landing. In either event, all car buttons are released when the change of direction is effected.

If a stop is made at the main landing under conditions where the basement car button is not pressed and an entering passenger announces the basement as his destination, the attendant may press basement car button CBa which causes the operation of switch LCSa and thus, through the separation of contacts LCS2a and the engagement of contacts LCS1a, changes the direction of car travel back to down.

Should an intending passenger at the basement touch landing button UB, a basement landing call is registered. This causes operation of up basement relay FU, the coil of which is connected across loading resistor RULB. If a car, say car "a," is at the main landing at this time the engagement of contacts FU1a completes a circuit through switch TO5a, and contacts HG5a, ML6a, HLR3a, BF2b and BF3c for the coil of relay BFa. Relay BFa operates to engage contacts BF1a, lighting the basement service light BSLa. The attendant in car "a" presses button CBa, causing operation of switch LCSa to effect changing of car direction back to down. Thus upon the pressing of the start button in car "a," the car is started down to the basement to answer the basement call. If no car be at the main landing when the basement landing call is registered, the first car to approach the main landing on its downward trip, say car "a," causes engagement of contacts HLR3a to complete a circuit through contacts DGD7a, BF2b, BF3c and FU1a for the coil of relay BFa. This relay engages contacts BF1a to cause lighting of basement service light BSLa. The attendant presses the basement car button CBa to cause operation of switch LCSa, causing the direction to be maintained set for down and thus, after the stop at the main landing, the car to be started in the down direction upon the pressing of start button SBa.

Whenever the car travels to the basement, a stop is made at the main landing on the subsequent upward trip, the stop being initiated by the engagement of brush CABa with contact CP1a rendered alive through contacts LCS3a and also by the engagement of brush UPBa with contact UH1a if an up call is registered for the main landing. The up call is automatically cancelled as the call is picked up. Thus when an up call at the main landing is in registration ahead of the car on its downward trip it is not automatically cancelled when the car travels to the basement until it stops at that landing on the trip up from the basement. However, should the basement car button not have been operated, the up call for the main landing is automatically cancelled as the car comes to a stop at that landing on its downward trip and the direction of travel is changed, as previously described.

When the car becomes filled to capacity, nonstop button NSBa is pressed, deenergizing nonstop relay NOa. This relay drops out to separate contacts NO6a, rendering brushes UPBa and DPBa ineffective to pick up landing calls. The car buttons, however, are unaffected by the nonstop button and stops are made to discharge passengers. Relay NOa also separates contacts NO5a to prevent the lighting of the hall lanterns.

So far operation of but one car has been described. The operation of the other elevators, in so far as starting the car and responding to calls is concerned, is the same as that of elevator "a." Each of the other cars responds to its own car buttons and also answers landing calls, the particular car answering any particular landing call being the first one set for travel in the direction corresponding to the call registered whose call pick-up brush for that direction of travel engages its stationary contact corresponding to the hall button pressed.

The manner in which the operation of the cars is coordinated is determined by the setting of traffic program selector switch TPS. It has already been assumed that this switch is set in position for light traffic, causing light traffic switch LT to be in operated condition. For convenience, this assumption will be continued.

When the system is set for light traffic conditions, all cars park at the main landing. One or more cars may be in service under such conditions. For convenience, it will be assumed that all three cars are in service. Under such conditions, one of the cars is selected for dispatching. Assume that car "a" was the first to arrive at the main landing. As it did so, its relay SCa was operated as a result of the operation of relays HLRa, ATRa and XCSa and switches HRXa and MLa as previously described. This selected car "a." As a result, up hall lantern UHL1a at the main landing is lighted, as previously described, and loading light LLa is also lighted, it being connected in parallel with lantern UHL1a. Thus both intending passengers and the car attendant are advised that car "a" is the next "up" car. Relay SCa also separates contacts SC5a and SC6a to prevent selection of the other cars. The attendant for the selected car allows the door and gate to remain open. Each of the other cars may park at the main landing with its door and gate closed, as by the attendant pressing its door close button DCB. The closing of contacts DCB1a by-passes contacts SR1a to complete a circuit for the coil of the door close switch. The opening of contacts DCB2a prevents the completion of a circuit for the coil of the door open switch. Had car "a" been standing at the main landing with its door and gate closed, upon being selected the attendant may open the door and gate by pressing door open button DOBa which completes a circuit for the coil of switch XDOa.

Assume that a landing call, say a down call for the fourth floor, is registered. This causes operation of down call relay HJD for each car. The circuit for car "a" for example is from the left-hand side of loading resistance RDL4, rectifiers RED4, REH3, REH2, contact DHH1a, brush BDHHa, rectifier REHJa, coil of relay HJDa, resistance R25a, wire B, to the right-hand side of resistor RDL4. All of relays HJD operate, completing a circuit through contacts HJD1a, HJD1b and HJD1c for the coil of auxiliary down call relay HJDX. This relay engages contacts HJDX1a, HJDX1b and HJDX1c, completing circuits for the coils of relays HJa, HJb and HJc respectively. These relays respectively engage their HJ3 contacts. The engagement of contacts HJ3a completes a circuit for the coil of up dispatching relay HCLa, this circuit being through contacts UP3a, SU1b, SU2c, HJ3a and SC3a, coil HCLa and contacts HRX3a. Relay HCLa engages contacts HCL4a to become self-holding. It also engages contacts HCL3a to complete a circuit for up dispatching light UDLa and through contacts HLS3a for up dispatching gong UGNa. Contacts HLS3a are engaged because the circuit for the coil of highest call light switch HLSa is completed by contacts HLR2a.

The attendant, having received the signals to start the car, presses the start button. This, extinguishes the hall lantern, closes the door and gate and starts the car in the up direction as previously described. As the carriage advances incident to the starting of the car, brush HLBa runs off contact HLCa, breaking the circuit for the coil of relay HLRa. This relay drops out separating contacts HLR2a to break the circuit for the coil of switch HLSa and thus for gong UGNa. It engages contacts HLR4a to complete a circuit for the operating coil of spacing relay SUa. This relay engages contacts SU5a to complete a circuit for its holding coil. It also separates contacts SU1a and SU2a to prevent operation of relay HCL for each of the other cars. Relay HLRa also separates contacts HLR5a to break the circuit for the coil of relay SCa. This relay drops out to engage contacts SC5a and SC6a, enabling another car to be selected. Assuming this to be car "c," the circuit is through contacts XCS4c, ML7c, HLR5c, SC5a, SC6b, coil SCc and contacts HRX4c. This selects car "c" as the next to be dispatched, lighting its up first floor hall lantern and loading light.

Once brush BDHHa leaves contacts DHH1a incident to starting the car, and while this brush is not in engagement with a contact for a floor above, the circuit for the coil of relay HJDa is maintained through contacts HJD3a, resistor R18a and contacts DHHCa. Upon the engagement of brush BDHHa with fourth floor contact DHH4a, the circuit for the coil of relay HJDa is broken, as contacts DHHCa are separated and there is no down call above. The resultant dropping out of relay HJDa breaks the circuit for the coil of relay HJDX which drops out to separate contacts HJDX1a. Inasmuch as no car call for car "a" or up landing call has been assumed, contacts HG2a and XHJ1a are separated so that the separation of contacts HJDX1a breaks the circuit for the coil of switch HJa. This switch drops out to engage contacts HJ2a, completing a circuit for the coils of highest call reversal switch HRa and down dispatching relay DDRa. This circuit is through contacts DTR1a, HJ2a, PMY1a and HLS1a. Switch HRa operates to engage contacts HR5a, completing a circuit upon the reclosing of switch UISa for the reset coil of the pawl magnet. This causes the car to be slowed down and brought to a stop at the fourth floor. Also, switch HRa separates contacts HR2a to break the circuit for the coil of switch HRXa. This switch in turn separates contacts HRX6a and engages contacts HRX5a to cause the down hall lantern DHL4a to be lighted instead of the up hall lantern. It also separates contacts HRX1a rendering brush UPBa ineffective and engages contacts HRX2a rendering brush DPBa effective, causing the operation of relay HSa and as a result the automatic cancellation of the down fourth floor call. Also, it separates contacts HRX3a, breaking the circuit for the coil of relay HCLa which in turn separates contacts HCL3a to discontinue the lighting of light UDLa. At the same time, the operation of relay DDRa causes contacts DDR4a to engage to complete a circuit for down dispatching light DDLa and gong DGNa. Switch HRa also engages contacts HR1a so that as the car comes to a stop a circuit is completed for the reset coil of switch DGa, causing the car to become set for downward travel. Thus, upon pressing of the start button, the car is started in the down direction and in the absence of further calls continues to the main landing where it is brought to a stop as previously described. Incident to the car becoming set for downward travel as above set forth, the completion of the circuit for the coil of switch HLSa by the engagement of contacts DGD6a results in the separation of contacts HLS1a to break the circuit for the coil of switch HRa. In dropping out, switch HRa separates contacts HR4a to break the circuit for the coil of relay DDRa, causing the lighting of the down dispatching light to be discontinued.

Should a car, say car "a," travel to the top terminal, the circuit for the coil of top spacing relay SCTa is completed by the engagement of brush SCBa (on the synchronous panel) with contact SCCa. Relay SCTa operates to engage contacts SCT2a to cause the lighting of the down hall lantern DHL6a. Loading light DLLa is also lighted but this light may be omitted. Relay SCTa also separates contacts SCT3a and SCT4a, preventing the operation of relays SCT for the other cars, should either of them arrive at the top terminal before car "a" leaves.

Assume now that, after car "a" becomes set for downward travel and before it returns to the main landing, a landing call is registered which this car will not answer on this trip. According to the circuits illustrated, this may be a down landing call for a floor above car "a" or an up landing call for any floor above the main landing as the cars do not respond to such up calls on their down trips. Assume that an up landing call is registered for the second floor. This causes operation of auxiliary highest call switch XHJc of the now selected car which in turn engages contacts XHJ1c to complete a circuit for the coil of switch HJc. Inasmuch as car "a" is set for downward travel contacts SU1a are engaged and as car "b" is at the main landing contacts SU2b are engaged. Thus with contacts SC3c engaged because car "c" is selected, the operation of switch HJc to engage contacts HJ3c causes operation of relay HCLc which causes in turn dispatch signals to be given for car "c" as previously described. Had the call been a down landing call above car "a," all the HJD relays would be operated as the call under the assumed conditions is above the other two cars, causing the operation or relay HJDX to cause the giving of the dispatch signals to car "c" as previously described. Should car "a" be non-stopped on its way down, contacts NO1a by-pass contacts HJD1a so that a down call which is registered can be below car "a" and effect the giving of the dispatch signals to car "c."

Incident to the starting of car "c" from the main landing, car "b" is selected as the next to leave, its relay SCb becoming operated as a result of the dropping out of relay HLRc as previously described. Thus upon car "c" being set for downward travel and the registration of a down landing call above both cars "a" and "c" or an up landing call above the main landing, the dispatching signals are given to car "b" and that car is started in the up direction. Each car returns to the main landing after answering its highest call.

Assume that a passenger enters a car at the main landing and calls a floor above. This will be the selected car if two or more cars are parked at the main landing as the up hall lantern for the selected car will be the only one lighted and as the attendants in the other cars, should they choose to park with their doors and gates open, can direct intending passengers to the selected car. Assuming car "a" to be the selected car, the pressing of a car button in this car for a floor above the main landing causes operation of switch HGa and in turn switch HJa as previously described. Provided each of the other cars is either set for downward travel or at the main landing, switch HJa causes operation of relay HCLa and thus the giving of the dispatch signals to car "a." As the car answers this call and prior to the engagement of brush CABa with the stationary contacts for floor for which the call is registered, switch HGa is dropped out by the opening of switch HCa for that floor by cam HCBa. Assuming no landing calls above, this drops out switch HJa which causes operation of switch HRa and thus the car to become set for downward travel as the stop is made. Switch HGa is dropped out ahead of the engagement of brushes UPBa and DPBa to insure the lighting of only the down hall lantern as the stop is made.

It will be seen from the above examples that a selected car at the main landing is given its dispatching signal, provided each of the other cars is either set for downward travel or at the main landing, when a car call is registered for that car, when a down call is registered above all such cars or when an up call is registered for a floor above the main landing. Such calls may be termed spacing calls. This condition also obtains should one of the cars be below the main landing as its relay SU is not operated.

When a stop is made in response to an up landing call under conditions where no higher calls for that car exist, up direction of car travel is maintained as the intending passenger has indicated by the call registered that he wishes to be carried in the up direction. This is effected by the control of switches XHJ. When the highest call is an up landing call for the fourth floor for example, when this call is answered, say by car "a," this call maintains a circuit for the coil of switch XHJa when contact UHH4a is engaged by brush BUHHa. This maintains switch HJa operated until switch HSa is operated to effect reset of the pawl magnet and thus deenergization of relay PMYa to in turn effect cancellation of the call. Upon the cancellation of the call, switch XHJa is deenergized to separate contacts XHJ1a and thus break the circuit for the coil of switch HJa. The resultant reengagement of contacts HJ2a does not complete a circuit for the coil of switch HRa as contacts PMY1a are already separated. Therefore contacts HR1a are maintained separated, preventing the reset of switch DGa and thus maintaining the car set for upward travel. Should a passenger enter the car and call a floor above, the pressing of a car button for such floor causes reoperation of switch HJa to separate contacts HJ2a and thus maintain switch HRa deenergized. Therefore, upon pressing the start button SBa the car is restarted in the up direction. The same is true if a landing call is registered for a floor above, provided this takes place before the start button is pressed.

Should no one enter the car when a stop is made in response to an highest up call and thus no car button be pressed for a floor above and should no landing call be registered for a floor above, the direction of car travel is changed to down upon the attendant pressing the start button to start the car. Assume such condition with respect to car "a." Upon pressing button SBa, relay SRa operates, engaging contacts SR3a to complete the circuit for the coils of switch HRa and relay DDRa through contacts DTR1a, HJ2a, SH3a and HLS1a. The resultant engagement of contacts HR3a completes a circuit through contacts SR1a and EY3a for the coil of relay SHa. The resultant separation of contacts SH3a does not break the circuit for the coil of switch HRa and relay DDRa as they are maintained energized by way of contacts HR4a. The closing of the door and gate is prevented by the separation of contacts SH1a while the advance of the carriage is prevented by contacts HJ4a and SH5a being separated. Switch HRa engages contacts HR1a to cause the car to be set for downward travel as previously described. Also relay DDRa engages contacts DDR4a to cause lighting of down dispatch light DDLa and the sounding of gong DGNa. The attendant then releases the start button, permitting the dropping out of relay SHa. Switch HRa also separates contacts HR2a effecting the dropping out of switch HRXa with the result that up hall lantern brush ULBa is rendered ineffective and down hall lantern brush DLBa is rendered effective, causing the extinguishing of the up hall lantern UHL4a and the lighting of down hall lantern DHL4a. Thus, should there be an intending passenger at the fourth floor, wishing to be carried down, he is advised that the car is now set for downward travel and can enter the car. Also, had he registered a down call for the fourth floor, the rendering of brush DPBa effective by the engagement of contacts HRX2a causes the operation of relay HSa to effect the automatic cancellation of the call. Upon repressing start button SBa, the car is started in the down direction. The same operation is had where a stop is made in response to a car button under conditions where a landing call is in registration for a floor above and this call is answered by another car so that, at the time the attendant presses the start button, no call is in registration for a floor above.

Any car on its downward trip that has its basement car button CB pressed is caused to travel to the basement as it causes switch LCS for that car to be operated, preventing stopping of the car at the main landing unless its car button for the main landing is pressed or it answers a down landing call for the main landing. If such stop is made, relay LCS prevents reversal of the direction of car travel. All this has been previously explained. If two or more cars are parked at the main landing, the pressing of the basement car button in any car causes operation of switch LCS for that car to change the direction of travel to down. Should the car in which the basement car button is pressed be the car selected for upward travel, say car "a," its selection relay SCa is dropped out as a result of the separation of contacts HRX4a incident to the change of the direction to down. Thus another car is selected for upward travel.

When a basement landing call is registered under conditions where all cars are above the main landing, the first car, say car "a," to approach the main landing and engage contacts HLR3a completes a circuit through contacts FU1a for the coil of basement service relay BFa. The operation of relay BFa selects car "a" to answer the basement call. Upon operation, it separates contacts BF2a and BF3a to prevent operation of relays BFb and BFc in response to this call, thus obviating the selection of either car "b" or car "c" to answer this basement landing call. Also relay BFa engages contacts BF1a to effect the lighting of basement service light BSLa. Thus the attendant observing this light presses the basement car button CBa, causing operation of switch LCSa to change the direction of car travel back to down and when the attendant presses the start button the car travels to the basement. Should one or more cars be at the main landing when the basement landing call is registered, relay BF for but one of them, say car "a," is operated, selecting that car to answer the basement landing call. When with no car at the main landing and a basement landing call registered the basement car button in a car is pressed before that car arrives at the main landing or if a car is at the main landing and its basement car button is pressed before the basement landing call is registered, it causes the operation of relay LCS for that car, say car "a," which in turn by the engagement of its contacts LCS4a completes a circuit for relay BFa. This relay operates as above described to separate contacts BF2a and BF3a, preventing the operation of relays BFb and BFc in response to the basement landing call, thus selecting car "a" to answer the basement landing call. Basement operation under "with attendant" operation is the same for all traffic conditions.

Assume now a period in which the traffic is substantially all in the up direction, as during the morning peak. For such condition, traffic program selector switch TPS is set in position to complete the circuit for the coil of up peak traffic switch UP. This switch operates to separate contacts UP3 and engage contacts UP4 in the circuits of each elevator, rendering the circuits for giving immediate dispatching signals to other cars in response to spacing calls ineffective and rendering these signals subject to timing operations for up dispatching. It also engages contacts UP1 and UP2 in the timing circuits, contacts UP2 connecting the coil of up time relay UTR subject to an adjustable portion of resistor RUT to give the desired timing interval for up dispatching under up peak traffic conditions, this interval being the optimum loading time for the particular installation, say twenty seconds.

With the system set up for peak traffic conditions, the selected car at the main landing at the time the previous car left is given its dispatching signals upon the expiration of the given timing interval after the departure of the previous car or the registration of a call to which the car is subject, whichever occurs later. Assume all three cars at the main landing with car "a" selected. Under such conditions a circuit is completed for the coil of relay UTR through contacts SC1a, HJ1a and UP1, rectifier RE1, contacts UP2 and a portion of resistor RUT.

As under light traffic conditions, the doors and gates remain open unless the attendants close them. Assume now that passengers have entered the selected car, calling for stops at floors above. Upon the attendant pressing a car button for a floor above, a circuit is established for the coil of switch HG$a$ which engages contacts HG2$a$ to complete a circuit for the coil of switch HJ$a$. This switch operates to separate contacts HJ1$a$, breaking the energizing circuit for the coil of relay UTR. Relay UTR is delayed in dropping out for the timing interval by the discharge of condenser Q1 into its coil, thus enabling the car to receive further passengers before being given its dispatching signals. When this interval has expired, relay UTR engages contacts UTR1$a$, completing a circuit for the coil of relay HCL$a$ through contacts UP4$a$, HT1$a$, SC3$a$ and HRX3$a$. Relay HCL$a$ causes the up dispatching signals to be given to car "$a$." It also engages contacts HCL1$a$ to reestablish, by way of contacts SC1$a$, timing control switch HTC$a$ and contacts ML1$a$, the circuit for the coil of relay UTR.

The dropping out of relay HLR$a$ incident to the starting of the car enables another car to be selected as previously described. Assuming this to be car "$b$," the resultant engagement of contacts SC1$b$ establishes another circuit for the coil of relay UTR, assuming no call is registered which would cause contacts HJ1$b$ to be separated.

Thus as contacts SC1$a$ separate incident to the selection of car "$b$," the coil of relay UTR is energized by another circuit.

Assume that passengers enter car "$b$" and that car calls are registered for floors above. This causes the separation of contacts HJ1$b$ to break the energizing circuit for the coil of relay UTR and after expiration of the timing interval contacts UTR1$b$ engage to complete the circuit for the coil of relay HCL$b$. This causes the up dispatching signals to be given to car "$b$" and the reestablishment of the energizing circuit for the coil of relay UTR.

Incident to the starting of car "$b$," car "$c$" is selected. Assuming that contacts HJ1$c$ are in engagement, a new circuit for the coil of relay UTR is established through contacts SC1$c$ incident to the selection of car "$c$." Upon the registration of a car call in car "$c$," contacts HJ1$c$ separate, starting the timing interval. When this interval expires, car "$c$" is given its up dispatching signals and the attendant starts the car in the up direction.

Thus it is seen that under up peak conditions, when the only traffic is incoming traffic at the main landing, each car when selected is dispatched upon the expiration of loading time after the registration of a car call in that car. Each car upon reaching its highest call becomes set for travel in the down direction as previously explained. Also it receives its down dispatching signals immediately as a result of operation of its relay DDR. Having received the dispatching signals, the attendant, upon discharging his last passenger, immediately presses his start button and the car is started in the down direction. Thus upon answering its highest car call, each car is returned to the main landing without waiting for a dispatching interval.

After the building has become somewhat populated, some interfloor traffic may arise. Assume for example that after a previously selected car has received its up dispatching signals and its start button is pressed, a landing call is registered to cause operation of relay HJ for the newly selected car. With the circuits illustrated, this may be any up landing call for a floor above the main landing, which will cause operation of switch XHJ for the next selected car, or any down landing call for a floor above all cars, which will cause operation of relay HJDX. Thus as the SC1 contacts for the previously selected car which has been started on its upward trip are already separated, the separation of the HJ1 contacts for the newly selected car breaks the energizing circuit for the coil of relay UTR, starting the timing interval from the time of registration of the call. Had the landing call been registered prior to the departure of such previously selected car, contacts HJ1 for the next car are already separated so that the separation of contacts SC1 for the previously selected car breaks the circuit for the coil of relay UTR, thus starting the timing interval from the time of departure of the car. If such landing call is not answered by the time the interval expires, the car is given its dispatching signals. However, the landing call will in all probability be answered before the timing interval expires, either by the car which just left or by the third car, if it is in operation above the main landing. Thus contacts HJ1 for the now selected car will engage, re-establishing the energizing circuit for the coil of relay UTR. If before this call is answered a car button is pressed in the now selected car, contacts HJ1 for that car are maintained separated so that the car receives its up dispatching signals the interval period after the departure of the previously selected car. The registration before the answering of the first registered landing call of another landing call to which the newly selected car is subject, i. e., up landing call above the main landing or down landing call above all other cars, will maintain separated contacts HJ1 for the selected car and if there be continuous registration of calls to which the car is subject during this period the car is given its dispatching signal as the interval expires. If all landing calls to which the car is subject are answered during the timing interval and no overlapping car call is registered, the timing interval is cancelled and the selected car awaits the registration of a car call or another such landing call, in which event its HJ1 contacts separate to restart the timing interval.

Should a selected car at the home landing become loaded to a certain percent, say 80%, of capacity, it is given its up dispatching signals without waiting on the expiration of the timing interval. In the circuits illustrated this is effected by the closing of a load switch LS$a$ operated by the weight of passengers in the car, as for example a micro switch operated by the car platform. Assuming this to be car "$a$," the closing of load switch LS$a$ completes a circuit through contacts ML3$a$ and NT1$a$ for the coil of load responsive relay LRR$a$. Relay LRR$a$ engages contacts LRR3$a$ to complete a circuit for the coil of relay HCL$a$, which operates to give the up dispatching signals as previously described. Also, the circuit for the coil of relay UTR is re-established by the engagement of contacts HCL1$a$ and upon the registration of a call above to which the newly selected car is subject, the circuit for the coil of relay UTR is broken to restart the timing interval. Thus, the dispatching signals are given to the selected car as soon as it becomes loaded to a certain percent of capacity or, if the selected car does not become so loaded, upon the expiration of the given timing interval after the initiation of the starting of the previously selected car, provided that during this period there is continuous registration of one or more calls to which the newly selected car is subject, or if no such call is in registration at the time the previously selected car is started, upon the expiration of the given timing interval after the registration of a call to which the newly selected car is subject, provided there is continuous registration of one or more calls to which the car is subject.

The inclusion of contacts NT1a in the circuit for the coil of relay LRRa prevents the operation of the load responsive relay by passengers in the car as the car arrives at the main landing. While the car is in operation, the circuit for the coil of hall time switch NTa is completed by way of contacts SH6a and rectifier RE10a. When a stop is made at the main landing on a downward trip, the engagement of contacts HLR6a completes a charging circuit for condenser Q12a. When contacts SH6a separate as the car comes to a stop, contacts DO7a will have engaged, maintaining the circuit for the coil of relay NTa. When the door and gate reach open position, contacts DO7a separate, breaking the circuit for the coil of relay NTa. This relay does not drop out immediately, being held in operated condition by the discharge of condensers Q9a and Q12a. The discharge circuits for these condensers are adjusted to provide sufficient time, say ten seconds, for the discharge of passengers. Thus, when a stop is made at the main landing, passengers will be discharged before contacts NT1a engage to render the control of relay LRRa by switch LSa effective, thereby insuring the operation of relay LRRa only by incoming passengers.

Should there be no other car at the main landing at the time a selected car leaves, the circuit for the coil of relay UTR is broken because contacts SC1a, SC1b and SC1c are separated. Thus the timing interval starts to run incident to the starting of the selected car. Upon the arrival of a car, say car "a," at the main landing and the change of its direction setting to up, it is immediately selected, causing engagement of its contacts SC1a. If no call is in registration to which the car is subject, contacts HJ1a are in engagement so that the engagement of contacts SC1a re-establishes the circuit for the coil of relay UTR. The timing interval is then restarted upon the registration of a floor above of a car call for car "a" or of an up landing call, or upon the registration of a down landing call above the other cars.

Should the timing interval have expired under the above assumed conditions before car "a" arrived at the main landing, contacts HT1a of the running time switch prevent the establishment of the circuit for the coil of relay HCLa until after contacts SC1a close in the circuit for the coil of relay UTR. The circuit for the coil of switch HTa is broken by the separation of contacts H9a as the car comes to a stop at the main landing. Switch HTa is delayed in dropping out by the discharge of condenser Q5a. As a result, contacts HT1a remain separated, preventing the completion of a circuit for the coil of relay HCLa until it is determined whether or not the engagement of contacts SC1a causes reoperation of relay UTR. If no call is in registration to which the car is subject, contacts HJ1a are in engagement so that the engagement of contacts SC1a completes the circuit for the coil of relay UTR. The resultant separation of contacts UTR1a prevents the operation of relay HCLa to give the up dispatching signals. However, if there be a call in registration to which the car is subject, contacts HJ1a are separated so that the engagement of contacts SC1a does not cause reoperation of relay UTR. Thus contacts UTR1a remain in engagement and upon the engagement of contacts HT1a, relay HCLa is operated to give the up dispatching signals. The attendant may delay starting of the car under such conditions until any waiting passengers are taken into the car.

It may be considered preferable for certain installations to cancel the timing interval when a car is load dispatched, regardless of whether or not it is the selected car. Such operation may be had by moving switch HTC to its lower position. This switch is provided with three blades and when in the lower position enables a car which has its relay HCL operated by being loaded to the given capacity to re-establish at its HCL1 contacts the circuit for relay UTR, regardless of whether it is the selected car or not.

Assume now a period in which the traffic in each direction is substantially equal, as during the interim periods between morning peak and noon and between noon and evening peak. For such condition, traffic program switch TPS is set in position to cause operation of up-down traffic switch UD. This causes the cars to be dispatched on their up trips at timed intervals or prior to the expiration of the time interval if a spacing call is registered. Switch UD engages contacts UD1 to connect the coil of relay UTR to an adjustable portion of resistance RUT to give the desired interval for up dispatching under up-down traffic conditions, the circuit being shown to provide an interval which is greater than that provided for up peak traffic conditions. Resistor RUT serves as a voltage divider and thus determines the voltage applied to the coil of relay UTR. Contacts UD1 provide a greater potential drop across the coil than do contacts UP2 and thus a longer time is involved in reaching the drop out voltage of the relay. Under up-down traffic conditions, the timing intervals are not subject to calls being in registration.

Timed intervals are also provided for down dispatching. The circuits for providing these intervals are rendered effective by the engagement of contacts UD2. The down time interval is provided by the discharge of condenser Q2 into the coil of down time relay DTR when the energizing circuit for the coil is broken, thus delaying the dropping out of this relay. The drop-out time of this relay is adjusted by adjusting the value of resistor RDT.

Assume that car "a" is at the main landing, that it is selected for up dispatching and that the time interval provided by relay UTR is running. Upon the expiration of this interval, contacts UTR1a engage to complete a circuit through contacts UD3a for the coil of relay HCLa to cause the giving of the up dispatching signals to car "a." Also, the engagement of the contacts HCL1a establishes the circuit for the coil of relay UTR. Incident to the starting of the car, the separation of contacts HLR5a causes the dropping out of relay SCa which in turn separates contacts SC1a to break the circuit for the coil of relay UTR, restarting the timing interval. This is true regardless of whether or not contacts HJ1 for the next selected car are engaged inasmuch as contacts UP1 are separated. Thus the timing interval runs from the initiation of the starting of the selected car, regardless of whether or not calls are in registration to which the next selected car is subject.

If another car is at the main landing at the time the car "a" leaves, it is selected, its loading light and up hall lantern are lighted and it receives its up dispatching signals at the expiration of the timing interval. If no car is there at the time car "a" leaves, the next car to arrive at the main landing is immediately selected and it receives the up dispatching signals as the time interval expires. If the time interval has expired before the car arrives, the car receives its up signals upon the expiration of the time interval provided by its HT relay after the stop is made at the main landing. These operations have been previously described.

Assume now that car "a" arrives at the upper terminal. As it does so, switch DGa is reset to set the car for downward travel as previously explained. Assume that no other car is at the upper terminal at this time. As the previous car left, the separation of its DDR1 contacts broke the circuit for the coil of relay DTR, permitting this relay to time out. As car "a" arrives at the top terminal, brush SCBa engages stationary contact SCCa to complete a circuit for the coil of relay SCTa. This relay operates to select car "a" for down dispatching, separating contacts SCT3a and SCT4a in the circuits for cars "b" and "c." It also engages contacts SCT2a to cause the lighting of the down hall lantern DHL6a for the top terminal. Assuming that relay DTR has timed out, a circuit is completed by the engagement of contacts SCT1a for the coil of relay DDRa. Relay DDRa engages contacts DDR4a to give the down dispatching signals to car "a." It also engages contacts DDR1a to re-establish the circuit for the coil of relay DTR. After the separation of contacts DTR1a, relay DDRa is maintained operated by way of brush DSBa, contact DSCTa for the top terminal and contacts DDR2A. As the car leaves the floor, brush SCBa disengages contact SCCa to break the circuit for the coil of relay SCTa. Also brush DSBa disengages contact DSCTa to break the circuit for the coil of relay DDRa. This relay separates contacts DDR4a to break the circuit for the down dispatching signal and separates contacts DDR1a to break the circuit for the coil of relay DTR, thus restarting the timing interval.

The up dispatching interval is adjusted to equal the sum of the average round trip time of a car and the average loading time at the lower terminal, divided by the number of cars. With such adjustment, on the average a car should arrive at the lower terminal loading time ahead of the giving of the up dispatching signals to that car. If the cars always made average trips, each car would arrive at the upper terminal up dispatching interval after the arrival of the previous car. Thus the down dispatching signals could be given to the cars as soon as they arrive at the top terminal. However, due to changing traffic conditions, the times consumed by the cars in making trips vary considerably. Thus, to give down dispatching signals to the cars immediately upon their arrival at the upper terminal might result in the cars being bunched on their downward trips. To minimize this possibility, the cars are spaced by time intervals in their dispatching from the top terminal. This down timing interval is made less than the up timing interval, say half. This assures a reasonable spacing of the cars from the upper terminal without unduly increasing the possibility of delaying the dispatching cycle.

For a clearer understanding of this operation, assume that car "a" arrives at the top terminal about up dispatching interval after the arrival of the preceding car. Assuming that the time interval provided by relay DTR is half that provided by relay UTR, the down spacing interval will have expired before car "a" arrives. Thus contacts DTR1a are in engagement so that car "a" immediately receives its down dispatching signals as contacts SCT1a engage immediately upon arrival. Thus car "a" is maintained spaced from its preceding car a full dispatching interval. Had car "a" arrived earlier, it still receives its down dipatching signals immediately unless it arrives before the down spacing interval expires. In that event, car "a" has to wait upon the spacing interval and gets its signals as soon as this interval expires. This prevents dispatching car "a" too quickly after its preceding car, thereby assuring a reasonable spacing of the cars. If car "a" had arrived at the upper terminal later than a full up dispatching interval after the arrival of its preceding car, it would still get its down dispatching signals immediately. There would be nothing gained under such conditions over always delaying the giving of the down dispatching signals for the up dispatching interval after the departure of the previous car, or over always giving the down dispatching signals immediately upon arrival. However, to always wait a full up dispatching interval would unduly delay the whole cycle where the previous car was late, whereas instantaneous signals would cause bunching of the cars under conditions where they arrived close together at the upper terminal. With the shorter interval, the cars are effectively reoriented at the upper terminal without avoidable delays.

So far the description of operation with the system set for up-down traffic conditions has considered only the timed dispatching operations. A car may be dispatched on its up trip ahead of the expiration of the dispatching interval should a condition arise in which a call is registered which the other cars will not answer. Such call is preferably a spacing call as determined for light traffic conditions which, with the particular circuit arrangement illustrated, is related to cars set for downward travel or at the main landing and is any down landing call above all such cars, any up landing call above the main landing, or a call above for a selected car at the main landing. Such call causes the operation of relay HJ for the selected car so that with each of the other cars either set for down or at the main landing as signified by its SU relay being dropped out, the engagement of contacts HJ3 for the selected car, say car "a," completes a circuit by way of contacts UP3a, SU1b, SU2c, HJ3a, SC3a and HRX3a for the coil of relay HCLa without waiting for the engagement of contacts UTR1a. Also a car may be load dispatched by the engagement of contacts LRR3 for that car as previously explained, also without waiting on the timing interval. In addition, should a down car, say car "a," be nonstopped, the resultant engagement of contacts NO1a by-passes contacts HJD1a so that a down landing call which is registered need not be above car "a" to effect the dispatching of another car on its up trip.

In any event, a new dispatching interval is initiated by the departure of the car which received the dispatching signal. This will be only the selected car if switch HTC is in the uppermost position. If switch HTC is in the down position, a car may leave for any reason and reestablish the timing interval.

So long as the down spacing interval has not expired, a car is caused to travel to the top terminal, regardless of whether or not there is a call registered for that floor to which that car is subject. This is effected by means of contacts DTR1 for that car which under such conditions prevent completion of the circuits for the coils of switch HR and relay DDR for that car. However, when a car has not reached the upper terminal by the time that the down spacing interval has expired and there is no call above it to which it is subject, it may be brought to a stop at a floor below, preferably within a certain zone, set for downward travel and immediately given its down dispatching signals, provided that, if one or more of the other cars are each either a down car or at the main landing, there is a down landing call in registration above such other car.

Incident to the starting of a car, say car "a," on its up trip, relay SUa operates as above explained and engages contacts SU3a and SU4a. The engagement of contacts SU3a connects the coil of highest landing call relay HJXa in parallel with the coil of switch HJa. This renders both switch HJa and relay HJXa subject to contacts HG2a, XHJ1a and HJD2a, contacts DPUD2a being in engagement because the circuit for the coil of down peak and up-down traffic switch DPUD is completed at contacts UD2. Inasmuch as the coil of switch HGa is subject to contacts DPUD1a and HLR1a, switch HGa is operated incident to starting the car from the main landing and is maintained so at least until it approaches a certain floor, illustrated as the fourth floor, and switch HC4a is opened by cam HCBa. In other words, each car always travels to a certain zone of floors, the lower limit of which is illustrated as the fourth floor. Thus switch HJa and relay HJXa in the above example are maintained operated by contacts HG2a at least until the fourth floor is reached. Assume that, as car "a" approaches the fourth floor and switch HC4a is opened, there is no car call for car "a" for a floor above the fourth floor so that contacts HG2a are separated, there is no up landing call for the fourth floor or a floor above so that contacts XHJ1a are separated, there is no down landing call for a floor above the fourth floor so that contacts HJD2a are separated, and the HJX relay for each of the other cars is operated so that contacts HJX1b and HJX2c are separated, the circuit for the coils of switch HJa and relay HJXa is broken. As a result, contacts HJ2a engage and if the down spacing interval has expired so that contacts DTR1a are engaged, the car is caused to slow down and stop at the fourth floor and become set for downward travel as previously described. This and further operations will be better understood by assuming certain conditions with respect to the other cars.

With all three cars in operation, assume for convenience of description that all cars are set for travel in the up direction, with cars "b" and "c" below car "a." Car "a" provided it has reached its highest call, will drop its HJa switch and HJXa relay in the zone of the fourth floor and above, as contacts HJX1b and HJX2c are separated under the assumed conditions. Assuming that the down spacing interval has expired at this time, the car is caused to slow down and stop at the floor of highest call or at the next floor at which a stop can be made and become set for downward travel. A stop is made in response to a down landing call if that call is such highest call as the engagement of contacts DTR1a and HJ2a completes a circuit for the coils of switch HRa and relay DDRa. Also the car is given its down dispatching signals. As soon as car "a" drops its HJX relay, contacts HJX1a and HJX2a engage to complete additional circuits for the coils of switches HJb, HJXb, HJc and HJXc. Car "a" now being set for downward travel, its HJXa relay is subject only to down calls above car "a," i. e. contacts HJD2a, inasmuch as contacts SU3a and SU4a are now separated. When a down landing call is registered above car "a," contacts HJD2a are engaged, completing the circuit for the coil of relay HJXa. This relay operates to separate contacts HJX1a and HJX2a in the circuits for the coils of switch HJ and relay HJX for each of the other cars. As soon as one of these cars, say car "b," attains the condition that it has reached its highest call, i. e., down landing call or car call for car "b," within the above described zone, switch HJb and relay HJXb are dropped out. If at this time the next down spacing interval (initiated by the separation of contacts DDR1a) has expired, the engagement of contacts HJ2 for car "b" causes operation of switch HR and relay DDR for car "b." Thus the car is caused to slow down and stop at the floor of such highest call or the next floor at which a stop can be made and become set for downward travel. Also the car is given its down dispatching signals as a result of the engagement of its DDR4 contacts. When relay HJXb dropped out, it engaged contacts HJX2b to complete another circuit for the coil of switch HJc and relay HJXc so that this switch and relay are not dropped out incident to the stopping of car "b."

With both cars "a" and "b" down cars, the registration of a down landing call above both cars causes operation of relays HJXa and HJXb and thus the separation of contacts HJX1a and HJX2b, permitting the dropping out of switch HJc and relay HJXc, provided car "c" has reached the upper zone and has no call above to which it is subject. Upon engagement of contacts HJ2 for car "c," the circuit is established for the coils of switch HR and relay DDR for car "c," provided the down spacing interval has expired. Thus the car is caused to slow down and come to a stop and is given its down dispatching signals.

As previously explained, should a car be at the main landing, its SU relay is not operated. This is because the separation of contacts HLR4 for that car as it approached the main landing prevented the operation of the SU relay. Thus assuming for example that car "a," in either of the above examples where car "a" was set for down, was instead at the main landing, the registration of a down call above car "a" causes the engagement of contacts HJD2a to cause the operation of relay HJXa. Thus a down landing call above a car at the main landing can cause, when the down spacing interval has expired, an up car to be brought to a stop at a floor in the zone, provided it has reached its highest call and the HJX relay for the third car is also operated due to that car being an up car below the zone or with a call above it to which it is subject or being a down car with the down call above it or being at the main landing. Also, if a down car is non-stopped, a down landing call can be below that car in so far as affecting reversal of a late car is concerned, contacts NO3 and NO4 separating in the circuits for the coils of relays HJ for the other cars.

When a car fails to start within a certain time interval, it is temporarily removed from dispatching. This is effected through dispatching removal relay XCS for that car. Referring to the circuits for car "a," when a stop is made contacts H3a separate. At an intermediate floor, and at a terminal floor if the dispatching operation has taken place to effect the separation of contacts ATR3a, the separation of contacts H3a breaks the circuit for the coil of relay XCAa. This relay is delayed in dropping out for a given time interval by the discharge of condenser Q8a. If the car does not start within this interval, relay XCSa upon dropping out separates contacts XCS1a, causing the dropping out of non-stop relay NOa, enabling another car to stop in response to a landing call for the intermediate floor at which the car is stopped. It also separates contacts XCS2a to restart a down dispatching interval when the car fails to start on its downward trip. It also separates contacts XCS4a which drops out selection relay SCa to permit another car to be selected at the main landing, contacts SC1a separate to restart an up timing interval. When the car does start, contacts H3a reestablishes the circuit for the coil of relay XCSa, returning the car to the dispatching system.

A car may be taken out of service for various reasons, as for example during a period when there are more cars in service than traffic conditions dictate. This may be effected by shutting down the motor generator set for that car. To do so, key operated switch MGSa for car "a," for example, is thrown to its lower position, completing a circuit for the coil of auxiliary door close switch XDCa. This switch separates contacts XDC3a which, if the door and gate are closed and door close limit switch DCL2a is open, breaks the circuit for the coil of switch MGa. If the door and gate are open, the engagement of contacts XDC1a completes a circuit for the coil of switch DCa to effect the closing of the door and gate and switch DCL2a maintains switch MGa operated until the door and gate reach closed position. When switch MGa drops out, it shuts down the motor generator set.

When switch MGa drops out, it also separates contacts MG1a to break the circuit for the coil of potential switch CAa. Switch CAa drops out, separating contacts CA2a which breaks the circuit for the coil of non-stop relay NOa. This relay drops out to separate contacts NO2a, increasing the amount of resistance R2 connected across condenser Q1. This increases the discharge time for the condenser and thus the up dispatching interval in accordance with the lower number of cars in service. This applies when the system is set for up-down traffic conditions and when it is set for up peak traffic conditions.

Assume now a period in which traffic is substantially all in the down direction, as during the evening peak when the building is being depopulated. For such conditions, traffic program switch TPS is set in position to cause operation of down peak traffic switch DP. This switch operates to engage contacts DP1, by-passing contacts UD2, now separated, to cause operation of down peak and up-down traffic switch DPUD and to render down time relay DTR effective for down peak traffic conditions. It also engages contacts DP2 in the circuit for the coil of up dispatching relay HCL for each car, thus rendering this relay subject to the HRX3 contacts for that car as the car comes to a stop at the main landing and becomes set for upward travel. Thus with the system set for down peak traffic conditions, the cars are caused to be dispatched on their down trips on a down spacing interval basis and to be instantaneously dispatched from the main landing on their up trips.

For a better understanding of the operation when the system is set for down peak traffic conditions, assume that car "a" arrives at the upper terminal and becomes set for downward travel and that no other car is at the upper terminal at this time. As car "a" arrives, its relay SCTa operates to select car "a" for down dispatching, and to cause lighting of the down hall lantern DHL6a as previously described. Relay DTR started to time out as a result of the separation of the DDR1 contacts for the car which was last to leave. Assuming that relay DTR has timed out, a circuit is completed by the engagement of contacts SCT1a for the coil of relay DDRa. Relay DDRa acts to give the down dispatching signals to car "a" and to re-establish the circuit for the coil of relay DTR. Thus the attendant presses the start button to start the car and as the car leaves the floor, the circuit for the coil of relay DDRa is broken to effect the discontinuance of the giving of the down dispatching signal and to restart the timing interval. If the next car, say car "b," arrives at the upper terminal before the expiration of the down spacing interval, it is given its down dispatching signals when the time interval expires and as it leaves the floor restarts the timing interval.

Should there be a call for the upper terminal to which the next car is subject and the car arrives at the upper terminal after the expiration of the down spacing interval, it is given its dispatching signals immediately upon arrival. However, should the down spacing interval expire before another car arrives at the upper terminal and there is no call to which such other car is subject above it in the zone, it may be brought to a stop at a floor in the zone, set for travel in the down direction and given its down dispatching signals, the same as described for up-down traffic conditions. As a brief resume of this operation, assume that car "a" is set for downward travel, that cars "b" and "c" are set for upward travel and that a down landing call is registered above car "a." This results in the engagement of contacts HJX1a and HJX2a in the circuits for the coils of switch HJ and relay HJX for each of cars "b" and "c." Thus, as soon as, say car "b," attains the condition that it has arrived in the previously defined zone and has reached its highest call, switch HJb and relay HJXb are dropped out and as the spacing interval has expired car "b" is caused to slow down and stop at the floor of such highest call or at the next floor at which a stop can be made and become set for downward travel. Also, it is given its down dispatching signals at this floor. With cars "a" and "b" both set for downward travel, the registration of a down landing call above both cars causes operation of relays HJX for both cars, thus enabling car "c" to be brought to a stop in the zone and given its down dispatching signals, provided the down spacing interval has expired.

When a car, say car "a," arrives at the lower terminal, it becomes set for upward travel as soon as it is brought to a stop as previously described. Switch HRXa is operated as the change in direction set-up takes place, causing the engagement of contacts HRX3a to complete a circuit through contacts DF2a for the coil of relay HCLa. Thus relay HCLa is operated to give instantaneous up dispatching signals to the car as soon as it is brought to a stop at the main landing.

The operation of the elevators without attendants will now be described. The system may be set for "without attendant" operation by means of throw-over switch operating switch TSOS for each car, switch TSOSa for car "a" being shown in Figure 4. Upon throwing these switches into "without attendant" position w/o, a circuit is completed, for car "a" for example, through armature TOMAa and field winding TOMFa of the throw-over switch motor TOMa, causing it to move the throw-over switches TOLa to TOL6a from "with attendant" position "w" into "without attendant" position "w/o." When this change has been effected, limit switch TOL1a opens to break the motor circuit.

Switch TO1a acts to by-pass contacts CA2a, this being provided to render these circuits effective when the motor generator set is started in response to the registration of a call which will cause the car to run. For convenience, these circuits are not shown and it is assumed that switch MGSa starts the motor generator set for both "with attendant" and "without attendant" operation. Switch TO6a acts to render reversing buttons RDBa and RUBa ineffective. Switch TO7a acts to render non-stop button NSBa ineffective. Switch TO10a renders ineffective the dispatching signals and basement service light. Switch TO13a disconnects the starting and door close buttons SBa and DCBa. The purposes of the other throw-over switches will be seen as the description proceeds.

It is believed that in view of the previous detailed description the operation of the system without attendants in the cars will be understood from assumed examples of operations. Certain operations are the same and will not be repeated. It will be assumed that traffic is light and that switch TPS is set in position to cause the operation of light traffic switch LT. It will be further assumed that all cars are in service and are parked at the main landing. Under such conditions, one of the cars, say car "a," is selected for dispatching as evidenced by the operation of its relay SCa. As a result, up hall lantern UHL1a at the main landing is lighted. Also the door and gate for the selected car are open. This is due to the fact that contacts SC2a are separated because the car is selected and contacts ATR2a are separated because the car is at the main landing. The circuit for the coil of relay ATR for each car is completed as the car arrives at the main landing. The circuit for the coil of relay ATRa is through brush DSBa, contact DSC1a and contacts HCL2a and DGU4a. The separation of contacts SC2a and ATR2a causes the circuit of the coil of relay SRa and thus the circuit for the coil of switch DCa to be maintained open. The door and gate for each of the unselected cars are closed, this being effected for that car by the dropping out of the hall time switch NT to complete a circuit through contacts NT3, LT1, UCR1 and SC2 for the coil of relay SR. Relay SR engages contacts SR1 to complete a circuit for the coil of switch DC, causing the closing of the door and gate.

Assume now that a landing call, say an up call for the third floor, is registered. This causes operation of switch XHJ for each car and thus in turn the operation of relay HJ for each car. The engagement of contacts HJ3a completes a circuit for the coil of relay HCLa (for the selected car) as previously explained. Relay HCLa separates contacts HCL2a which breaks the circuit for the coil of auxiliary time relay ATRa. Relay ATRa is delayed slightly in dropping out by the discharge of condenser Q7a to avoid a race of circuits which might cause unwanted operation under certain conditions. Upon dropping out, relay ATRa engages contacts ATR2a to complete a circuit through contacts NT3a for the coil of relay SRa. This relay engages contacts SR1a to complete a circuit for the coil of switch DCa to effect the closing of the door and gate. It also engages contacts SR2a to complete a circuit through contacts ATR1a for the operating coil of pawl magnet PMa. As the door and gate reach closed position, the engagement of gate contacts G2a completes a circuit for the coil of relay PMYa which separates contacts PMY3a to extinguish the hall lantern and engages contacts PMY2a, completing a circuit through contacts HJ4a for brush motor BMa to advance the carriage. As this takes place, switch SLS1a closes to complete the circuit for the coils of up direction switch USa and switch Ha, causing the starting of the car in the up direction. Also, relay SUa is operated to prevent the operation of relay HCL for each of the other cars, and relay SCa is dropped out, enabling another car to be selected, as previously described. Car "a" is stopped at the third floor in response to the up call for that floor in the manner previously described. The opening of the door and gate is initiated upon the closing of switch DZa which completes a circuit for the coil of switch DOa through contacts XCS3a, switch TO14a and contacts SR4a. The car is maintained set for upward travel even though there are no calls above. This will be discussed in more detail later.

Should a down landing call have been registered instead of an up call, the car is started from the main landing as a result of the operation of relay HJDX to complete a circuit for relay HJa. Relay HCLa operates as a result of the engagement of contacts HJ3a, starting the car in the up direction as above described. Assuming no higher calls, the car is stopped at the third floor in response to the down call, this being effected as a result of the breaking of the circuit for the coil of relay HJDa upon the engagement of brush BDHHa with contact DHH3a as previously described.

As the door and gate of the selected car are open at the main landing, a passenger may enter the car. Assume that he does so and presses the third floor car button C3a. This causes operation of switch HGa which engages contacts HG2a to cause operation of relay HJa. As a result relay HCLa operates to effect the dropping out of relay ATRa. Upon the expiration of the time interval of switch NTa after the door and gate reach open position, contacts NT3a engage to complete a circuit through contacts ATR2a for the coil of relay SRa. Relay SRa engages contacts SR1a to cause the closing of the door and gate. Also it engages contacts SR2a to complete a circuit for the operating coil of pawl magnet PMa. As the door and gate reach closed position, the hall lantern is extinguished and the car is started in the up direction as above described. The car is brought to a stop at the third floor in response to the third floor car call in the manner previously described.

When a stop is made during up car travel at a floor in response to a car call under conditions where no call is in registration for a floor above and an up call for that floor is not registered or in response to a down landing call, under which conditions there will be no call registered for a floor above and no up call registered for that floor, the car becomes set for downward travel as the stop is made, as previously described. Referring to the circuits for car "a," in case of a car call, contacts HG2a are separated incident to the picking up of the call and, as no up landing call exists for that floor and no landing call exists for a floor above, this drops out switch HJa. In the case of a down landing call, switch HJa is dropped out as a result of the separation of contacts HJDX1a. Switch HJa, upon dropping out, engages contact HJ2a to complete a circuit for the coil of switch HRa. Switch HRa engages contacts HR5a to cause the car to be slowed down and brought to a stop at the landing and separates contacts HR2a to cause the down hall lantern to be lighted at that landing. It also engages contacts HR1a so that as the car comes to a stop, a circuit is completed for the reset coil of switch DGa, causing the car to be set for downward travel. Upon the dropping out of switch NTa, a circuit is completed through contacts NT3a for the coil of relay SRa. Relay SRa operates to cause the closing of the door and gate and to complete a circuit for the operating coil of the pawl magnet, relay ATRa being dropped out when the car is not at a terminal. As the door and gate reach closed position, relay PMYa operates to engage contacts PMY2a, completing a circuit through contacts HLS2a and SH5a for brush motor BMa to advance the carriage. As this takes place, switch SLS1a closes to complete the circuit for switches DSa and Ha, causing the starting of the car in the down direction. Assuming no car call or down landing call for the main landing and no car call for the basement, the car is automatically stopped at the main landing on its downward trip. The stop is initiated by the engagement of brush CABa with contact CP1a, rendered alive by contacts HG4a. When a stop is made in response to an up landing call under conditions where no higher calls for that car exist, up direction of car travel is maintained to enable a passenger to enter the car and press a car button for a floor above. However, should within the time interval provided by switch NT for that car, say car "a," and the closing of the door and gate, no car button be pressed for a floor above and no landing call be registered for a floor above, the direction is changed to down, the down hall lantern lights, the door and gate reopen and upon the expiration of a time delay reclose, and the car is started in the down direction. By way of explanation, when the up call is picked up, the circuit for the coil of switch XHJa is maintained and thus switch HJa remains operated until switch HSa is operated to effect reset of the pawl magnet and cancellation of the call. Thus the re-engagement of contacts HJ2a does not complete a circuit for the coil of switch HRa as contacts PMY1a are then separated. Contacts HR1a are therefore maintained separated and the car remains set for upward travel. Upon the expiration of the time interval provided by switch NTa, the engagement of contacts NT3 causes operation of relay SRa which engages contacts SR1a to cause the closing of the door and gate and contacts SR2a to energize the pawl magnet. As the door and gate reach closed position, the engagement of gate contacts G2a completes a circuit for the coil of relay PMYa. As it has been assumed that no call is registered for a floor above contacts HJ4a are separated, preventing the advance of the carriage and thus the starting of the car in the up direction. Also contacts HJ2a are engaged so that the engagement of contacts PMY1a completes a circuit for the coil of switch HRa. Switch HRa engages contacts HR1a to cause the car to become set for downward travel. It also separates contacts HR2a to cause the up hall lantern to be extinguished and the down hall lantern to be lighted. It also engages contacts HR3a to complete a circuit for the coil of relay SHa which operates and becomes self-holding at contacts SH2a. The engagement of contacts DGD6a as a result of the car being set for downward travel causes operation of switch HLSa. As a result contacts HLS1a separate to break the circuit for the coil of switch HRa. The engagement of contacts HLS2a does not cause the advance of the carriage as contacts SH5a are separated. The engagement of contacts SH6a completes a circuit for the coil of switch NTa which operates to separate contacts NT3a to cause deenergization of the coils of relays SRa and SHa. The resultant engagement of contacts SR4a completes a circuit for the coil of switch DOa, causing the reopening of the door and gate. The engagement of contacts DO7a establishes another circuit for the coil of switch NTa so that this switch remains operated after the separation of contacts SH6a and until the door and gate reach open position. As the down hall lantern is lighted, an intending passenger at that floor desiring to go down is thus advised that he may enter the car and be carried in the down direction. When the door and gate reach open position, the separation of contacts DO7a breaks the circuit for the coil of switch NTa. Upon the expiration of a time interval, switch NTa drops out to effect the reclosure of the door and gate and the advance of the carriage in the down direction as the door and gate reach closed position, the circuit for motor BMa being completed by way of contacts HLS2a and SH5a. Thus the car is started in the down direction upon the closing of switch SLS1a incident to the advance of the carriage. Switch NTa is again operated as a result of the engagement of contacts SH6a but the resultant separation of contacts NT3a does not cause the reopening of the door and gate as contacts F2a and E1a are separated. The same operation is had where a stop is made in response to a car button under conditions where a landing call is in registration for a floor above and this call is answered by another car so that at the time the door and gate reach closed position no call is in registration for a floor above.

The system may be arranged so that the door and gate do not close at the expiration of the time interval provided by switch NT under conditions where no car button is pressed for a floor above the floor at which a stop is made in response to an up call and no landing call is in registration for a floor above. This in the circuits for car "a" is provided by a circuit illustrated as rendered effective by the closing of changeover switch COS4a. With this switch closed, upon the dropping out of switch NTa, contacts NT2a engage to complete a circuit for the coil of switch HRa with the result that the car is set for downward travel and its down hall lantern is lighted. Switch NTa also causes operation of relay SRa which in turn engages contacts SR1a to complete a circuit through contacts HR3a for the coil of relay SHa. This relay separates contacts SH1a to prevent the closing of the door and gate and engages contacts SH6a to reenergize the coil of switch NTa. This switch reoperates to cause relay SRa and thus relay SHa to drop out. Upon the expiration of the time interval of switch NTa, relay SRa is reoperated and the door and gate are closed as the circuit for the coil of relay SHa is not reestablished as contacts HR3a are now separated because of the separation of contacts HLS1a. Thus the passenger is given an additional time interval after the change to the down hall lantern to enter the car. When the door and gate reach closed position the car is started in the down direction.

The time interval provided by the respective switches NT which may be termed the door time interval varies in accordance with different operating conditions. For example, when a car, say car "a," makes a stop at a floor above the main landing in response to a car button, the door time interval provided is that due to the discharge of condenser Q9a. When the car was started, the engagement of contacts SH6a completed a circuit for the coil of switch NTa. This circuit is maintained until the car is brought to a stop at the landing at which the car button was pressed. Incident to the stopping operation, a circuit is completed for the coil of the door open switch through switch DZa and contacts XCS3a and SR4a. As a result the door and gate are opened and contacts DO1a engage to establish another circuit for the coil of switch NTa. When the door and gate reach open position, contacts DO1a separate to break the circuit for the coil of switch NTa. The dropping out of this switch to effect the reclosing of the door and gate is delayed by the discharge into its operating coil of condenser Q9a, say for two seconds, the amount of delay being determined by the point of connection of condenser Q9a to resistance R21a.

When the car makes a stop at a floor above the main landing in response to a landing call, relay HSa is operated which engages contacts HS2a to complete a circuit for the coil of landing stop time switch HSXa which engages contacts HSX2a to become self-holding. It also engages contacts HSX1a which act, along with contacts EY1a which engage prior to the car being brought to a stop, to establish another circuit for the coil of switch NTa. The holding circuit for switch HSXa is broken by the separation of contacts SH1a as the car is brought to a stop. This switch is delayed in dropping out by the discharge of condenser Q13a to maintain the circuit for the coil of switch NTa for say two seconds after the door and gate reach open position, the amount of this interval being determined by the point of connection of condenser Q13a to resistance R27a. Thus switch NTa does not drop out to effect the reclosing of the door and gate until about four seconds after the door and gate reach open position.

A similar door time interval is provided in the event that an intending passenger desiring to be carried in the direction in which the car is set for travel touches the landing button for that direction while the door and gate are closing. This causes operation of relay HSa and thus of time switch HSXa to cause reoperation of switch NTa. This causes reoperation of switch DOa to reopen the door and gate, and the door and gate remain open for the above time interval due to the action of condensers Q9a and Q13a. In the event that the car is at the main landing and is selected, the touching of the up landing button at that landing causes operation of relay HSa and thus switches HSXa and NTa to cause the opening of the door and gate and their remaining open for the same time period, assumed as four seconds. It is preferred to provide the longer time for the door and gate to remain open when effected incident to stopping in response to a landing call or touching a landing button at the floor at which the car is positioned than when the car is stopped in response to a car call, as it has been found that on the average passenger discharge is effected more quickly than the passengers align themselves in front of the proper car and enter the car.

When the car on its downward trip is stopped at the main landing, a longer drop out time is provided for switch NTa to insure sufficient time for passenger transfer and to prevent unwanted operation of relay LRRa. This is effected by charging condenser Q12a through contacts HLR6a, DGD8a and SH6a as the car approaches the main landing. Condenser Q12a acts to assist condenser Q9a in maintaining switch NTa operated with the result that the door and gate are held open for an additional time, say a total of ten seconds, the amount depending upon the point of connection of condenser Q12a to resistance R26a. Rectifier RE10a acts to block the charging of condenser Q12 in response to the touching of the main landing button when the car is at the main landing.

Assume that as a car leaves, another car, say car "a," is parked at the main landing with its door and gate closed. Car "a" is selected as the next to leave as a result of the dropping out of the SC relay for the previously selected car. The up first floor hall lantern UHL1a is lighted as a result of the engagement of contacts SC8a. Also contacts SC2a separate to deenergize relay SRa. As a result contacts SR4a engage to complete a circuit for the coil of switch DOa, causing the opening of the door and gate.

Assume now that after a car, say car "b" becomes set for downward travel and before it returns to the main landing, a landing call is registered which this car will not answer on this trip. With the circuits as illustrated, this may be a down landing call for a floor above car "b," a down landing call for a floor below car "b" if car "b" is non-stopped, or an up landing call for any floor above the main landing, as previously explained. Assume this to be an up call for the second floor. This causes operation of switch XHJa and this in turn of switch HJa. This causes operation of switch HCLa which separates contacts HCL2a to cause the starting of car "a" in the up direction. Had the call been a down landing call, relay HJDX would have been operated to cause operation of switch HJa and thus of switch HCLa to effect starting of the car. Incident to the starting of car "a," car "c" is selected, its relay SCc becoming operated as a result of the dropping out of relay HLRa. Upon car "a" becoming set for downward travel and the registration of a down landing call above both cars "a" and "b" or an up landing call above the main landing, car "c" is automatically started in the up direction. When a car call is registered in the selected car at the main landing, the car is caused to start on its upward trip provided each of the other cars is either set for downward travel or at the main landing. This is due to the fact that the registration of such car call above causes the operation of switch HG and thus relay HJ for that car which in turn completes a circuit for relay HCL for that car as the SU relays for the other cars are dropped out. All cars automatically return to the main landing after answering their highest call.

It will be seen from the above examples that under light traffic conditions, unselected cars park at the main landing with their doors and gates closed while the selected car parks with its door and gate open. Provided the other cars are either set for downward travel or parked at the main landing, the selected car is started in the up direction in response to a down landing call above all cars or in response to an up landing call or a car call for that car above the main landing. As on "with attendant" operation, such landing calls may be termed spacing calls. This condition also obtains should one of the other cars be below the main landing as its relay SU is not operated.

With change-over switches COS1a and COS5a, switch COS3a closed and switch COS5a in its lower position, the circuits are arranged to prevent starting of an unselected car on its upward trip from the main landing in response to a car call. With such arrangement, it is considered undesirable to permit the door and gate to close on a passenger in an unselected car since the car would not start when the door and gate reached closed position. When a passenger enters a car, say car "a," he causes opening of car unoccupied switch UCa. This switch may be in the nature of a switch such as a so-called "micro" switch operated by a small deflection of the car platform. The opening of this switch causes the deenergization of car unoccupied relay UCRa which separates contacts UCR1a and engages contacts UCR2a. The separation of contacts UCR1a prevents the completion of the circuit for the coil of relay SRa upon the engagement of contacts NT3a. Thus contacts SR1a are separated, preventing the establishment of the circuit for the coil of switch DCa to effect the closing of the door and gate. If contacts NT3a had engaged, the separation of contacts UCR1a breaks the circuit for the coil of switch SRa, effecting by the separation of contacts SR1a the deenergization of the coil of switch DCa and by the engagement of contacts SR4a the energization of the coil of switch DOa if necessary to reopen the door and gate from a partially closed position. Thus, should a passenger inadvertently enter an unselected car at the main landing, as for example during the period provided by switch NT for that car to discharge passengers, closing of the door and gate upon him is prevented. Upon finding that the door and gate do not close when he presses the car button for his destination, the passenger will very likely leave the car and enter the selected car. As he leaves the unselected car, say car "a," relay UCRa is reoperated and the engagement of its contacts UCR1a causes operation of relay SRa to cause the closing of the door and gate. The car does not start as the door and gate reach closed position as contacts ATR1a are separated.

To prevent when a car, say car "a," becomes selected the starting of the car in response to the car button pressed by a passenger who entered the car when unselected and then left, the circuit for car button magnet CBMa is broken as the passenger leaves. This is effected by the separation of contacts UCR2a as the passenger leaves. Contacts UCR2a are effective to break the car button magnet circuit with the car at the main landing as contacts ML5a are separated. Thus as the passenger leaves the car, the operated car button is released.

As on "with attendant" operation, should a car, say car "a," on its downward trip have its basement car button CBa pressed, it is caused to travel to the basement without stopping at the main landing unless its main landing car button is pressed or a down landing call is registered for the main landing. This is effected by the operation of switch LCSa, the circuit for its coil being through contacts DGD1a. Also on "without attendant" operation, the same operation is had if the basement landing call is registered. The registration of this call causes operation of relay FU, the coil of which is connected across loading resistor RULB. Relay FU engages contacts FU1a to cause operation of relay BFa as previously explained. Relay BFa engages contacts BF4a to complete a circuit through contacts DGD1a, HLR3a, BF2b, BF3c, FU1a, BF4a, rectifier RE3a and switch TO4a for the coil of switch LCSa. If a stop is made at the main landing under conditions where a car or landing call is in registration for the basement, switch LCSa is operated as above explained, maintaining the car set for downward travel and the car is restarted in the down direction upon expiration of the time interval provided by relay NTa and the closure of the door and gate.

If a stop is made at the main landing in response to a down landing call for that landing under conditions where no basement call is registered, the car is maintained set for downward travel as switch LCSa is operated as a result of the operation of down main landing relay FD, the coil of relay FD being connected across loading resistor RDL1. Relay FD engages contacts FD1a which upon the engagement of contacts HLR3a completes a circuit for the coil of relay BFa. This relay in turn causes operation of switch LCSa as above explained. Assuming that the passenger enters the car and presses the basement car button CBa, maintaining a circuit by way of contacts DGD1a for the coil of switch LCSa after the expiration of the door time interval, the car is restarted in the down direction upon the closure of the door and gate. Should no one enter the car and press the basement car button or should a basement landing call not be registered, upon the expiration of the door time interval, the door and gate close as above described and the separation of contacts NT4a breaks the holding circuit for the coil of switch LCSa. Switch LCSa drops out to separate contacts LCS1a and engage contacts LCS2a, causing operation of switch DGa to set the car for upward travel. Thus the car parks at the main landing with the door and gate closed.

With one or more unselected cars parked at the main landing, a person wishing to go to the basement will not enter the selected car because its up hall lantern is lighted. Instead he touches the down landing button at the main landing. Relay FD is thus operated to engage contacts FD1 for each of such cars, causing the operation of relay BF for one of them, say car "a," the circuit for the coil of relay BFa being through contacts LT5a, GH2a, HG5a, ML6a, HLR3a, BF2b, BF3c and FD1a. Relay BFa causes operation of switch LCSa to set the car for down. Thus relay HSa is operated, completing a circuit for switch HSXa. Thus the engagement of contacts HSX1a completes a circuit through contacts BF5a for the coil of switch NTa which separates contacts NT3a to break the circuit for the coil of relay SRa which engages contacts SR4a to cause opening of the door and gate for car "a." As the door and gate start to open contacts GH3a engage which completes a circuit through contacts HRX2a, now engaged, to effect the extinguishing of tube D1. Upon the passenger entering the car and pressing basement car button CBa, the car is started in the down direction upon the expiration of the door time interval and closing of the door and gate.

Should a basement landing call be registered with one or more unselected cars parked at the main landing, the operation of relay FU causes the operation of relay BF for one of them. Relay BF causes operation of switch LCS for that car to set the car for down and the car starts down to the basement.

Whenever a car travels to the basement, its direction is changed to up as the stop is made and, upon expiration of the door time interval, the car restarts in the up direction and stops at the main floor, provided no car call for that car is in registration for a floor above, the stop being initiated as a result of the engagement of brush CABa with stationary contact CP1a by way of contacts HG4a. If a car call is registered for a floor above, contacts HG4a are separated so that a stop is not made at the main landing unless in response to a main landing car call or up landing call. When the car is stopped at the main landing under conditions where a car call is registered for a floor above the main landing, it is not considered desirable to hold up the car at the main landing. This is effected by the control of basement relays BMT. When a car, say car "a," goes to the basement, the engagement of brush DSBa with stationary contact DSCBa prepares a circuit for the coil of relay BMTa. If then a call is registered in the car for a floor above the main landing, contacts HG1a engage to complete the circuit for the coil of relay BMTa which operates to engage contacts BMT2a, becoming self-holding. It also separates contacts BMT1a which prevents the establishment of the circuit for the coil of relay ATRa when brush DSBa engages contact DSC1a for the main landing. Thus contacts ATR1a and ATR2a remain engaged when the stop is made at the main landing, permitting the closure of the door and gate and restarting of the car in the up direction upon the expiration of the door time interval and resultant engagement of contacts NT3a. As contacts DGD8a are separated, the added door time interval provided by condenser Q12a is eliminated and thus the same door time interval is provided for the main landing stop as for a stop at an intermediate floor Whenever due to the registration of a down main landing call or a basement landing call, relay BF for a car, say car "a," is operated, the resultant separation of contacts BF2a and BF3a prevents the operation of relay BF for another car in response to such call. This selects car "a" for the basement trip and obviates the selection of either of the other cars to respond to such call. Also, the pressing of a basement car button in a car by causing operation of relay LCS for that car, say car "a," causes the engagement of contacts LCS4a to complete a circuit for the coil of relay BFa, selecting that car for basement service and preventing the operation of relay BF for either of the other cars in response to a down main landing call or basement landing call.

The system may be arranged so that under light traffic conditions all cars, including the selected car, when at the main landing park with their doors and gates closed. This is effected, say for car "a," by closing change-over switches COS1a and COS6a, opening change-over switch COS3a and moving change-over switch COS5a to its upper position. Operation of switch COS5a to its upper position by-passes contacts SC2a and UCR1a in the circuit for the coil of relay SRa so that contacts SR1a are engaged to effect the closing of the door and gate upon the engagement of contacts NT3a, regardless of whether the car is selected or not. Thus contacts SC2a and UCR1a could be eliminated for such circuit arrangement. In a system arranged for this operation, switches UC and relays UCR also could be eliminated. This is illustrated for car "a" by opening of switch COS3a. Under such conditions, contacts ML5 and the switch TO16a also could be eliminated, and the closing of switch COS6a illustrates this condition. With this arrangement, should an intending passenger at the main landing desire to be carried to a floor above, he touches up landing button U1. This causes operation of relays HS for all cars at that landing and the engagement of contacts HS2 for all such cars, completes a circuit for the coil of switch HSX for all such cars. Switch HSX for the selected car, say car "a," in turn engages contacts HSX1a to complete a circuit through contacts EY7a and SC7a for the coil of switch NTa. Switch NTa separates contacts NT3a to break the circuit for the coil of relay SRa. Relay SRa drops out, engaging contacts SR4a to complete a circuit for the coil of switch DOa. Thus the door and gate are opened to enable the passenger to enter the car. Assume that he does so and presses a car button for a floor above. This causes operation of switch HGa which engages contacts HG3a to complete a circuit for the coil of relay HCLa. Relay HCLa separates contacts HCL2a to break the energizing circuit for the coil of relay ATRa. Upon the expiration of the door time interval, contacts NT3a engage to effect the reclosing of the door and gate and, as contacts ATR1a are engaged, the starting of the car as the door and gate reach closed position.

With one or more cars parked at the main landing and with a person wishing to go to the basement touching the down landing button at the main landing, the door and gate of one of them is opened and that car is set for downward travel. Thus the passenger may enter that car, push the basement car button and be carried to the basement as previously explained. This car may be the selected car as contacts GH2 for that car are in engagement. Should the car, say car "a," be the selected car, its selection relay SCa is dropped out as a result of the separation of contacts HRX4a. Thus another car is selected.

Should no one enter the car and press the basement car button, the direction of car travel is changed back to up upon the expiration of the door time interval and the car parks with the door and gate closed. The delay in the dropping out of relay ATRa as its circuit is broken by the separation of contacts DGU4a prevents the energization of the pawl magnet.

Should an intending passenger inadvertently enter an unselected car, say car "a," as during passenger discharge time, the door and gate close upon the expiration of the door time interval. Assuming that he presses a car button for a floor above, this completes a circuit by way of contacts HG3a for the coil of relay HCLa as above described, even though the car is not selected. Thus the circuit for the coil of relay ATRa is broken and the car is started in the up direction upon the closing of the door and gate. This avoids trapping the passenger in the car until the car is selected. With the circuits thus arranged, a car is started from the main landing in response to a car call, regardless of the condition of the other cars.

When a car, say car "a," becomes filled to a certain percent of capacity, say 80%, load switch LSa automatically closes. Thus, upon operation of the switch DCa to close the door and gate, a circuit is completed for the coil of load responsive relay LRRa, the circuit being by way of switch LSa, contacts DC4a and throw-over switch TO8a. Relay LRRa separates contacts LRR1a to break the circuit for the coil of non-stop relay NOa. This relay drops out to separate contacts NO3a, rendering brushes UPBa and DPBa ineffective to pick-up landing calls. Relay NOa also separates contacts NO5a to prevent lighting of the hall lanterns. The car buttons are unaffected by the operation of relay NOa and stops are made to discharge passengers. When a stop is made, the holding circuit for the coil of rely LRRa, established by the engagement of contacts LRR2a, is broken incident to the opening of the door and gate by the separation of contacts DO5a. Thus contacts LRR1a reengage to cause reoperation of relay NOa to effect the lighting of the hall lantern for the direction of car travel. Thus intending passengers for the direction of car travel are advised that they may enter the car, provided room is made available in the car by the passenger discharge.

Assume now a period in which the traffic is substantially all in the up direction as during the morning peak. As before, switch TPS is set in position to complete the circuit for the coil of switch UP. This switch operates to render up time relay UTR effective to provide timing intervals for up peak traffic conditions, this interval being the optimum loading time as on "with attendant" operation. Switch UP also operates to render spacing calls ineffective to control starting of the cars and instead the starting of the cars in the up direction subject to timing operations.

Under up peak traffic conditions, the selected car at the main landing at the time the previous car left is automatically started on its upward trip upon the expiration of a given timing interval after the departure of the previous car or the registration of a call to which the car is subject, whichever occurs later. The cars park at the main landing with their respective doors and gates open. Upon the arrival of a car, say car "a" at the main landing, a circuit is completed through switch DZa, contacts XCS3a, switch TO14a and contacts SR4a for the coil of switch DOa to effect the opening of the door and gate. The reclosure of the door and gate of a car is not effected until the car has been selected and the time interval of relay UTR expires as the operation of relay HCLa, assuming car "a" to be selected, and thus in turn relay ATRa, relay SRa and switch DCa is dependent upon the engagement of contacts UTR1a.

Assume all three cars at the main landing with car "a" selected. Under such conditions a circuit is completed for the coil of relay UTR through contacts SC1a. As contacts SC8 for only car "a" are engaged, only the up hall lantern at the main landing for car "a" will be lighted, directing incoming passengers to that car. Assume that passengers enter car "a" and press car buttons for floors above. This causes operation of switch HGa to engage contacts HG2a, in turn to complete a circuit for the coil of switch HJa. Thus contacts HJ1a are separated breaking the energizing circuit for the coil of relay UTR. Relay UTR is delayed in dropping out as previously described, enabling the car to receive further passengers before being started on its upward trip. When relay UTR drops out, it engages contacts UTR1a to complete a circuit for the coil of relay HCLa. This relay operates to cause the dropping out of relay ATRa to complete by the engagement of contacts ATR2a a circuit for the coil of relay SRa, the time interval provided by switch NTa having previously expired so that contacts NT3a are in engagement. Thus upon operation of relay SRa, a circuit is completed by way of contacts SR1a, SH1a and DO4a and switch DCL1a for the coil of switch DCa to cause the closing of the door and gate. Also the engagement of contacts SR1a completes a circuit for the operating coil of pawl magnet PMa. Thus, as the door and gate reach closed position, the advance of the carriage takes place and the car is started in the up direction as previously described. Switch HCLa also causes reoperating of relay UTR.

The dropping out of relay HLRa incident to starting of the car enables another car, say car "b," to be selected as previously described. Contacts SC1b establish another circuit for the coil of relay UTR. Assume that passengers enter car "b" and register car calls for floors above. This causes separation of contacts HJ1b to break the circuit for the coil of relay UTR and upon expiration of the timing interval the door and gate are closed and the car is started in the up direction.

Incident to the starting of car "b," car "c" is selected. Upon the registration of a car call in car "c," contacts HJ1c separate to start the timing interval and when this interval expires, the door and gate are closed and the car is started in the up direction as above described.

Thus it is seen that under up peak conditions, each car when selected is automatically started upon the expiration of loading time after the registration of a car call in that car. Each car upon reaching its highest call becomes set for travel in the down direction as previously explained. Upon the expiration of the door time interval for that car, the car is automatically started in the down direction.

When interfloor traffic arises, the next selected car is automatically started upon the expiration of the timing interval after the registration of a landing call to which the car is subject, i. e., an up landing call above the main landing or a down landing call above all other cars, assuming this call to be registered after the departure of the previously selected car and that throughout this interval there are in registration one or more such landing calls. Also an overlapping car call for that car for a floor above will continue the interval. Had a landing call to which the newly selected car is subject been in registration at the time of the departure of the previously selected car, the newly selected car is automatically started upon the expiration of the timing interval after the departure of the previously selected car, provided again that there is continuous registration of such landing calls during this interval or an overlapping car call above is registered for that car during this period. Assuming that car "b" is the newly selected car and that no call above to which this car is subject is in registration at the time of departure of the previously selected car, the circuit for the coil of relay UTR is through contacts SC1b. When a landing call above to which this car is subject is registered, contacts HJ1b separate to break the circuit for the coil of relay UTR and thus start the timing interval. Had such call been in registration at the time of departure of the previously selected car, the engagement of contacts SC1b does not establish a circuit for the coil of relay UTR as contacts HJ1b are separated. Thus upon the separation of contacts SC1a, assuming car "a" to have been the previously selected car, the circuit for the coil of relay UTR is broken, starting the timing interval from the departure of the previously selected car. In any event, if during this timing period there is continuous registration of one or more calls to which the newly selected car "b" is subject, contacts HJ1b are maintained separated and at the expiration of the timing interval, contacts UTR1b engage to cause the operation of relay HCLb and thus effect the closing of the door and gate and the starting of the car in the up direction.

Should a selected car, say car "a," at the main landing become loaded to a certain percentage, say 80%, of capacity, it is automatically started in the up direction without waiting on the expiration of the timing interval. In the circuits illustrated, this is effected by the closing of load switch LSa. This completes a circuit for the coil of relay LRRa through contacts ML3a and contacts NT1a, assuming that switch NTa has timed out to insure that the load weighing operation is not effected by undischarged passengers as the car arrived at the home landing. Relay LRRa engages contacts LRR3a to complete a circuit for the coil of relay HSLa which operates to cause the closing of the door and gate and the starting of the car in the up direction as previously described. Switch HCLa also causes reoperation of relay UTR to prepare the circuits for the establishment of a new timing interval for the next selected car. Thus, the selected car is automatically started on its upward trip as soon as it becomes loaded to a certain percent of capacity or, if it does not become so loaded, upon the expiration of the given timing interval after the starting of the previously selected car under conditions where there has been during this timing interval continuous registration of one or more calls to which the newly selected car is subject or, if there has been no such continuous call registration during such period, after the registration of a call to which the newly selected car is subject, provided again that during this timing interval there is continuous registration of one or more calls to which the newly selected car is is subject. Should it be desired to restart the timing interval when a car is load dispatched, regardless of whether or not it is the selected car, switch HTC is moved to its lower position as explained for "with attendant" operation.

Should there be no other car at the main landing at the time a selected car leaves, the circuit for the coil of relay UTR is broken as contacts SC1a, SC1b and SC1c are all separated. Thus the timing interval starts to run incident to the starting of the selected car. If upon the arrival of a car, say car "a," at the main landing, no call is in registration to which the car is subject, contacts HJ1a are in engagement so that the engagement of contacts SC1a re-establishes the circuit for the coil of relay UTR. The timing interval is then restarted upon the registration for a floor above of a car call for car "a" or an up landing call, or upon a registration of a down landing call above the other cars.

Should the timing interval have expired under the above assumed conditions before a car, say car "a," arrived at the main landing, contacts HT1a act to prevent the restarting of the car in the up direction until it is determined whether or not the engagement of contacts SC1a causes the operation of relay UTR, as explained for "with attendant" operation. If there be a call in registration to which the car is subject, contacts HJ1a are separated so that the engagement of contacts SC1a does not cause reoperation of relay UTR. Thus, upon the engagement of contacts HT1a, relay HCLa is operated and upon the engagement of contacts NT3a, relay SRa is operated to cause the closing of the door and gate and starting of the car in the up direction.

Assume now a period in which the traffic in each direction is substantially equal. For such condition, switch TPS is set in position to cause operation of switch UD. This causes the cars to be automatically started on their up trips on a spacing interval basis or prior to the expiration of the spacing interval if a spacing call is registered. The engagement of contacts UD1 sets the drop out time of relay UTR to give the desired spacing interval for starting the cars in the up direction as explained for "with attendant" operation. The engagement of contacts UD2 renders relay DTR effective to provide a spacing interval for starting the cars on their downward trips. The spacing intervals are independent of the registration of calls.

When a car arrives at the main landing, its door and gate open as described for up peak operation. The reclosure of the door and gate is not effected until the spacing interval expires or a spacing call is registered. Assume that car "a" is at the main landing and selected, and that the time interval provided by relay UTR is running. Upon the expiration of this interval, contacts UTR1a engage to complete the circuit for the coil of relay HCLa to cause the closure of the door and gate and starting of the car in the up direction as explained under up peak operating conditions. Also, the operation of relay HCLa re-establishes the circuit for the coil of relay UTR. Incident to the starting of car "a," contacts SC1a separate to restart the timing interval. This is true regardless of whether or not contacts HJ1 for the next selected car are engaged inasmuch as contacts UP1 are separated. Thus the timing interval runs from the starting of the selected car, regardless of whether or not calls are in registration to which the next selected car is subject.

If another car is at the main landing at the time that car "a" leaves, it is selected and upon the expiration of the spacing interval is automatically started on its upward trip. If not, the next car to arrive at the main landing is immediately selected and is automatically started on its up trip as the spacing interval expires. If the spacing interval has expired before the car arrives, the car is started on its upward trip immediately on arrival, subject to the expiration of the door time interval.

Assume now that car "a" arrives at the upper terminal. As it does so, switch DZa closes to cause the opening of the door and gate and switch DGa is reset to set the car for downward travel. Also, the engagement of brush DSBa with contact DSCTa completes a circuit through contacts DDR3a and LT2a to cause operation of relay ATRa to prevent the starting of the car on its downward trip before the dispatching operation is initiated. Assume further that no other car is at the upper terminal at this time. As the previous car left, the separation of its contacts DDR1 broke the circuit for the coil of relay DTR, permitting this relay to time out. As car "a" arrives at the upper terminal, relay SCTa is operated to select car "a" and, assuming that relay DTR has already timed out, to complete a circuit for the coil of relay DDRa. Relay DDRa engages contacts DDR2a to become self-holding and engages contacts DDR1a to re-establish a circuit for the coil of relay DTR. It also separates contacts DDR3a to break the circuit for the coil of relay ATRa. Relay ATRa upon dropping out engages contacts ATR2a which together with the engagement of contacts NT3a at the expiration of the door time interval, completes a circuit for the coil of relay SRa to cause the closing of the door and gate and starting of the car in the down direction. As the car leaves the terminal, the circuits for the coils of relay SCTa and DDRa are broken. The resultant separation of contacts DDR1a breaks the circuit for the coil of relay DTR to restart the timing interval. If no landing call is registered for the top terminal under such conditions, relay HS is not operated so that a short door time interval is provided.

As explained under "with attendant" operation, relay DTR assures a reasonable spacing of the cars from the upper terminal without unduly increasing the possibility of delaying the dispatching cycle. Briefly, assume that car "a" arrives at the top terminal about up spacing interval after the arrival of the preceding car. Assuming again that the time interval provided by relay DTR is half that provided by relay UTR, the down spacing interval will have expired before car "a" arrives. Thus contacts DTR1a are in engagement so that the door and gate for car "a" close immediately upon expiration of the door time interval and the car starts on its downward trip. Thus car "a" is maintained spaced from its preceding car a full up spacing interval. Had car "a" arrived earlier, it still closes its door and gate and starts downwardly upon expiration of the door time interval unless it arrives before the down spacing interval expires. In that event, car "a" has to wait upon the down spacing interval and when this occurs, relay DDRa is operated. This prevents starting of car "a" too quickly after its preceding car, thereby assuring a reasonable spacing of the cars. Had car "a" arrived at the upper terminal later than the up spacing interval after the arrival of its preceding car, it would still close its door and gate upon the expiration of the door time interval and start on its downward trip. The advantages of this arrangement have been explained in describing "with attendant" operation.

Should a call be registered which the other cars will not answer, the selected car at the main landing is started on its upward trip without waiting the expiration of the spacing interval. Such call is preferably a spacing call as determined for light traffic conditions. Such call causes the operation of relay HJ for the selected car so that with each of the other cars either set for down or at the main landing as signified by its SU relay being dropped out, the engagement of contacts HJ3 for the selected car, say car "a," completes a circuit by way of contacts UP3a, SU1b, SU2c, HJ3a and SC3a for the coil of relay HCLa without waiting on the engagement of contacts UTR1a. Relay HCLa thus acts to cause the closing of the door and gate and the starting of the car in the up direction as previously described. Also, should a car at the main landing become loaded to the given percentage of capacity, it is automatically started on its upward trip without waiting on the expiration of the spacing interval, this being effected by the engagement of contacts LRR3 for that car as previously described. When a down car is loaded sufficiently to cause it to automatically by-pass landing calls, contacts NO1 for that car by-pass contacts HJD1 for that car so that a down landing call which is registered need not be above the non-stopped car to effect the starting of another car from the main landing on its upward trip. In any event, a new time spacing interval is initiated incident to the starting of a car from the main landing. This will be only the selected car if switch HTC is in its upper position. If switch HTC is in its lower position, any car which starts on its up trip from the main landing starts the timing interval.

So long as the down spacing interval has not expired, a car is caused to travel to the top terminal, regardless of whether or not there is a call registered for that floor to which the car is subject. This is due to the fact that contacts DTR1 prevent completion of the circuits for the coils of switch HR and relay DDR for that car. When a car has not reached the upper terminal by the time that the down spacing interval has expired and there is no call above it to which it is subject, it is brought to a stop at a floor below, preferably in a certain zone, set for downward travel and started on its downward trip upon the expiration of the door time interval, provided that, if one or more of the other cars are each either set for downward travel or at the main landing, there is a down call in registration above such other car. It is believed that in view of the description of "with attendant" operation this will be understood without detailed explanation.

Each car upon being started on its upward trip is caused to travel at least to the fourth floor because of the control of switch HG for that car by switch DPUD. Assume that the down spacing interval has expired, causing contacts DTR1 for each car to engage. Provided that the HJX relay for each of the other cars is operated, as soon as a car, say car "a," arrives at call pick-up distance from the fourth floor with no call to which it is subject in registration to indicate or require further travel in the up direction or, if such call exists, as soon as it reaches call pick-up distance from its highest car call or down landing call, switch HJa is dropped out to engage contacts HJ2a. The engagement of both contacts HJ2a and contacts DTR1a causes operation of switch HRa. Thus the car is caused to stop at the floor which conditions dictate and become set for downward travel and the door and gate are opened. Upon the expiration of the door time interval, the door and gate reclose and the car starts its downward trip. If the stop is made at a landing for which no call is registered, as for example at the fourth floor under the conditions above set forth, a short door time interval is provided as relay HS for that car is not operated. Each of the other cars, if an up car, has its HJX relay operated provided it has not as yet reached the zone or there is a call above it to which it is subject. If such other car is a down car or at the main landing, its HJX relay is operated if there is a down call above it as its SU relay is not operated when the car is set for downward travel or stopped at the main landing.

If before a car, say car "a," is stopped at the main landing on its downward trip, a basement landing call is registered or a basement car call is registered for that car, switch LCSa is operated to maintain the car set for downward travel and thus cause it to run directly to the basement or, if a stop is made at the main landing, to restart the car in the down direction upon the expiration of the door time interval. The circuit for operating switch LCSa by button CBa is through contacts DGD1a. If the call is a landing call at the basement, a circuit is established through contacts DGD1a and FU1a to cause operation of relay BFa which in turn causes operation of switch LCSa. If switch COS2a is in its upper position when more than one car is at the main landing the registration of a basement car call in the unselected car changes the direction of car travel to down and causes the car to travel to the basement. Similarly, the registration of a basement landing call causes the operation of relay BF for such car which in turn causes the operation of switch LCS for that car to cause the car to travel to the basement. Should two or more cars be at the main landing and an intending passenger touch the down landing button at that landing, the resultant operation of switch LCS for the unselected car causes the down hall lantern for that car to be lighted to advise the intending passenger as to which car to enter. Thus upon pressing the basement car button in that car, the car is caused to travel to the basement. Inasmuch as contacts LT4a are in engagement, the car on its return from the basement is always caused to stop at the main landing. The cars are selected for basement operation as described for light traffic conditions.

When a car, say car "a," fails to start within a certain period after a stop is made or a dispatching operation, the car is temporarily removed from the dispatching and control system as explained under "with attendant" operation. In addition, the separation of contacts XDC2a prevents the reopening of the door and gate in response to the touching of a landing button at the floor at which the car is stopped.

When a car is taken out of service during "without attendant" operation, the motor generator set is maintained operated until the door and gate for that car close as explained for "with attendant" operation. Also relay NO for that car separates its contacts NO2 to increase the discharge time for condenser Q1 and thus the up spacing interval in accordance with the lower number of cars in service. This applies when the system is set for up-down traffic conditions and when it is set for up peak traffic conditions.

Assume now a period in which traffic is substantially all in the down direction, as during the evening peak when the building is being depopulated. For such conditions, switch TPS is set in position to cause operation of switch DP. This switch operates to cause operation of switch DPUD and to render relay DTR effective for down peak traffic conditions as explained under "with attendant" operation. It also engages contacts DP2 to render the coil of relay HCL for each car subject to the HRX3 contacts for that car as the car comes to a stop at the main landing and becomes set for upward travel. Thus, with the system set for down peak traffic conditions, the cars are automatically started on their down trips on a spacing interval basis and are started from the main landing on their up trips immediately, subject to the door time interval.

Assume that car "a" arrives at the upper terminal and becomes set for downward travel and that no other car is at the upper terminal at this time. As the car arrives, relay ATRa is operated and also relay SCTa is operated to select car "a." Assuming that relay DTR has timed out by the time that relay SCTa is operated, a circuit is completed by the engagement of contacts SCT1a for the coil of relay DDRa. This relay operates to separate contacts DDR3a, breaking the circuit for the coil of relay ATRa. Relay ATRa upon dropping out engages contacts ATR2a which together with engagement of contacts NT3a at the expiration of the door time interval completes a circuit for the coil of relay SRa to cause the closing of the door and gate and the starting of the car in the down direction. As the car leaves the terminal, the circuits for the coils of relay SCTa and DDRa are broken. The resultant separation of contacts DDR1a breaks the circuit for the coil of relay DTR to restart the timing interval.

If the next car, say car "b," arrives at the upper terminal before the expiration of the down spacing interval, its door and gate are caused to reclose when the spacing interval expires and the car is started on its downward trip, provided also the door time interval has expired. The spacing interval is restarted as the car leaves the terminal floor as above set forth.

Should there be a call for the upper terminal to which the next car is subject and the car arrives at the upper terminal after the expiration of the down spacing interval, its door and gate are caused to reclose immediately upon expiration of the door time interval and the car is started in the down direction. However, should the down time spacing interval expire before another car arrives at the upper terminal and there be no call to which the car is subject above it in the zone it may be brought to a stop at a floor in the zone, set for travel in the down direction and started on its downward trip upon the expiration of the door time interval, the same as described for up-down traffic conditions. As a brief résumé of this operation, assume that car "a" is set for downward travel, that cars "b" and "c" are set for upward travel and that a down landing call is registered above car "a,"

This causes the operation of relay HJX*a* to separate contacts HJX1*a* and HJX2*a* in the circuits for the coils of switch HJ and relay HJX for each of the other cars. Thus, as soon as say car "*b*" reaches the upper zone and its highest call, switch HJ*b* and relay HJX*b* are dropped out and, as the down spacing interval has expired, car "*b*" is caused to slow down and stop at the floor of such highest call or at the next floor in which a stop can be made if there is no call above and become set for downward travel. Upon the expiration of the door time interval, its door and gate reclose and it is started on its downward trip. With cars "*a*" and "*b*" both set for downward travel, the registration of a down landing call above both cars causes operation of the HJX relays for both cars, thus enabling car "*c*" to be brought to a stop in the zone and started on its downward trip, provided the down spacing interval has expired.

When a car, say car "*a*," arrives at the lower terminal, it becomes set for upward travel as soon as it is brought to a stop as previously described. Switch HRX*a* is operated to cause the engagement of contacts HRX3*a* which completes a circuit through contacts DP2*a* for the coil of relay HCL*a*. Thus upon the expiration of the door time interval, the door and gate reclose and the car is started on its upward trip.

From the above description it will be seen that there is provided a dispatching and control system for a plurality of elevator cars in which the cars may be operated either with or without attendants and in which the cars are dispatched on their upward and downward trips on both "with attendant" and "without attendant" operation. The dispatching on "with attendant" operation is effected by giving dispatching signals to the cars whereupon the attendants start the cars. On "without attendant" operation, the dispatching is effected by automatically starting the cars.

When a car is on its upward trip, it stops at floors for which its own car calls are registered and at floors for which up landing calls are registered. A stop may be made under certain conditions at a floor for which a down landing call is registered. During downward travel of the car, stops are made in response to its car calls and to down landing calls. In each case, the stops are made in the natural order in which the floors are reached, regardless of the order in which the calls are registered.

Under light or intermittent traffic conditions, the dispatching of a car on its upward trip is effected in response to a spacing call, i. e., under conditions where each of the other cars is either set for downward travel or at the main landing, a car call for the selected car for a floor above the main landing, an up landing call for a floor above the main landing, or a down landing call for a floor above all cars. A car on its upward trip may stop at a floor in response to a down landing call, provided this is its highest call. Also a car may stop at a floor at which no call is registered as under conditions where a call above is answered by another car. When a car is stopped in response to its highest call, i. e., car call or down landing call, its direction is changed to down and it is immediately dispatched on its downward trip.

Under up peak traffic conditions, the dispatching on its upward trip of a car which was at the main landing when the previous car left is effected upon expiration of a given timing interval which is begun incident to the starting of the previous car or upon the arising of a condition in which a call is in registration to which the car is subject, whichever occurs later. Such call may be a car call for a floor above the main landing for that car, any up landing call for a floor above the main landing, or any down landing call for a floor above all cars. If such call is answered before the interval expires, the interval is canceled and restarted upon the registration of another call to which the car is subject. However, the interval may be continued by overlapping calls to which the car is subject. Should there be no car at the main landing at the time the previous car left, the timing interval is begun with the departure of the previous car. Should at the time of arrival of the next car a call be in registration to which the car is subject, the car is dispatched immediately if the interval has expired or upon the expiration of the interval if such call continues or there are overlapping calls during the remainder of the interval. If not, the interval is cancelled and restarted upon the registration of such a call. As under light traffic conditions, a car on its upward trip may stop at a floor in response to a down landing call, provided this is its highest call. When a car is stopped in response to its highest call, i. e., car call or down landing call, its direction is changed to down and it is immediately dispatched on its downward trip.

Under up and down traffic conditions, the dispatching of a car on its upward trip is effected at the expiration of a timing interval which is begun incident to the starting of the previous car, regardless of whether or not calls are in registration. However, the car is dispatched in response to certain calls, preferably the same calls as for light traffic conditions, without waiting on the interval. The cars are also dispatched on their downward trips on a timing basis wherein the timing interval starts incident to the departure of the previous car. The up dispatching interval is adjusted to equal the sum of the average round trip time and the average loading time, divided by the number of cars. The down dispatching interval is made less, say half of the up dispatching interval, to obviate bunching of the cars without unduly increasing the possibility of delaying the dispatching cycle. Where a car has not reached the upper terminal by the time that the down timing interval has expired, it may be brought to a stop at a floor below, set for downward travel and dispatched on its downward trip, provided that the car has reached its highest call and that, if one or more of the other cars are each either set for downward travel or at the main landing, there is a down landing call in registration above such other cars.

Under down peak traffic conditions, the cars are dispatched on their downward trips on a timing basis, wherein the timing interval starts incident to the departure of the previous car. Upon their arrival at the main landing, the cars are immediately dispatched on their upward trips. As under up and down traffic conditions, when a car has not reached the upper terminal by the time the down timing interval expires, it is dispatched on its downward trip from a floor below, preferably in a certain zone, provided it has reached its highest call and that, if one or more of the other cars are each either set for downward travel or at the main landing, there is a down call in registration above such other car.

The cars are selected for dispatching on their upward trips under light traffic, up peak traffic and up and down traffic conditions. They are also selected for dispatching on their downward trips under up and down traffic and down peak traffic conditions. The selection of the cars for both up and down dispatching is on a non-sequence basis, i. e., the cars are selected in the order in which they reach the point from which they are dispatched, regardless of the order of their previous dispatching. Where another car is already at a terminal floor at the time the selected car leaves, the other car is selected incident to the starting of the selected car. When a car is selected at the main landing, its up hall lantern is lighted to advise intending passengers that they should enter that car. Also as each stop is made, the hall lantern indicative of the next direction of car travel is lighted.

As each stop is made the doors open automatically. On "with attendant" operation, the doors are closed in response to the attendant pressing the start button. On "without attendant" operation, the doors close automatically upon the expiration of the door time interval, subject to the terminals to the dispatchng mechanism. Under light traffic conditions, the selected car may park at the main landing with its doors open and the other cars with their doors closed. When the selected car is dispatched, its doors close, and the doors for the next selected car open. Also, all the cars may park at the main landing with their doors closed. Under other traffic conditions, when a car arrives at the main landing its doors remain open and close automatically when the car is dispatched.

The door time interval under "without attendant" operation varies in accordance with the conditions under which the stop is made. When a stop is made in response to a car call or at a floor having no call, a short door time interval is provided as passenger discharge can be effected relatively quickly. When a stop is made in response to a landing call, a longer door time interval is provided as a longer time in effecting the passenger transfer is involved. When a stop is made at the main landing on a downward trip, a still longer door time interval is provided as there is usually a considerable number of passengers to be discharged. Also when an intending passenger is waiting to enter the car and carried to the basement, it also allows time for him to enter the car before the door closing operation takes place. This still longer door time interval is not provided when a stop is made at the main landing on a trip up from the basement.

When a stop is made in response to an up landing call under conditions where there is no call above and should no one enter the car and press a car button for a floor above, the direction of car travel is automatically changed to down and the down hall lantern is lighted and the up hall lantern is extinguished. Under "with attendant" operation, this is effected in response to the attendant pressing the start button to start the car. Instead of the doors closing, the down dispatching signal is given whereupon the attendant releases the start button. After allowing time for any intending passengers desiring to go down to enter the car, he represses the start button whereupon the doors are closed and the car is started in the down direction. Under "without attendant" operation this is effected automatically. At the expiration of the door time interval, the doors close automatically and, should no call be registered for a floor above, the changing of the direction to down and the lighting of the down hall lantern is effected, the doors reopen and upon expiration of the door time interval reclose and the car starts in the down direction. The first door closing operation may be omitted in which event the down hall lantern is lighted and the direction changed to down as the first door time interval expires and the doors close and the car starts upon the expiration of another door time interval.

Should a selected car at the home landing become loaded to a certain percent of capacity, it is immediately dispatched on its upward trip. If desired, the system may be arranged to restart the timing interval when an unselected car is load dispatched or started on its upward trip for any other reason.

When a car is taken out of service, it does not affect the control of the dispatching of the other cars by the calls. The same is true when a car is operating non-stop.

Basement service is provided by all cars. Under "with attendant" operation, each car on its downward trip stops automatically at the main landing and changes the direction in which it is set to travel to up, unless a basement car call for that car is registered before the car reaches the main landing. When such basement car call is registered before the car reaches the main landing, the car is selected for basement travel and goes to the basement without stopping at the main landing unless a main landing car call for that car or a down main landing call is registered. When a stop is made at the main landing under such conditions, the direction of travel is maintained set for down so that the car continues in the down direction in response to the attendant operating the start control. If when a car is at the main landing a passenger enters the car and requires to be carried to the basement, the attendant registers a basement car call, selecting the car for basement service. Also when a basement landing call is registered a signal is given the attendant when the car stops at the main landing. This also selects the car for basement service and the attendant upon receiving the signal registers a basement car call. Selection of the car for basement service prevents another car being selected for answering a basement landing call, thus obviating unnecessary trips to the basement. When a basement car call is registered after the stop is made at the main landing as under the above conditions, the direction of travel is changed back to down and the car is started down to the basement in response to the attendant operating the start control. If the car which makes such basement trip had been selected for up travel, the selection is cancelled, enabling another car to be selected. When a car makes a trip to the basement, it is stopped automatically at the main landing on its upward trip even though it has no car call for the main landing and no up main landing call is registered.

Under "without attendant" operation, each car on its downward trip stops automatically at the main landing and changes the direction in which it is set to travel to up, unless a basement car call is registered for that car before the main landing is reached. When such basement car call is registered before the car reaches the main landing, the car goes to the basement without stopping at the main landing unless a main landing car call for that car or a down main landing call is registered. When a stop is made at the main landing under such conditions, the direction of travel is maintained set for down and the car after the stop at the main landing automatically starts in the down direction to answer the basement call. Also, under "without attendant" operation, a basement landing call acts like a basement car call, causing the car to run past the main landing without stopping unless a main landing car call for that car or down main landing call is registered and causing the car after a stop at the main landing to automatically travel to the basement to respond to the basement landing call. Also when a stop is made at the main landing under conditions where the down landing call for that landing was registered, the car remains set for downward travel for a certain interval. If a passenger enters the car and registers a basement car call within the interval, the car travels to the basement. If no basement car or landing call is registered during this interval, the direction in which the car is set to travel is changed to up. The above operation is preferably provided for all traffic conditions under "without attendant" operation.

When the system is set for light traffic conditions under "without attendant" operation, a car parked at the main landing may travel to the basement if a basement car or landing call is registered. With the system arranged so that only the car selected for up travel parks at the main landing with its doors open, a car unselected for up travel provides the basement service. A passenger intending to go down will not enter such selected car because its up hall lantern is lighted. Instead he operates the down landing call registering control which causes the down hall lantern for a car unselected for up travel to be lighted, advising the intending passenger which car he is to use. It also effects the opening of the doors for that car, enabling him to enter the car and register a basement car call. This causes the car to go to the basement as soon as the doors reclose. The registration of a basement landing call causes a car unselected for up travel to go to the basement, without effecting the opening and reclosing of the doors. The system may be arranged so that under light traffic conditions all cars park at the main landing with their doors closed. In such case a car selected for up travel may provide the basement service and in that event another car is selected for up travel. When a car makes a trip to the basement under light traffic conditions and a passenger enters the car and registers a car call for a floor above the main landing, the car on its upward trip runs past the main landing without stopping there unless a car call or an up landing call for the main landing is registered. Under other traffic conditions a stop at the main landing is made.

With the system set for other than light traffic conditions under "without attendant" operation, it may be arranged so that any car waiting at the main landing can provide basement service or so that a car unselected for up travel waiting at the main landing can provide basement service. However, under all traffic conditions, a car may be selected for basement service by registration of a basement landing call or a basement car call for that car. When such selection is made, no other car will be selected for answering a basement landing call.

While the invention has been described as applied to a system having "with attendant" operation and "without attendant" operation, it is applicable to systems arranged only for "with attendant" operation or only for "without attendant" operation. While described as applied to a system in which landing calls are registered by firing gas tubes, the landing calls may be registered in other ways. Also the car calls can be registered in other ways, as by employing floor relays individual to the car buttons or by firing gas tubes. Other circuit arrangements and mechanism for controlling the starting and stopping of the cars may be employed. Also the cars may be controlled in other ways, as for example, on "with attendant" operation stopping may be controlled by the car attendants with stops for intending passengers indicated by signals.

While a three car, six floor and basement installation has been described, it is to be understood that the invention is applicable to installations of other numbers of cars, especially a small number of cars such as two or four, and other numbers of floors. Also the invention is applicable to installations having no basement or to installations having more than one basement. In case of more than one basement, low call reversal may be employed, i. e., stop on an up call if no call below and upon such stop and upon a car call stop with no calls below, set for upward travel. The number of floors in the zone in which reversal may be effected under up-down traffic conditions and down peak traffic conditions may be varied. Landing calls to which a car is subject may vary, depending upon the particular installation. For example, under up peak traffic conditions a car may be subject to any down landing call above the main landing instead of above all cars. This may be effected by having relay HJD for the selected car effect the operation of switch HJ for that car. A spacing call to which a car is subject under up-down traffic conditions may be regarded as a call behind the car ahead and for certain installations this may be regarded as an up landing call below a car set for upward travel. The system may be arranged so that under up peak traffic conditions the timing interval starts with the departure of the dispatched car on its upward trip or the registration of a call to which the next car would be subject, whichever occurs later, regardless of whether or not the next car had arrived at the lower terminal floor. This may be effected, for example, by controlling relay UTR by an additional circuit having therein in series relationship breaking contacts on each of the ML switches, breaking contacts on relay HJDX and breaking contacts on a relay operable solely in response to one or more up landing calls above the lower terminal being in registration. On the other hand, the system may be arranged so that under up peak traffic conditions the timing interval cannot start unless the next car has arrived at the lower terminal floor. This may be effected, for example, by controlling relay UTR by an additional circuit having therein in series relationship breaking contacts on each of the ML switches. The arrangement for providing door time intervals dependent upon the conditions under which the stop is made, particularly the provision of a shorter interval for car call or no call stops than for landing call stops, may be used with other arrangements of elevator control systems, especially those in which both the starting and stopping of the car is under the control of the passengers and intending passengers themselves. The arrangement for changing over to opposite direction and to the hall lantern for the opposite direction when at the expiration of a time interval no demand for service exists for continuing in the direction in which the car arrived at the floor is also applicable to other forms of elevator control systems, particularly those in which both starting and stopping of the car is under the control of the passengers and intending passengers themselves.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. A dispatching and control system for a plurality of elevator cars serving a plurality of floors from a terminal floor comprising; call registering means for each of said plurality of floors; mechanism for dispatching all of said cars from said terminal floor; timing means for said cars for providing a loading time interval for each car prior to its being dispatched from said terminal floor; and means operable under conditions where at the time of departure of a dispatched car from said terminal floor one or more other cars are at said terminal floor for causing the loading time interval for said next car to be dispatched to begin from the time of said departure of said dispatched car, provided a call is in registration at that time or, if no call is in registration at the time of said departure, from the registration of a call.

2. A dispatching and control system for a plurality of elevator cars serving a plurality of floors from a terminal floor comprising; call registering means for each of said plurality of floors; means controlled, under conditions where all of said cars are idle at said terminal floor, by the registration of a call for dispatching a first of said cars from said terminal floor upon the expiration of a loading time interval after such call is registered; and means controlled by the departure of said first car from said terminal floor and by the calls that are registered for dispatching a second of said cars from said terminal floor upon the expiration of a loading time interval after such departure, provided there has been continuous call registration during such interval.

3. A dispatching and control system for a plurality of elevator cars serving a plurality of floors from a terminal floor comprising; call registering means for each of said plurality of floors; dispatching mechanism for said cars for dispatching each car from said terminal floor upon the expiration of a predetermined time interval after the departure of the preceding car from said terminal floor, provided there is continuous or overlapping call registration during the interval; and means controlled by calls registered by said call registering means and operable in the event that at the time of said departure there is no call in registration to which the car to be dispatched is subject for delaying the start of said timing interval until such call is registered.

4. A dispatching and control system for a plurality of elevator cars serving a plurality of floors from a terminal floor comprising; call registering means for each of said plurality of floors; timing mechanism for providing timing intervals for dispatching the cars from said terminal floor; means for causing each dispatching interval to begin with the departure of the last car to be dispatched, provided that at the time of such departure another car is at said terminal floor and a call is in registration to which such other car is subject; and dispatching mechanism for said cars for dispatching a car from said terminal floor upon the expiration of said timing interval provided there has been continuous or overlapping call registration during such interval.

5. A dispatching and control system for a plurality of elevator cars serving a plurality of floors from a terminal floor comprising; call registering means for each of said plurality of floors; means for selecting a car at said terminal floor for dispatching; and dispatching mechanism controlled by the registration of a call by said call registering means for causing the dispatching of each selected car from said terminal floor upon the expiration of a predetermined time interval from the departure from said terminal floor of the preceding car, provided there is continuous or overlapping call registration during such interval.

6. A dispatching and control system for a plurality of elevator cars serving a plurality of floors from a terminal floor comprising; landing call registering means common to the cars for each of said plurality of floors; car call registering means for each car for each of said plurality of floors; dispatching mechanism for said cars; means for selecting a car for dispatching by said dispatching mechanism; and means controlled by the landing calls which are registered and the car calls for the selected car which are registered for causing the dispatching of the selected car by said dispatching mechanism from said terminal floor upon the expiration of a predetermined time interval from the departure of the preceding car or from the registration of a car call for the selected car or landing call, whichever occurs later, provided that during such period there is continuous registration of one or more overlapping calls.

7. A dispatching and control system for a plurality of elevator cars serving a plurality of floors from a terminal floor comprising; car call registering means for each car for each of said plurality of floors; dispatching mechanism for said cars; and means for each car controlled by car calls for that car for delaying the dispatching of that car from said terminal floor by said dispatching mechanism until the expiration of a predetermined loading time interval after the first car call for that car is registered.

8. A dispatching and control system for a plurality of elevator cars serving a plurality of floors from a terminal floor comprising; car call registering means for each car for each of said plurality of floors; dispatching mechanism for said cars; means for selecting said cars for dispatching by said dispatching mechanism from said terminal floor in their order of arrival at said terminal floor; and timing means for delaying the dispatching of each selected car from said terminal floor by said dispatching mechanism until the expiration of a predetermined loading time interval after the registration of a car call for that car or the dispatching of the previous car, whichever occurred later.

9. A dispatching and control system for a plurality of elevator cars serving a plurality of floors including a lower terminal floor comprising; car call registering means for each car for each of said floors above said terminal floor; mechanism for dispatching said cars in the up direction from said terminal floor; means for selecting a car for dispatching by said dispatching mechanism; and means responsive to the registration of a car call for a car at said terminal floor which has been selected for causing operation of said dispatching mechanism to dispatch the selected car upon the expiration of a predetermined time interval from the time that such call is registered.

10. A dispatching and control system for a plurality of elevator cars serving a plurality of floors including a lower terminal floor comprising; car call registering means for each car for each of said floors above said terminal floor; landing call registering means for each of said floors above; mechanism for dispatching said cars in the up direction from said terminal floor; means for selecting a car at said terminal floor for dispatching by said dispatching mechanism; and means responsive to the registration of a car call for the selected car or a landing call for causing operation of said dispatching mechanism to dispatch the selected car upon the expiration of a predetermined time interval from the time that such call is registered in the event that there is during said interval continuous registration of one of such calls or more than one in overlapping relation.

11. A dispatching and control system for a plurality of elevator cars serving a plurality of floors including a lower terminal floor comprising; car call registering means for each car for each of said floors above said terminal floor; up landing call registering means for each of said floors above; down landing call registering means for each of said floors above; mechanism for dispatching said cars in the up direction from said terminal floor; means for selecting a car at said terminal floor for dispatching by said dispatching mechanism; and means responsive to the registration of a car call for the selected car, a down landing call above all cars or an up landing call for causing operation of said dispatching mechanism to dispatch the selected car upon the expiration of a predetermined time interval from the time that such call is registered in the event that there is during said interval continuous registration of one or overlapping calls.

12. A dispatching and control system for a plurality of elevator cars serving a plurality of floors including a terminal floor comprising; call registering means for each of said floors other than said terminal floor; dispatching mechanism for said cars for dispatching each car from said terminal floor upon the expiration of a predetermined time interval; and means operable under conditions where at the time of departure of a car which has been dispatched by said dispatching mechanism one or more other cars are at said terminal floor for causing the dispatching interval for the next car to be dispatched to begin incident to the starting of said dispatched car from said terminal floor or the registration of a call, whichever occurs later, and for continuing said interval so long as during said interval there exists continuous registration of one or more calls.

13. A dispatching and control system for a plurality of elevator cars serving a plurality of floors including a lower terminal floor comprising; call registering means for each of said floors above said terminal floor; dispatching mechanism for said cars for dispatching a car in the up direction from said terminal floor upon the expiration of a predetermined time interval; means operable under conditions where at the time of departure of a car which has been dispatched by said dispatching mechanism one or more other cars are at said terminal floor for causing the dispatching interval for the next car to be dispatched to begin incident to the starting of said dispatched car from said terminal floor or the arising of a condition in which one or more of said calls is in registration, whichever occurs later; and means for cancelling said interval in the event that before said interval expires there ceases to be any of said calls in registration and for restarting it upon the registration of a call.

14. A dispatching and control system for a plurality of elevator cars serving a plurality of floors including a lower terminal floor comprising; landing call registering means for each of said floors above said terminal floor; car call registering means for each car for each of said floors above said terminal floor; dispatching mechanism for said cars for dispatching a car in the up direction from said terminal floor upon the expiration of a predetermined time interval; means operable under conditions where at the time of departure of a car which has been dispatched by said dispatching mechanism one or more other cars are at said terminal floor for causing the dispatching interval for the next car to be dispatched to begin incident to the starting of said dispatched car from said terminal floor or the arising of a condition in which a car call for the next car or a landing call is in registration, whichever occurs later; and means for cancelling said interval in the event that prior to the expiration of said interval there ceases to be continuous registration of one or overlapping calls and for restarting said interval upon the registration of such call.

15. A dispatching and control system for a plurality of elevator cars serving a plurality of floors including a lower terminal floor comprising; landing call registering means for each of said floors above said terminal floor; car call registering means for each car for each of said floors above said terminal floor; dispatching mechanism for said cars for dispatching a car in the up direction from said terminal floor upon the expiration of a predetermined time interval; means responsive to the departure of a car which has been dispatched by said dispatching mechanism for initiating the start of the dispatching interval for the next car to be dispatched, provided no other car is at said terminal floor as said dispatched car leaves, or if said next car is at said terminal floor at such time, provided a car call for said next car or a landing call is in registration; means operable under conditions where said next car is at said terminal floor as said dispatched car departs and no such call is in registration for initiating the start of said interval upon the registration of such call; and means for cancelling said interval in the event that upon the arrival of said next car at said terminal floor no such call is in registration or, if while said next car is at said terminal floor and prior to the expiration of said interval there ceases to be one of such calls in registration and for restarting said interval upon the registration of such call.

16. A dispatching and control system for a plurality of elevator cars serving a plurality of floors including a lower terminal floor comprising; up landing call registering means for each of said floors above said terminal floor; down landing call registering means for each of said floors above said terminal floor; car call registering means for each car for each of said floors above said terminal floor; dispatching mechanism for said cars for dispatching a car in the up direction from said terminal floor upon the expiration of a predetermined time interval; means for selecting the next car to be dispatched; means responsive to the departure of a car which has been dispatched by said dispatching mechanism for initiating the start of the dispatching interval for said next car, provided no other car is at said terminal floor as said dispatched car leaves, or if said next car is at said terminal floor at such time, provided a car call for said next car, a down landing call above all cars or an up landing call is in registration; means operable under conditions where said next car is at said terminal floor as said dispatched car departs and no such call is in registration for initiating the start of said interval upon the registration of such call; and means for cancelling said interval in the event that upon the arrival of said next car at said terminal floor no such call is in registration or, if while said next car is at said terminal floor and prior to the expiration of said interval there ceases to be continuous registration of one or overlapping such calls and for restarting said interval upon the registration of such call.

17. A dispatching and control system for a plurality of elevator cars serving a plurality of floors from a terminal floor comprising; landing call registering means for each of said plurality of floors; car call registering means for each car for each of said plurality of floors; means for selecting the next car to be dispatched from said terminal floor; timing means for providing a given time interval from the departure of each selected car from said terminal floor; means for each car operable in response to the registration when that car is at said terminal floor of a spacing call for that car for registering the existence of such call; and dispatching mechanism responsive to the expiration of said time interval or to the operation of said spacing call registering means for a selected car at said terminal floor prior to the expiration of said time interval for dispatching said selected car from said terminal floor.

18. A dispatching and control system for a plurality of elevator cars serving a plurality of floors including a lower terminal floor comprising; up landing call registering means for each of said floors above said terminal floor; down landing call registering means for each of said floors above said terminal floor; means for selecting the next car to be dispatched from said terminal floor; timing means for providing a given time interval from the departure of each selected car in the up direction from said terminal floor; means for each car operable in response to the registration of a landing call behind that car for registering the existence of such call as distinguished from a landing call ahead of the car; and dispatching mechanism responsive to the expiration of said time interval or to the operation of said call behind registering means for each of the other cars for dispatching a selected car in the up direction from said terminal floor.

19. A dispatching and control system for a plurality of elevator cars serving a plurality of floors including a lower terminal floor comprising; car call registering means for each car for each of said floors above said terminal floor; means for selecting the next car to be dispatched from said terminal floor; timing means for providing a given time interval from the departure of each selected car from said terminal floor; means for each car operable in response to that car either being set for downward travel or at said terminal floor; and dispatching mechanism responsive to the expiration of said time interval for dispatching said selected car from said terminal floor and responsive, under conditions where the time interval has not expired and where said means for each of the other cars responsive to that car being either set for downward travel or at said terminal floor has operated, to a car call for said selected car for dispatching said selected car from said terminal floor immediately.

20. A dispatching and control system for a plurality of elevator cars serving a plurality of floors including a lower terminal floor comprising; up landing call registering means for each of said floors above said terminal floor; means for selecting the next car to be dispatched from said terminal floor; timing means for providing a given time interval from the departure of each selected car from said terminal floor; means for each car operable in response to that car either being set for downward travel or at said terminal floor; means for each car common to said up landing calls for registering the existence of any of said up landing calls above that car; and dispatching mechanism responsive to the expiration of said time interval for dispatching said selected car from said terminal floor as the timing interval expires and responsive, under conditions where said time interval has not expired and said means for each of the other cars responsive to that car being either set for downward travel or at said terminal floor has operated, to said means for said selected car common to said up landing calls for dispatching that car from said terminal floor as soon as an up landing call is registered.

21. A dispatching and control system for a plurality of elevator cars serving a plurality of floors including a lower terminal floor comprising; down landing call registering means for each of said floors above said terminal floor; means for selecting the next car to be dispatched from said terminal floor; timing means for providing a given time interval from the departure of each selected car from said terminal floor; means for each car operable in response to that car either being set for downward travel or at said terminal floor; means for each car common to said down landing calls for registering the existence of any of said down landing calls above that car; and dispatching mechanism responsive to the expiration of said time interval for dispatching said selected car from said terminal floor as the timing interval expires and responsive, under conditions where said time interval has not expired and said means for each of the other cars responsive to that car being either set for downward travel or at said terminal floor has operated, to said means common to said down landing calls above all cars for dispatching said selected car from said terminal floor as soon as a down landing call above all cars is registered.

22. A dispatching and control system for a plurality of elevator cars serving a plurality of floors including a lower terminal floor comprising; up landing call registering means for each of said floors above said terminal floor; down landing call registering means for each of said floors above said terminal floor; car call registering means for each car for each of said floors above said terminal floor; means for selecting the next car to be dispatched; means for dispatching a selected car in the up direction from said terminal floor upon the expiration of a predetermined time interval after the departure of the previously dispatched car from said terminal floor; spacing call registering means responsive, under the condition that each of the other cars is either at said terminal floor or set for downward travel, to the registration of a car call for the selected car, a down landing call above said other cars or an up landing call for registering the existence of such call; and means responsive to the operation of said spacing call existence registering means for dispatching said selected car in the up direction from said terminal floor prior to the expiration of said time interval.

23. A dispatching and control system for a plurality of elevator cars serving a plurality of floors including a lower terminal floor and an upper terminal floor comprising; timing mechanism for providing an up dispatching interval equal to the sum of the average round trip time of a car and its average loading time at the lower terminal floor, divided by the number of cars; up trip dispatching mechanism for said cars for dispatching another car on its upward trip from the lower terminal floor upon expiration of said up dispatching interval from each departure of a preceding car; and down trip dispatching mechanism for said cars for dispatching another car on its downward trip from the upper terminal floor upon expiration from the departure of the preceding car on its downward trip of a predetermined time interval which is a fraction of said up dispatching interval.

24. A dispatching and control system for a plurality of elevator cars serving a plurality of floors including a lower terminal floor and an upper terminal floor comprising; timing mechanism for providing an up dispatching interval equal to the sum of the average round trip time of a car and its average loading time at the lower terminal floor, divided by the number of cars; up trip dispatching mechanism for said cars for dispatching another car on its upward trip from the lower terminal floor upon expiration of said up dispatching interval from the departure of each preceding car on its upward trip; and down trip dispatching mechanism for said cars for immediately dispatching another car on its downward trip from the upper terminal floor in the event of its arrival at said upper terminal floor more than one half said up dispatching interval from the departure of the preceding car on its downward trip but for delaying the dispatching of such other car until the expiration of said one half up dispatching interval in the event that such other car arrives at said upper terminal floor before said one half up dispatching interval expires.

25. A dispatching and control system for a plurality of elevator cars serving a plurality of floors including a lower terminal floor and an upper terminal floor comprising; timing mechanism for providing an up dispatching interval equal to the sum of the average round trip time of a car and its average loading time at the lower terminal floor, divided by the number of cars; up trip dispatching mechanism for said cars for dispatching another car on its upward trip from the lower terminal floor upon expiration of said up dispatching interval from the departure of each preceding car on its upward trip; and down trip dispatching mechanism for said cars for immediately dispatching another car on its downward trip from its upper reversal point in the event of its arrival at such point more than one half said up dispatching interval from the departure of the preceding car on its downward trip from its upper reversal point but for delaying the dispatching of such other car until the expiration of said one half up dispatching interval in the event that such other car arrives at said upper terminal floor before said one half up dispatching interval expires.

26. A dispatching and control system for a plurality of elevator cars serving a plurality of floors including an upper terminal floor comprising; call registering means for each of said floors below said upper terminal floor; down trip dispatching mechanism for said cars for dispatching the next car on its downward trip from said upper terminal floor upon expiration of a predetermined time interval from the departure on its downward trip of each preceding car; and means controlled by the position and direction of travel of each of the other cars and said call registering means for dispatching the next car on its downward trip from a floor below said upper terminal floor in the event such next car has not reached the upper terminal floor by the time such time interval has expired.

27. A dispatching and control system for a plurality of elevator cars serving a plurality of floors including an upper terminal floor comprising; landing call registering means for each of said floors below said upper terminal floor; timing mechanism for providing timing intervals for dispatching said cars on their downward trips; down trip dispatching mechanism for said cars for dispatching another car on its downward trip from said upper terminal floor upon expiration of each of said timing intervals; and means operable in the event that the next car has not reached the upper terminal floor by the time such time interval has expired, that at least one of the other cars is set for downward travel and that a call is registered for a floor above the highest of such down cars, for causing operation of said dispatching mechanism to dispatch the next car on its downward trip from a floor below said upper terminal floor, provided such next car has reached its highest call.

28. A dispatching and control system for a plurality of elevator cars serving a group of floors including a lower terminal floor and an upper terminal floor comprising; down landing call registering means for each of a plurality of said floors including said upper terminal floor; timing mechanism for providing a predetermined time interval from the start of each car on its downward trip; dispatching mechanism for said cars for dispatching the next car on its downward trip from said upper terminal floor upon expiration of said time interval from the start of the preceding car on its downward trip; and means operable upon expiration of said time interval at a time when no car is available at the upper terminal floor to be dispatched to cause said dispatching mechanism to dispatch the next car on its downward trip from one of said plurality of floors which is below the upper terminal floor, provided such next car has reached its highest call and that if any of the other cars are each either set for downward travel or at the lower terminal floor there is a down landing call in registration for a floor above such other car.

29. A dispatching and control system for a plurality of elevator cars serving a group of floors including a lower terminal floor and an upper terminal floor comprising; car actuating and stopping mechanism for each car; down landing call registering means for each of a plurality of floors including said upper terminal floor; timing mechanism for providing a predetermined time interval from the start of each car on its downward trip; dispatching mechanism for said cars for dispatching the next car on its downward trip from said upper terminal floor upon expiration of said time interval from the start of the preceding car on its downward trip; and means operable upon expiration of said time interval at a time when no car is available at the upper terminal floor to be dispatched to cause in response to a down call for one of said plurality of floors which is below the upper terminal floor operation of said car actuating and stopping mechanism for the next up travelling car to stop that car at the floor for which such down call is registered, the setting of such next car for downward travel and operation of said dispatching mechanism to dispatch such next car on its downward trip from such floor, provided such next car has reached its highest call and that if any of the other cars are each either set for downward travel or at the lower terminal floor there is a down landing call in registration for a floor above such other car.

30. A dispatching and control system for a plurality of elevator cars serving a group of floors including a lower terminal floor and an upper terminal floor comprising; car actuating and stopping mechanism for each car; up landing call registering means for each of said floors between said terminal floors; down landing call registering means for each of a plurality of said floors including said upper terminal floor; car call registering means for each of said cars for each of said plurality of floors; call pick-up means for each car responsive to the calls that are registered to cause operation of said car actuating and stopping mechanism for that car to stop the car during upward travel at floors for which car calls for that car and up landing calls are registered and during downward travel of the car at floors for which car calls for that car and down landing calls are registered; timing mechanism for providing a predetermined time interval from the start of each car on its downward trip; dispatching mechanism for said cars for dispatching the next car on its downward trip from said upper terminal floor upon expiration of said time interval from the start of the preceding car on its downward trip; and means responsive to the expiration of said time interval at a time when no car is available at the upper terminal floor to be dispatched to cause in response to a down landing call for one of said plurality of floors below the upper terminal floor operation of said car actuating and stopping mechanism for the next up travelling car to stop that car at the floor for which such down call is registered, the setting of such next car for downward travel as it is brought to a stop at the floor for which such down call is registered or at one of said plurality of floors below the upper terminal floor at which it is brought to a stop in response to a car call for said next car and operation of said dispatching mechanism to dispatch such next car on its downward trip from such floor, provided such next car has reached its highest call and that if any of the other cars are each either set for downward travel or at the lower terminal floor there is a down landing call in registration for a floor above such other car.

31. A dispatching and control system for a plurality of elevator cars serving a plurality of floors, in which the cars are dispatched in a certain direction from a given terminal floor, there being an additional floor beyond said terminal floor in a direction therefrom opposite to said certain direction, said system comprising; call registering means common to said cars for said additional floor; and means responsive to the registration of a call by said call registering means for selecting any one of said cars to respond to such call to the exclusion of said other cars.

32. A dispatching and control system for a plurality of elevator cars serving a plurality of floors, in which the cars are dispatched in the up direction from a lower terminal floor, there being a basement floor below said terminal floor, said system comprising; call registering means common to said cars for said basement floor; and means controlled by the registration of a call by said call registering means for selecting any one of said cars to respond to such call and for preventing the selection of any of the other cars to respond to such call.

33. A dispatching and control system for a plurality of elevator cars serving a plurality of floors, in which the cars are dispatched in the up direction from a lower terminal floor, there being a basement floor below said terminal floor, said system comprising; landing call registering means common to said cars for said basement floor; car call registering means for each of said cars for said basement floor; means responsive to the registration of a call by said landing call registering means for selecting any one of said cars for basement service; means responsive to the registration of a call by said car call registering means for any one of said cars for selecting that car for basement service; and means responsive to the selection of any car for basement service for preventing so long as said selection continues the operation of said landing call registration responsive means to select another car for basement service in response to the subsequent registration of a call by said landing call registration means.

34. A dispatching and control system for a plurality of elevator cars serving a plurality of floors, in which dispatching mechanism is provided, and in which the cars are selected for dispatching in the up direction from a lower terminal floor, there being a basement floor below said terminal floor, said system comprising; call registering means common to said cars for said basement floor; means responsive to the registration of a call by said call registering means for selecting any one of said cars for basement service; and means responsive to the selection for basement service of a car which had been already selected for dispatching in the up direction for cancelling such selection for dispatching in the up direction and for causing another car to be selected for dispatching in the up direction.

35. A dispatching and control system for a plurality of elevator cars serving a plurality of floors, in which dispatching mechanism is provided, and in which the cars are selected for dispatching in the up direction from a lower terminal floor, there being a basement floor below said terminal floor, said system comprising; landing call registering means common to said cars for said basement floor; car call registering means for each of said cars for said basement floor; means responsive to the registration of a call by said landing call registering means for selecting any one of said cars for basement service; means responsive to the registration of a call by said car call registering means for any one of said cars for selecting that car for basement service; means responsive to the selection of any car for basement service for preventing so long as said selection continues the operation of said landing call registration responsive means to select another car for basement service in response to the subsequent registration of a call by said landing call registration means; and additional means responsive to the selection for basement service of a car which had been selected for dispatching in the up direction for cancelling such selection for dispatching in the up direction and for causing another car to be selected for dispatching in the up direction.

36. An elevator control system in which the elevator car serves a plurality of floors comprising; car call registering means for each of said floors; landing call registering means for each of said floors; means for stopping said car at each of said floors in response to a car call or landing call for that floor; means for automatically restarting said car upon expiration of a predetermined time interval when a stop is made at a floor in response to said landing call for that floor; and means for automatically restarting said car upon expiration of a shorter predetermined time interval, provided a stop is made at a floor solely in response to said car call for that floor.

37. An elevator control system in which the elevator car serves a plurality of floors comprising; car call registering means for each of said floors; landing call registering means for each of said floors; means for stopping said car at each of said floors in response to a car call or landing call for that floor; means for automatically restarting said car after a stop at each of said floors; timing means for providing an interval after each stop before said starting means becomes effective; means responsive to a stop made solely in response to a car call for controlling said timing means to cause said interval to be of a certain duration; and means responsive to a stop made in response to a landing call for controlling said timing means to cause said interval to be of a certain longer duration.

38. An elevator control system in which the elevator car serves a plurality of floors comprising; car call registering means for each of said floors; landing call registering means for each of said floors; car actuating and stopping mechanism; closure means for controlling access to and from the car at each of said floors; power operating mechanism for said closure means; means for causing operation of said car actuating and stopping mechanism to stop said car at each of said floors in response to a car call or landing call for that floor and for causing operation of said power operating mechanism to open said closure means as the car comes to a stop; time controlled means for causing automatic closing of said closure means by said operating mechanism and restarting of said car by said car actuating and stopping mechanism upon the expiration of a certain interval after a stop at each of said floors; and means controlled by the calls in response to which the stops are made for causing said interval to be of a longer duration when a stop is made at a floor for which a landing call is registered than when a stop is made at a floor for which only a car call is registered.

39. An elevator control system in which the elevator car serves a plurality of floors; car call registering means for each of said floors; landing call registering means for each of said floors; car actuating and stopping mechanism; closure means for controlling access to and from the car at each of said floors; power operating mechanism for said closure means; means responsive to a car call or landing call for any of said floors for causing operation of said car actuating and stopping mechanism to stop said car at such floor and for causing operation of said power operating mechanism to open said closure means as the car comes to a stop; means for causing after the stop has been made automatic reclosing of said closure means by said power operating mechanism and restarting of the car by said car actuating and stopping mechanism as said closure means reaches closed position; a time switch rendered effective upon initiation of said closure means opening operation when a stop is made for providing a time interval to effect passenger transfer before said automatic closing of said closure means is effected; and means controlled by the calls in response to which the stops are made for controlling the operation of said time switch to cause said interval to be of a longer duration when a stop is made at a floor for which a landing call is registered than when a stop is made at a floor for which only a car call is registered.

40. An elevator control system in which the elevator car serves a lower terminal floor and a plurality of floors above comprising; car call registering means for each of said floors above; landing call registering means for each of said floors above; car actuating and stopping mechanism; closure means for controlling access to and from the car at each of said floors; power operating mechanism for said closure means; means for causing operation of said car actuating and stopping mechanism to stop said car at each of said floors above in response to a car call or landing call for that floor and at said lower terminal floor on its downward trip; means responsive to the stopping of a car at a floor to cause operation of said power operating mechanism to open said closure means; means for automatically causing after the stop has been made operation of said power operating mechanism to reclose said closure means and operation of said car actuating and stopping mechanism to restart the car as said closure means reaches closed position; timing means for providing an interval after each stop during which reclosing of said closure is prevented; and means responsive to a stop of the car at a floor for controlling said timing means to cause said interval to be of a certain duration when the stop is solely in response to a car call, of a longer duration when the stop is in response to a landing call and of still longer duration when said stop is made at the lower terminal floor.

41. An elevator control system in which the elevator car serves a lower terminal floor and a plurality of floors above comprising; car call registering means for each of said floors above; landing call registering means for each of said floors above; car actuating and stopping mechanism; closure means for controlling access to and from the car at each of said floors; power operating mechanism for said closure means; means for causing operation of said car actuating and stopping mechanism to stop said car at each of said floors above in response to a car call or landing call for that floor and at said lower terminal floor on its downward trip; means responsive to the stopping of the car for causing operation of said power operating mechanism to open said closure means as each stop is made; means for causing after a stop has been made operation of said power operating mechanism to reclose said closure means and operation of said car actuating mechanism to restart the car after said closure means reaches closed position; a time switch rendered effective upon initiation of said closure means opening operation when a stop is made for preventing reclosing of said closure means for a time interval to enable passenger transfer to be effected; means responsive to a stop by the car at a floor above the lower terminal floor solely in response to a car call for that floor for controlling the operation of said time switch to cause said interval to be of a certain duration; means responsive to a stop of the car at a floor above the lower terminal floor in response to a landing call for that floor for controlling the operation of said time switch to cause said interval to be of longer duration; and means responsive to said stop of the car at the lower terminal floor for controlling the operation of said time switch to cause said interval to be of still longer duration.

42. An elevator control system in which the elevator car serves a plurality of floors including a lower terminal floor and a floor below said terminal floor comprising; car actuating and stopping means; means for causing operation of said mechanism to stop said car at said floors and to restart the car after the stop has been made; means responsive to each stop of the car at said lower terminal floor on its downward trip for preventing restarting of said car before the expiration of a certain time interval; and means responsive to each stop of the car at said lower terminal floor on its upward trip from said floor below for preventing restarting of said car before the expiration of a time interval of shorter duration than said certain time interval.

43. An elevator control system in which the elevator car serves a plurality of floors including a lower terminal floor and a floor below said terminal floor comprising; car actuating and stopping mechanism; closure means for controlling access to and from the car at each of said floors; power operating mechanism for said closure means; means for causing operation of said car actuating and stopping mechanism to stop said car at said floors and for causing operation of said power operating mechanism to open said closure means as the car comes to a stop; means for causing after the stop has been made operation of said power operating mechanism to reclose said closure means and for causing operation of said car actuating and stopping mechanism to restart the car as said closure means reaches closed position; timing means for providing an interval after each stop during which reclosing of said closure means by said power operating mechanism is prevented; and means responsive to the stopping of the car at said lower terminal floor for controlling said timing means to cause said interval to be of a longer duration when the car arrives at said lower terminal floor in the down direction than when it arrives at such floor from said floor below.

44. An elevator control system in which the elevator car serves a plurality of floors including a lower terminal floor and a floor below said terminal floor comprising; car actuating and stopping mechanism; closure means for controlling access to and from the car at each of said floors; power operating mechanism for said closure means; means for causing operation of said car actuating and stopping mechanism to stop said car at said floors and for causing operation of said power operating mechanism to open said closure means as the car comes to a stop; means for causing after the stop has been made operation of said power operating mechanism to reclose said closure means and for causing operation of said car actuating and stopping mechanism to restart the car; a time switch rendered effective incident to the stopping of the car at a floor and the opening of said closure means for preventing reclosing of said closure means by said power operating mechanism for a time interval to enable passenger transfer to be effected; means responsive to the stopping of the car at said lower terminal floor on its downward trip for controlling the operation of said time switch to cause said interval to be of a certain duration; and means responsive to the stopping of the car at said lower terminal floor on its upward trip from said floor below for controlling operation of said time switch to cause said interval to be of a shorter duration.

45. A control system for a plurality of elevator cars serving a plurality of floors comprising; car actuating and stopping mechanism for each car; landing call registering means for each of said floors; call pick-up means for each car responsive to the calls that are registered to cause operation of said car actuating and stopping mechanism for that car to stop the car during travel in a given direction at floors for which such calls are registered; means for each car operable under certain conditions of operation to cause operation of said car actuating and stopping mechanism to stop that car at a floor for which no call is registered; and means for each car for automatically causing operation of said car actuating and stopping mechanism for that car to restart the car upon expiration of a predetermined time interval after a stop is made in response to a landing call and upon expiration of a shorter predetermined time interval when a stop is made at a floor for which no call is registered.

46. A control system for an elevator car serving a plurality of floors comprising; car actuating and stopping mechanism; a plurality of controls, one for each of said floors, for registering landing calls for service in a given direction; a plurality of controls, one for each of said floors, for registering car calls; call pick-up means responsive to the calls that are registered for causing during travel of said car in said given direction operation of said mechanism to stop the car at the floors for which such calls are registered;

direction controlling means controlled by said calls for causing the direction in which the car is set to leave each floor after a stop thereat in said given direction to remain in said given direction when at the initiaton of the stop calls for floors beyond remain to be responded to or, if no such calls for floors beyond remain to be responded to, when such stop is in response to one of said landing calls; timing means for providing a predetermined time interval after each of such stops; starting means controlled by said timing means at the expiration of said time interval to cause operation of said mechanism to restart the car in accordance with the direction set by said direction controlling means; and means controlled by said calls and operable in response to operation of said starting means, under conditions where after a stop at a floor in said given direction in response to a landing call there is at the expiration of said time interval no call in registration for a floor in said given direction from the floor at which such stop is made, to prevent starting of said car at that time and instead to cause operation of said direction controlling means to change the direction in which the car is set to leave the floor to opposite said given direction.

47. A control system for an elevator car serving a plurality of floors comprising; car actuating and stopping mechanism; a plurality of controls, one for each of said floors, for registering landing calls for service in a given direction; a plurality of controls, one for each of said floors, for registering car calls; call pick-up means responsive to the calls that are registered for causing during travel of said car in said given direction operation of said mechanism to stop the car at the floors for which such calls are registered; direction controlling means controlled by said calls for causing the direction in which the car is set to leave each floor after a stop thereat in said given direction to remain in said given direction when at the initiation of such stop calls for floors beyond remain to be responded to or, if no such calls for floors beyond remain to be responded to, when such stop is in response to said landing call for such floor; a pair of direction indicating lights at each floor, one for each direction; indicating light controlling means for causing lighting of said direction indicating light for said given direction at each floor at which a stop is made under conditions where the direction in which the car is set to leave that floor is in said given direction; means for providing a time interval after each stop; means responsive to said timing means upon expiration of said time interval after each of such stops to cause operation of said mechanism to restart the car in accordance with the direction set by said direction controlling means; and means controlled by said calls and operable in response to said timing means, under conditions where after a stop at a floor in said given direction in response to a landing call no call is in registration for a floor in said direction from the floor at which such stop is made as said time interval expires, to prevent starting of the car and instead to cause operation of said direction controlling means to change the direction in which the car is set to leave the floor to opposite said given direction and to cause operation of said light controlling means to extinguish said direction indicating light at that floor for said given direction and to light said direction indicating light at that floor for the opposite direction.

48. A control system for an elevator car serving a plurality of floors comprising; car actuating and stopping mechanism; a plurality of controls, one for each of said floors, for registering up landing calls; a plurality of controls, one for each of said floors, for registering car calls; an up hall lantern and a down hall lantern at each floor, means responsive to the calls that are registered for causing during travel of said car in the up direction operation of said mechanism to stop the car at the floors for which such calls are registered; means responsive to each of such stops in response to a car call under conditions where a call above remains to be responded to or in response to an up landing call to cause lighting of said up hall lantern at the floor at which the stop is made and to maintain the car set for upward travel; timing means for providing a predetermined time interval after each of such stops; means responsive to said timing means upon expiration of said time interval after a stop at a floor under such conditions to cause operation of said mechanism to restart the car in the up direction provided there is a call in registration for a floor above at that time and, in the event that no call is in registration for a floor above at that time, to prevent starting of the car at that time and instead to set the car for downward travel, to cause extinguishing of said up hall lantern at that floor and the lighting of said down hall lantern at that floor and to cause operation of said timing means to provide another predetermined time interval; and means operable in response to said timing means upon expiration of said other time interval to cause operation of said mechanism to start the car in the down direction.

49. A control system for an elevator car serving a plurality of floors comprising; car actuating and stopping mechanism; a plurality of controls, one for each of said floors, for registering up landing calls; a plurality of controls, one for each of said floors, for registering down landing calls; a plurality of controls, one for each of said floors, for registering car calls; means responsive to the car and up landing calls that are registered for causing during travel of said car in the up direction operation of said mechanism to stop the car at the floors for which such calls are registered and to automatically cancel the calls in response to which the stops are made; means responsive to each of such stops in response to a car call under conditions where a call above remains to be responded to or in response to an up landing call for maintaining the car set for upward travel; timing means operable upon expiration of a predetermined time interval after each of such stops in response to a car call under conditions where a call above remained to be responded to or in response to an up landing call to cause operation of said mechanism to restart the car in the up direction, provided at the expiration of the time interval a call above is in registration; and means operable in response to the operation of said timing means at the expiration of said time interval, under conditions where no call is in registration for a floor above at the time the time interval expires, to set the car for downward travel and to cause automatic cancellation of said down landing call for such floor if registered.

50. A control system for a plurality of elevator cars serving a plurality of floors comprising; car actuating and stopping mechanism for each car; a plurality of controls common to the cars, one for each of said floors, for registering up landing calls; a plurality of controls for each car, one for each of said floors, for registering car calls for that car; means for each car responsive to the car calls for that car and up landing calls that are registered for causing during travel of said car in the up direction operation of said mechanism for that car to stop the car at the floors for which such calls are registered; means for each car responsive to each of such stops by that car in response to a car call under conditions where a call above remains to be responded to or in response to an up landing call for maintaining the car set for upward travel; timing means for each car for providing a predetermined time interval after each stop of that car; starting means for each car operable upon expiration of said time interval after each stop of that car in response to a car call under such conditions or in response to an up landing call to cause operation of said mechanism for that car to restart the car in the up direction; and means for each car operable upon expiration of said time interval, under conditions where after a stop at a floor in said up direction in response to a car call when the only call above that car for maintaining up direction was an up landing call and that up landing call is answered by another car by the time said time interval expires, to set the car for downward travel.

51. A control system for an elevator car serving a plurality of floors comprising; car actuating and stopping mechanism; a plurality of controls, one for each of said floors, for registering calls for the floors for which they are provided for travel in a given direction; call pick-up means responsive to the controls that are operated for causing operation of said mechanism during travel of said car in said given direction to stop the car at the floors for which such controls are provided; direction controlling means controlled by said controls for causing the direction in which the car is set to leave each floor after a stop thereat in said given direction to be in said given direction; and means controlled by said controls and operable, in the event that at the expiration of a given time interval after any one of such stops no call is registered for a floor in said given direction from the floor at which such stop is made, to cause operation of said direction controlling means to change the direction in which the car is set to leave the floor to opposite said given direction.

52. A control system for an elevator car serving a plurality of floors comprising; car actuating and stopping mechanism; a plurality of controls, one for each of said floors, for registering calls for a given direction; a direction signal for said given direction and a direction signal for the opposite direction at each of said floors; means responsive to said calls that are registered for causing during travel of said car in said given direction operation of said car actuating and stopping mechanism to stop the car at the floors for which such calls are registered; means responsive to each of such calls to cause lighting of the direction signal for said given direction at the floor at which the stop in response to that call is made and to maintain the car set for travel in said given direction; means responsive to each of said stops for providing a time interval after the stop is made; and means controlled by said calls and operable, under conditions where upon the expiration of said time interval after each of such stops a call is in registration for a floor beyond in said given direction, to cause operation of said car actuating and stopping mechanism to restart the car in the said given direction and, under conditions where at the expiration of said time interval after a stop no call for a floor beyond in said given direction is in registration, to prevent restarting of the car and instead to cause the car to be set for travel in the opposite direction, and the extinguishing of said direction signal for said given direction at that floor and lighting of said opposite direction signal at that floor.

53. A control system for an elevator car serving a plurality of floors comprising; car actuating and stopping mechanism; a plurality of controls, one for each of said floors, for registering up landing calls; an up hall lantern and a down hall lantern at each of said floors; closure means for controlling access to and from the car at each stop; power operating mechanism for said closure means; means responsive to said calls that are registered for causing during travel of said car in the up direction operation of said car actuating and stopping mechanism to stop the car at the floors for which such calls are registered and operation of said power operating mechanism to open said closure means as the stop is made; means responsive to each of such calls to cause lighting of the up hall lantern at the floor at which the stop in response to that call is made and to maintain the car set for upward travel; means for providing a time interval after each stop; and means controlled by said calls and operable, under conditions where upon the expiration of said time interval after each of such stops a call is in registration for a floor above, to cause operation of said power operating mechanism to close said closure means and of said car actuating and stopping mechanism to restart the car in the up direction and, under conditions where at the expiration of said time interval after a stop no call above is in registration, to prevent closing of said closure means and restarting of the car and instead to cause the car to be set for downward travel, the extinguishing of said up hall lantern at that floor and lighting of said down hall lantern at that floor, the reoperation of said timing means, and upon the reexpiration of said time interval operation of said power operating mechanism to close said closure means and of said car actuating and stopping mechanism to start the car in the down direction.

54. A control system for an elevator car serving a plurality of floors comprising; car actuating and stopping mechanism; a plurality of controls, one for each of said floors, for registering up landing calls; a plurality of controls, one for each of said floors, for registering car calls; an up hall lantern and a down hall lantern at each of said floors; closure means for controlling access to and from the car at each stop; power operating mechanism for said closure means; means responsive to the up landing calls and car calls that are registered for causing during travel of said car in the up direction operation of said car actuating and stopping mechanism to stop the car at the floors for which such calls are registered and operation of said power operating mechanism to open said closure means as the stop is made; means responsive to each of such stops in response to a car call under conditions where a call above remains to be responded to or in response to an up landing call to cause lighting of the up hall lantern at the floor at which the stop is made and to maintain the car set for upward travel; timing means for providing a time interval after each stop to enable the passenger transfer to be effected; means responsive to said timing means upon the expiration of said time interval after each of such stops to cause operation of said power operating mechanism to close said closure means and of said car actuating and stopping mechanism to restart the car in the up direction; and means controlled by calls above and operable, under the condition that upon the expiration of said time interval after a stop at a floor in said up direction in response to an up landing call no call is in registration for a floor above, to prevent closing of said closure means and restarting of the car and instead to cause the car to be set for downward travel, the extinguishing of said up hall lantern at that floor and lighting of said down hall lantern at that floor, and the reoperation of said timing means.

55. A control system for an elevator car serving a plurality of floors comprising; car actuating and stopping mechanism; a plurality of controls, one for each of said floors, for registering up landing calls; a plurality of controls, one for each of said floors, for registering down landing calls; a plurality of controls, one for each of said floors, for registering car calls; an up hall lantern and a down hall lantern at each of said floors; closure means for controlling access to and from the car at each stop; power operating mechanism for said closure means; means responsive to the up landing calls and car calls that are registered for causing during travel of said car in the up direction operation of said car actuating and stopping mechanism to stop the car at the floors for which such calls are registered and operation of said power operating mechanism to open said closure means as the stop is made; means responsive to each of such stops in response to a car call under conditions where a call above remains to be responded to or in response to an up landing call to cause lighting of the up hall lantern at the floor at which the stop is made and to maintain the car set for upward travel; timing means for providing a time interval after each stop to enable the passenger transfer to be effected; means subject to said timing means and operable automatically upon the expiration of said time interval after each of such stops to cause operation of said power operating mechanism to close said closure means and of said car actuating and stopping mechanism to restart the car in the up direction; and means controlled by calls above and responsive to the condition that upon the expiration of said time interval after a stop at a floor in said up direction in response to an up landing call no call is in registration for a floor above to prevent closing of said closure means and restarting of the car and instead to set the car for downward travel, to cause extinguishing of said up hall lantern at that floor and the lighting of said down hall lantern at that floor, and to cause reoperation of said timing means, said closure closing and car restarting means operating automatically upon the expiration of the time interval provided by such reoperation of said timing means to cause operation of said power operating mechanism to close said closure means and operation of said car actuating and stopping mechanism to start the car in the down direction.

56. A control system for an elevator car serving a plurality of floors comprising; car actuating and stopping mechanism; a plurality of controls, one for each of said floors, for registering calls for a given direction; a direction signal for said given direction and a direction signal for the opposite direction at each of said floors; closure means for controlling access to and from the car at each stop; power operating mechanism for said closure means; means responsive to said calls that are registered for causing during travel of said car in said given direction operation of said car actuating and stopping mechanism to stop the car at the floors for which such calls are registered and operation of said power operating mechanism to open said closure means as the car comes to a stop; means responsive to each of such calls to cause lighting of the direction signal for said given direction at the floor at which the stop in response to that call is made and to maintain the car set for travel in said given direction; means operable upon each of said stops for causing operation of said power operating mechanism to close said closure means upon the expiration of a predetermined time interval; and means controlled by said calls and operable, under conditions where after each of such stops a call is in registration for a floor beyond in said given direction, to cause operation of said car actuating and stopping mechanism to restart the car in the said given direction as said closure means reaches closed position and, under conditions where upon expiration of said time interval after a stop no call for a floor beyond in said given direction is in registration, to prevent the closing of said closure means and restarting of the car and instead to cause the car to be set for travel in the opposite direction, the extinguishing of said direction signal for said given direction at that floor and lighting of said opposite direction signal at that floor.

57. A control system for an elevator car serving a plurality of floors comprising; car actuating and stopping mechanism; a plurality of controls, one for each of said floors, for registering calls for a given direction; a direction signal for said given direction and a direction signal for the opposite direction at each of said floors; closure means for controlling access to and from the car at each stop; power operating mechanism for said closure means; means responsive to said calls that are registered for causing during travel of said car in said given direction operation of said car actuating and stopping mechanism to stop the car at the floors for which such calls are registered and operation of said power operating mechanism to open said closure means as the car comes to a stop; means responsive to each of such calls to cause lighting of the direction signal for said given direction at the floor at which the stop in response to that call is made and to maintain the car set for travel in said given direction; means operable upon each of said stops for causing operation of said power operating mechanism to close said closure means upon the expiration of a predetermined time interval; and means controlled by said calls and operable, under conditions where upon said closure means reaching closed position after each of such stops a call is in registration for a floor beyond in said given direction, to cause operation of said car actuating and stopping mechanism to restart the car in the said given direction and, under conditions where upon said closure means reaching closed position after a stop no call for a floor beyond in said given direction is in registration, to prevent restarting of the car and instead to cause the car to be set for travel in the opposite direction, the extinguishing of said direction signal for said given direction at that floor and lighting of said opposite direction signal at that floor, and the operation of said power operating mechanism to reopen said closure means.

References Cited in the file of this patent

UNITED STATES PATENTS

| Number | Name | Date |
|---|---|---|
| 2,100,176 | Waters et al. | Nov. 23, 1937 |
| 2,284,113 | Watson | May 26, 1942 |
| 2,367,988 | Williams | Jan. 23, 1945 |
| 2,589,292 | Santini | Mar. 18, 1952 |
| 2,597,586 | Keiper et al. | May 20, 1952 |